(12) United States Patent
Cabral et al.

(10) Patent No.: US 10,832,313 B2
(45) Date of Patent: Nov. 10, 2020

(54) SYSTEMS AND METHODS FOR SERVING SECURE CONTENT

(71) Applicant: Xandr Inc., New York, NY (US)

(72) Inventors: Kevin M. Cabral, New York, NY (US); Andrew S. Dilling, New York, NY (US); Timothy B. Dixon, New York, NY (US)

(73) Assignee: XANDR INC., New York, NY (US)

( * ) Notice: Subject to any disclaimer, the term of this patent is extended or adjusted under 35 U.S.C. 154(b) by 412 days.

(21) Appl. No.: 13/631,984

(22) Filed: Sep. 29, 2012

(65) Prior Publication Data

US 2014/0095324 A1    Apr. 3, 2014

(51) Int. Cl.
*G06Q 30/00*    (2012.01)
*G06Q 30/08*    (2012.01)
*G06Q 30/02*    (2012.01)

(52) U.S. Cl.
CPC ......... *G06Q 30/08* (2013.01); *G06Q 30/0243* (2013.01)

(58) Field of Classification Search
USPC ........................................................ 705/319
See application file for complete search history.

(56) References Cited

U.S. PATENT DOCUMENTS

| | | |
|---|---|---|
| 5,855,008 A | 12/1998 | Goldhaber et al. |
| 5,974,398 A | 10/1999 | Hanson et al. |
| 6,285,987 B1 | 9/2001 | Roth et al. |
| 6,324,519 B1 | 11/2001 | Eldering |
| 6,519,571 B1 * | 2/2003 | Guheen ............ G06Q 30/02 705/14.66 |
| 7,231,358 B2 | 6/2007 | Singh et al. |
| 7,676,405 B2 | 3/2010 | Steelberg et al. |

(Continued)

FOREIGN PATENT DOCUMENTS

| | | |
|---|---|---|
| EP | 1262891 A1 | 12/2002 |
| WO | WO-01/35291 A2 | 5/2001 |

(Continued)

OTHER PUBLICATIONS

Secure Web Services and Enterprise Application Integration (Year: 2013).*

(Continued)

*Primary Examiner* — Gautam Ubale
(74) *Attorney, Agent, or Firm* — Guntin & Gust, PLC; Andrew Gust

(57) ABSTRACT

A method and system for maintaining and delivering secure online content includes facilitating registration of secure content with an online content placement auction system, auditing the registered content to ensure security requirements for the registered content are met, and holding an auction among bidders for placement of content in a secure online content space. The process of holding an auction for the content space includes receiving a call for secure content to be served in the content space, transmitting a bid request to bidders in response to the call, receiving bid replies having bid amounts and proposed content to be securely served in the content space, and determining a qualifying subset of the received bid replies having proposed content approved as secure.

20 Claims, 29 Drawing Sheets

(56) References Cited

U.S. PATENT DOCUMENTS

| | | | |
|---|---|---|---|
| 7,730,532 B1* | 6/2010 | Yeo | G06F 17/30867 726/22 |
| 7,761,346 B2 | 7/2010 | Cooper et al. | |
| 2002/0048369 A1* | 4/2002 | Ginter | G06F 21/10 380/277 |
| 2002/0103857 A1* | 8/2002 | Soderberg | H04L 67/42 709/203 |
| 2002/0169760 A1 | 11/2002 | Cheung et al. | |
| 2003/0046161 A1 | 3/2003 | Kamangar et al. | |
| 2003/0110171 A1 | 6/2003 | Ozer et al. | |
| 2004/0103024 A1 | 5/2004 | Patel et al. | |
| 2005/0216594 A1* | 9/2005 | O'Brien | G06F 9/546 709/227 |
| 2005/0251444 A1 | 11/2005 | Varian et al. | |
| 2006/0069621 A1 | 3/2006 | Chang et al. | |
| 2006/0168149 A1* | 7/2006 | Dispensa | H04L 29/12009 709/219 |
| 2006/0212270 A1* | 9/2006 | Shiu | H04L 63/126 702/188 |
| 2006/0224496 A1 | 10/2006 | Sandholm et al. | |
| 2007/0073584 A1 | 3/2007 | Grouf et al. | |
| 2007/0130005 A1* | 6/2007 | Jaschke | G06Q 30/02 705/14.66 |
| 2007/0168506 A1* | 7/2007 | Douglas | H04L 67/20 709/224 |
| 2007/0179849 A1* | 8/2007 | Jain | 705/14 |
| 2007/0233566 A1 | 10/2007 | Zlotin et al. | |
| 2008/0097838 A1 | 4/2008 | Lin et al. | |
| 2008/0162329 A1 | 7/2008 | Knapp et al. | |
| 2008/0167924 A1 | 7/2008 | Veach | |
| 2008/0228564 A1 | 9/2008 | de Heer et al. | |
| 2008/0262917 A1 | 10/2008 | Green et al. | |
| 2009/0210287 A1 | 8/2009 | Chickering et al. | |
| 2010/0017287 A1 | 1/2010 | Caldwell et al. | |
| 2010/0049695 A2 | 2/2010 | Morsa | |
| 2010/0057566 A1* | 3/2010 | Itzhak | G06Q 30/02 705/14.53 |
| 2010/0145809 A1 | 6/2010 | Knapp et al. | |
| 2010/0242055 A1* | 9/2010 | Aguilera | G06F 9/547 719/330 |
| 2012/0054143 A1* | 3/2012 | Doig | G06Q 30/0269 706/47 |
| 2012/0158490 A1 | 6/2012 | Neumeyer et al. | |
| 2012/0296713 A1* | 11/2012 | Abdulhayoglu | G06Q 30/0277 705/14.4 |

FOREIGN PATENT DOCUMENTS

| | | |
|---|---|---|
| WO | WO-2006/096768 A2 | 9/2006 |
| WO | WO-2008/077078 A1 | 6/2008 |

OTHER PUBLICATIONS

Search Report Under Section 17: United Kingdom Application No. 1003744.8, filed Mar. 5, 2010; 1 pg.

http://www.netezza.com/releases/2009/release020209.htm; Press Release "AppNexus Delivers Data Warehouse Cloud Service Based on Netezza"; Feb. 2, 2009.

International Search Report and Written Opinion for International Patent Application No. PCT/US2011/028600 dated Jul. 20, 2011 ; 11 pgs.

U.S. Appl. No. 12/717,990, filed Mar. 5, 2010, Advertising Platform User Data Store Management, Nolet et al.

U.S. Appl. No. 12/717,996, filed Mar. 5, 2010, Advertising Platform Creative Approval, Nolet et al.

U.S. Appl. No. 12/718,000, filed Mar. 5, 2010, Advertising Platform Transaction Management, Nolet et al.

U.S. Appl. No. 13/049,534, filed Mar. 16, 2011, Advertising Bid Price Modifiers, Dilling et al.

U.S. Appl. No. 13/049,579, filed Mar. 16, 2011, Advertising Venues and Optimization, Dilling et al.

U.S. Appl. No. 13/049,482, filed Mar. 16, 2011, Cross Platform Impression Inventory Classification, Crawford et al.

U.S. Appl. No. 13/561,855, filed Jul. 30, 2012, Targeted Learning in Online Advertising Auction Exchanges, Dalto et al.

U.S. Appl. No. 14/213,754, filed Mar. 14, 2014, Learn Budgeting in Online Advertising Auction Exchanges, Dalto.

U.S. Appl. No. 13/538,514, filed Jun. 29, 2012, Auction Tiering in Online Advertising Auction Exchanges, Collette et al.

U.S. Appl. No. 13/907,578, filed May 31, 2013, Application Marketplace for Online Advertising Applications, Avery et al.

U.S. Appl. No. 13/907,580, filed May 31, 2013, Application Marketplace for Online Advertising Applications, Maag.

U.S. Appl. No. 14/181,237, filed Feb. 14, 2014, Systems and Methods for Privacy-Safe User Tracking, Haies et al.

U.S. Appl. No. 14/213,799, filed Mar. 14, 2014, System and Method for Applying Targeting Audience Bid Modifiers, Himrod.

* cited by examiner

| Uniquely Calibrated | |
|---|---|
| Confirmed No Prior View | No Knowledge |

|  | Recency 1 | Recency 2 | Recency 3 |
|---|---|---|---|
| Freq 1 | m(1,1) | m(1,2) | m(1,3) |
| Freq 2 | m(2,1) | m(2,2) | m(2,3) |
| Freq 3 | m(3,1) | m(3,2) | m(3,3) |
| High Freq | m(High Freq) | | |

FIG. 19
1. Creative "Full Edit": allow creative to serve on secure inventory
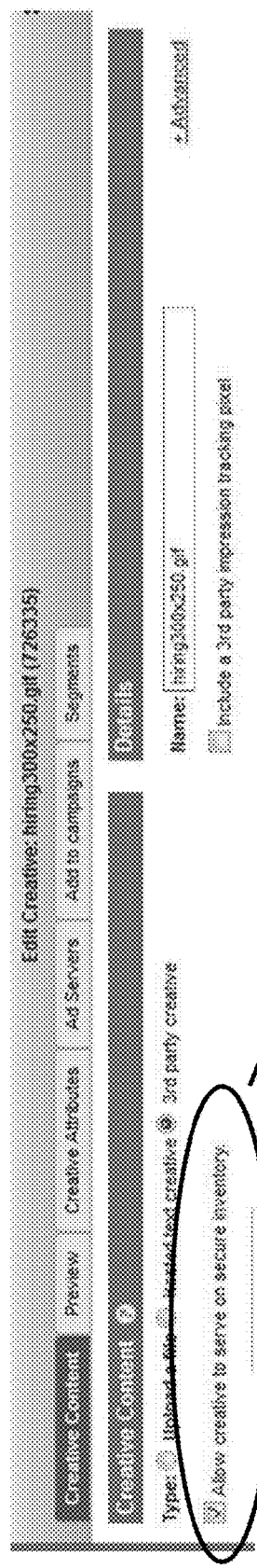
2. Add Standard and Secure Tag and Pixels
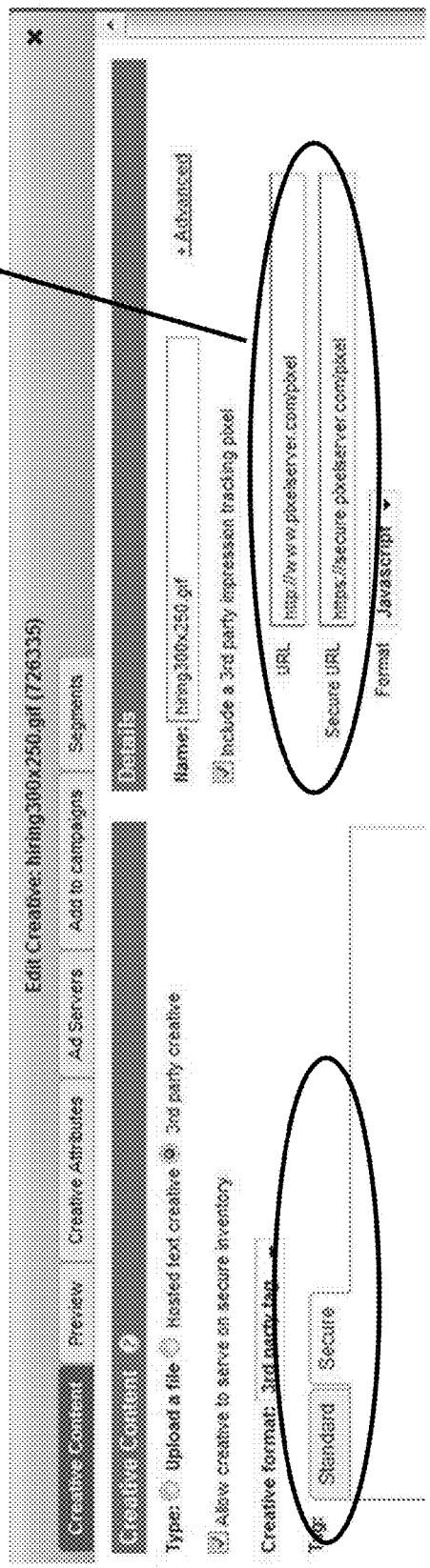

SYSTEMS AND METHODS FOR SERVING SECURE CONTENT

TECHNICAL FIELD

This invention relates generally to computer-based methods and systems for delivering secure content and, more particularly, to methods and systems for the registration, auditing, and serving of secure content in an online content placement auction platform.

BACKGROUND INFORMATION

Secure web transmissions have become increasingly common. Initially, secure transactions were primarily used with e-commerce and banking websites. Recently, the desire for secure communication has migrated to services storing personal information, such as email and social networking sites. One reason for this is that new hacking exploits are frequently discovered, which threaten the security of user accounts and information on social networking services, email services, and the like. Through these exploits, malware, adware, spyware, or other software can be installed on thousands or millions of computers. Among other concerns, this malicious software may facilitate the theft of personal information.

These looming threats have placed an impetus on those who run major social networking and email services to force users to opt in to secure logins. Currently, due to awareness of these exploits, a small percentage of users have actually already opted in use secure connections where available. As users and service providers continue to switch over to secure transmission of content, various issues arise with respect to advertising content that may still be served in an unsecure manner.

For example, to avoid triggering warnings by a web browser, all of the content on such sites must be served securely via HTTP Secure (HTTPS) rather than HTTP. Most tags that one receives from an advertiser are transmitted over plain HTTP; thus, if they are served on a secure page, the user will see a browser warning, which may have a deterrent effect on the user's desire to view the page or the advertising content. It is therefore important that all advertisement calls on those websites are delivered securely to ensure users do not see security warnings in their browser. Accordingly, there is a need for a modernized online advertising platform that incorporates the secure serving of advertising content.

SUMMARY OF THE INVENTION

In various embodiments, an online advertising auction platform provides for the registration, auditing, and serving of secure creative content, and for real-time bidding among impression buyers of impressions requiring secure advertisements to be served.

Accordingly, in one aspect, a method for maintaining and delivering secure online content includes facilitating registration of secure content with an online content placement auction system, auditing the registered content to ensure security requirements for the registered content are met, and holding an auction among one or more bidders for placement of content in a secure online content space. The auction process includes receiving a call for secure content to be served in the content space, transmitting a bid request to one or more bidders in response to the call, receiving one or more bid replies from the bidders in response to the bid request, and determining a qualifying subset of the received bid replies having proposed content approved as secure. The bid request includes an indication that proposed content must be secure, and each bid reply includes a bid amount and proposed content to be securely served in the content space.

In one embodiment, facilitating registration of the secure content includes specifying a resource identifier for the secure content and/or source code of the secure content. A pixel resource identifier may also be specified for the secure content. In another implementation, facilitating registration of the secure content includes specifying a resource identifier for a non-secure version of the secure content and/or source code of the non-secure version. A pixel resource identifier may also be specified for the non-secure version.

In another embodiment, auditing the registered content comprises triggering a re-audit of the registered content upon detecting a modification to the resource identifier, the source code, and/or the pixel resource identifier.

In yet another embodiment, the secure content comprises secure advertising content to be securely served in an online impression space. The online content placement auction system may include a real-time bidding system for online advertising impressions.

In some implementations, the security requirements include a valid SSL certificate, a required encryption method, and/or a minimum encryption key length.

In one embodiment, holding the auction further includes determining a winning bid from the subset of qualifying bid replies, and causing the secure content associated with the winning bid to be securely served in the content space. Holding the auction may further include causing default secure content to be securely served in the content space upon determining the subset contains no qualifying bid replies.

In another aspect, a system for maintaining and delivering secure online content includes a registration module for facilitating registration of secure content with an online content placement auction system, a security module for auditing the registered content to ensure security requirements for the registered content are met, and an auction module for holding an auction among one or more bidders for placement of content in a secure online content space. In holding the auction, the auction module is configured to receive a call for secure content to be served in the content space, transmit a bid request to one or more bidders in response to the call, receive one or more bid replies from the bidders in response to the bid request, and determine a qualifying subset of the received bid replies having proposed content approved as secure. The bid request includes an indication that proposed content must be secure, and each bid reply includes a bid amount and proposed content to be securely served in the content space.

In one embodiment, facilitating registration of the secure content includes specifying a resource identifier for the secure content and/or source code of the secure content. A pixel resource identifier may also be specified for the secure content. In another implementation, facilitating registration of the secure content includes specifying a resource identifier for a non-secure version of the secure content and/or source code of the non-secure version. A pixel resource identifier may also be specified for the non-secure version.

In another embodiment, auditing the registered content comprises triggering a re-audit of the registered content upon detecting a modification to the resource identifier, the source code, and/or the pixel resource identifier.

In yet another embodiment, the secure content comprises secure advertising content to be securely served in an online impression space. The online content placement auction system may include a real-time bidding system for online advertising impressions.

In some implementations, the security requirements include a valid SSL certificate, a required encryption method, and/or a minimum encryption key length.

In one embodiment, holding the auction further includes determining a winning bid from the subset of qualifying bid replies, and causing the secure content associated with the winning bid to be securely served in the content space. Holding the auction may further include causing default secure content to be securely served in the content space upon determining the subset contains no qualifying bid replies.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

FIGS. 6A-6E show an exemplary user interface allowing inventory targeting.

FIG. 10 illustrates an exemplary cadence modifier table.

FIG. 13 is a diagram illustrating by example a set of auction tiers according to an embodiment of the invention.

FIG. 19 illustrates exemplary user interfaces for configuring creative content.

FIG. 22 illustrates exemplary user interfaces for managing secure ad tags.

DETAILED DESCRIPTION

1. Computer System or Advertising Platform

Figure 1:
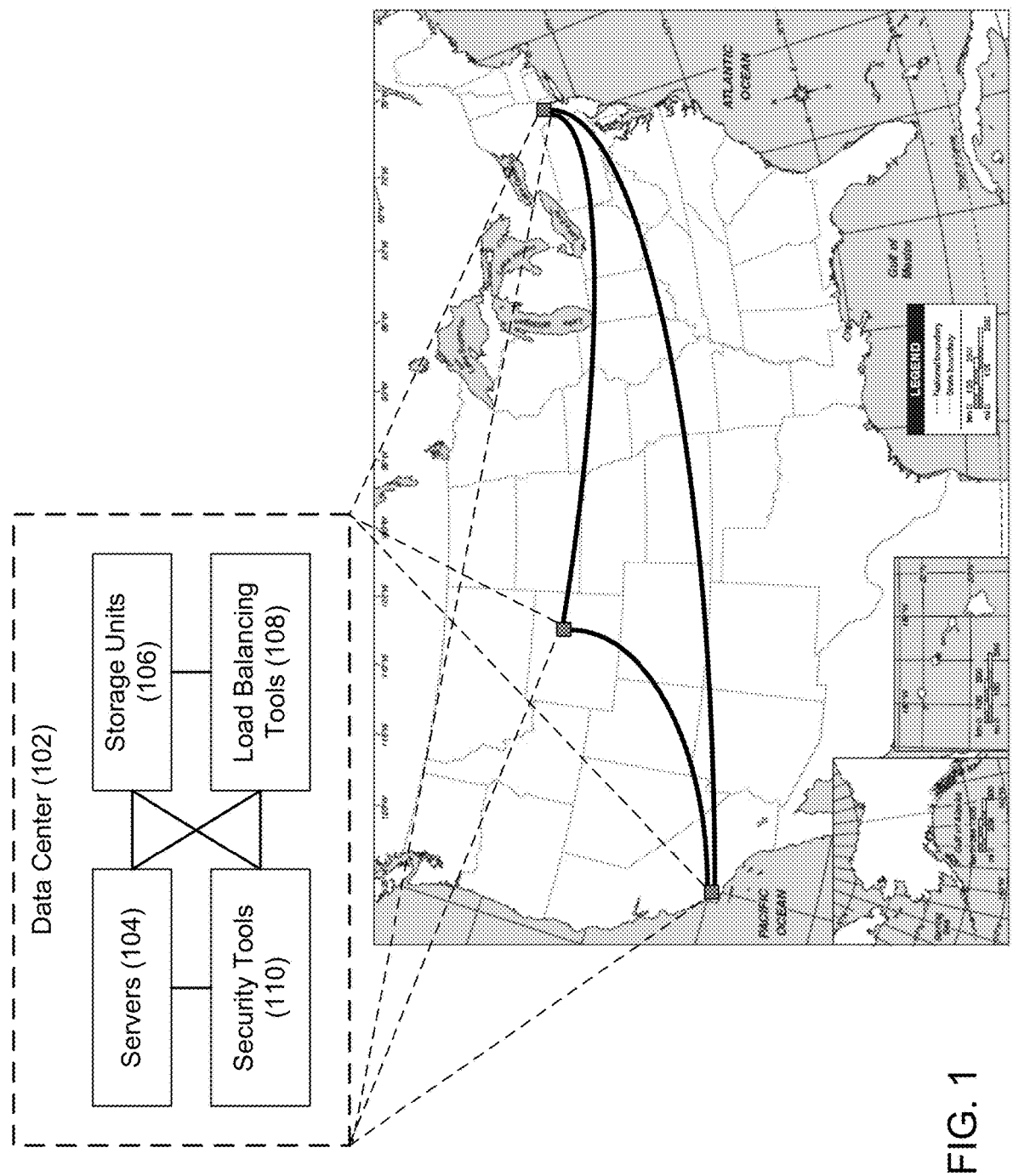
FIG. 1 shows an example of geographically dispersed multi-tenant enterprise data centers.
Figure 2:
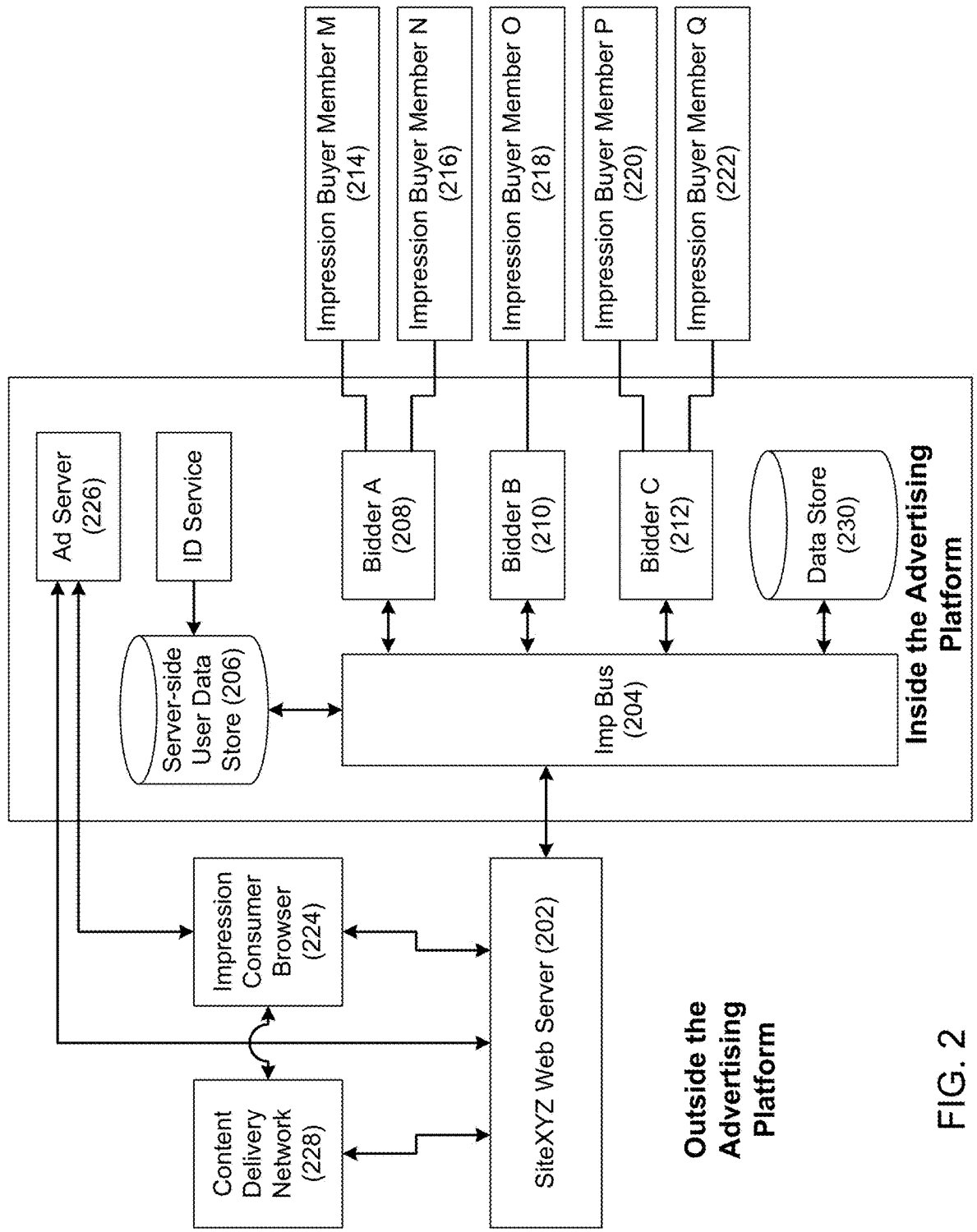
FIG. 2 shows a block diagram of an example advertising platform environment.
Figure 3A:
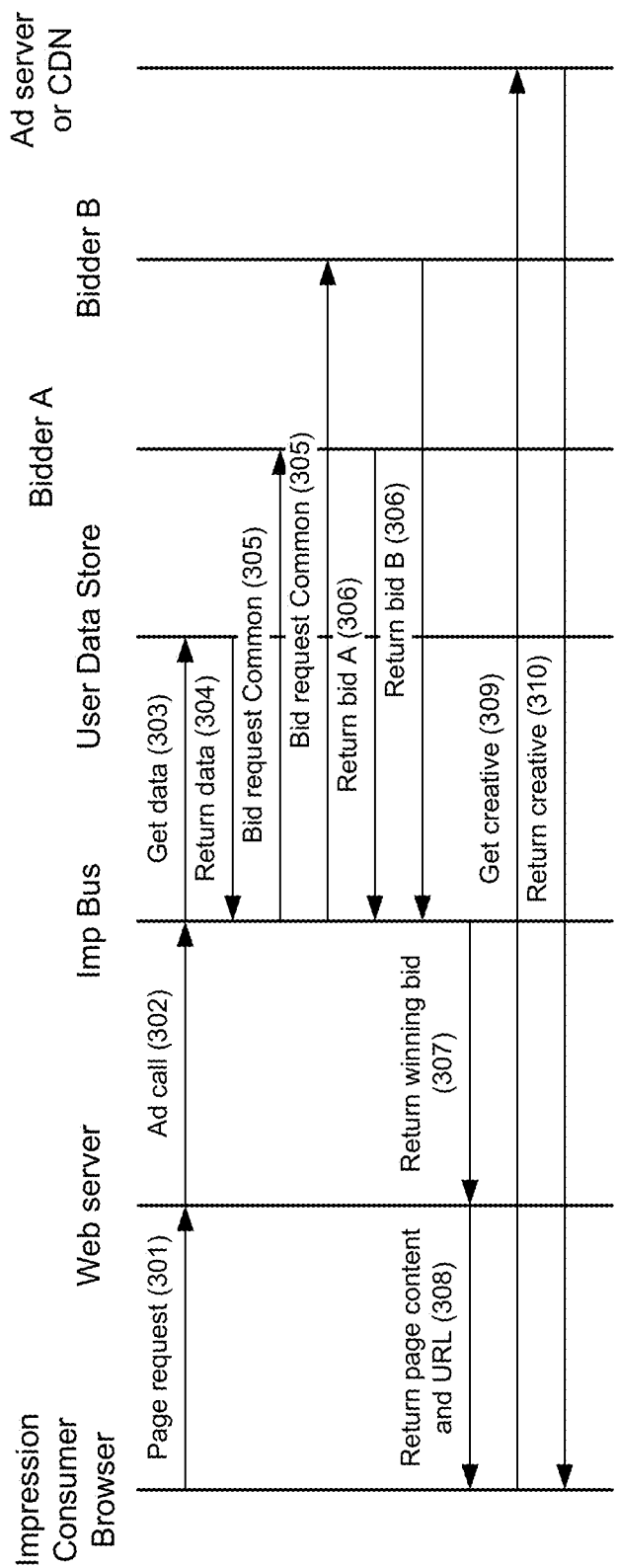
FIGS. 3A-3D each shows a ladder diagram of an exemplary use case.
Figure 3B:
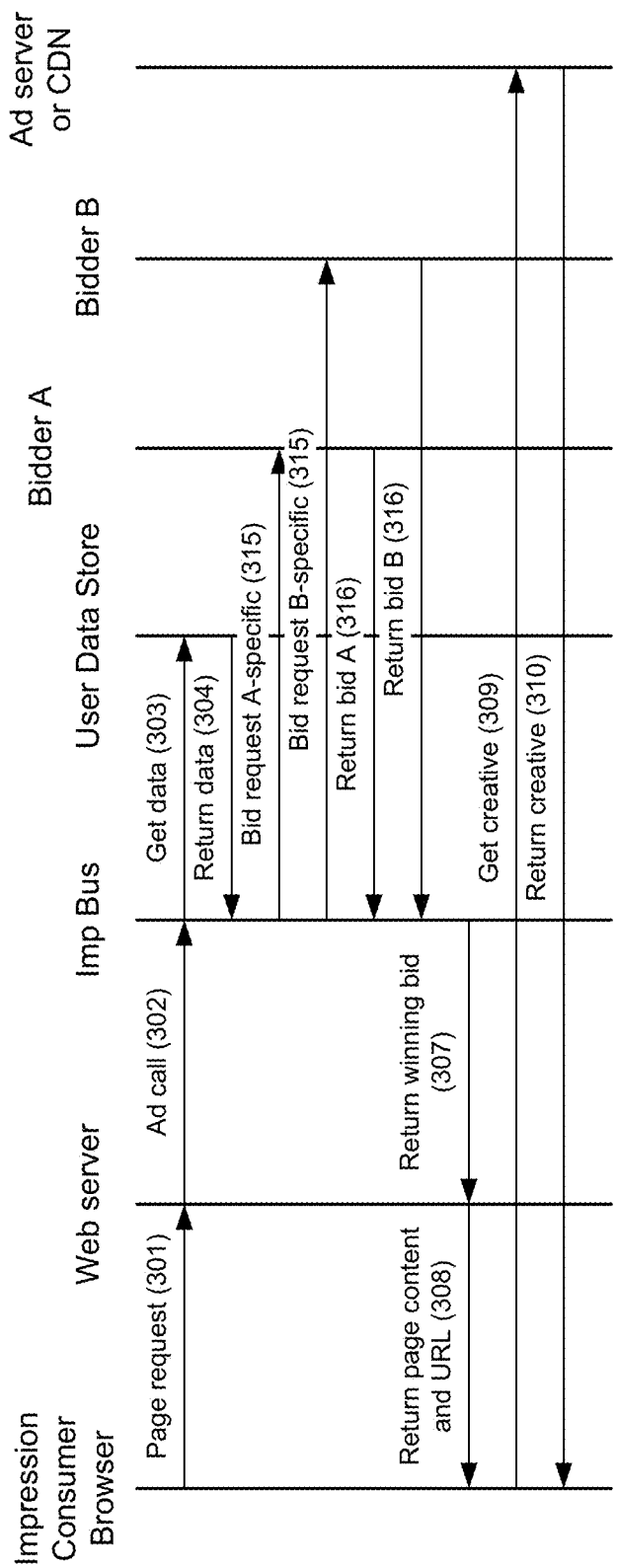
Figure 3C:
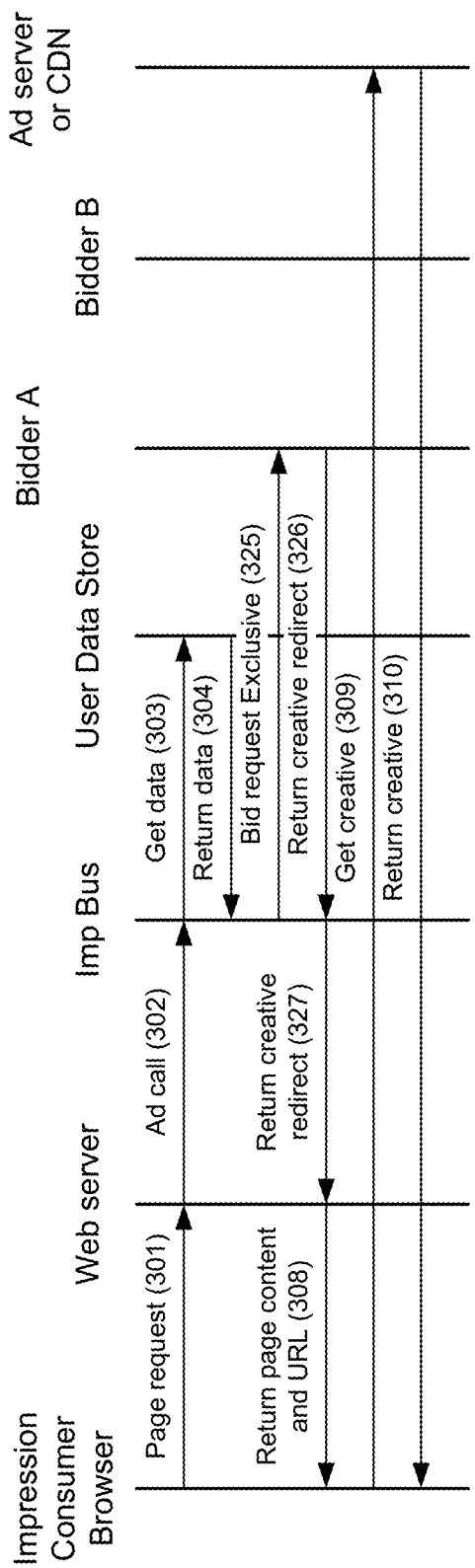
Figure 3D:
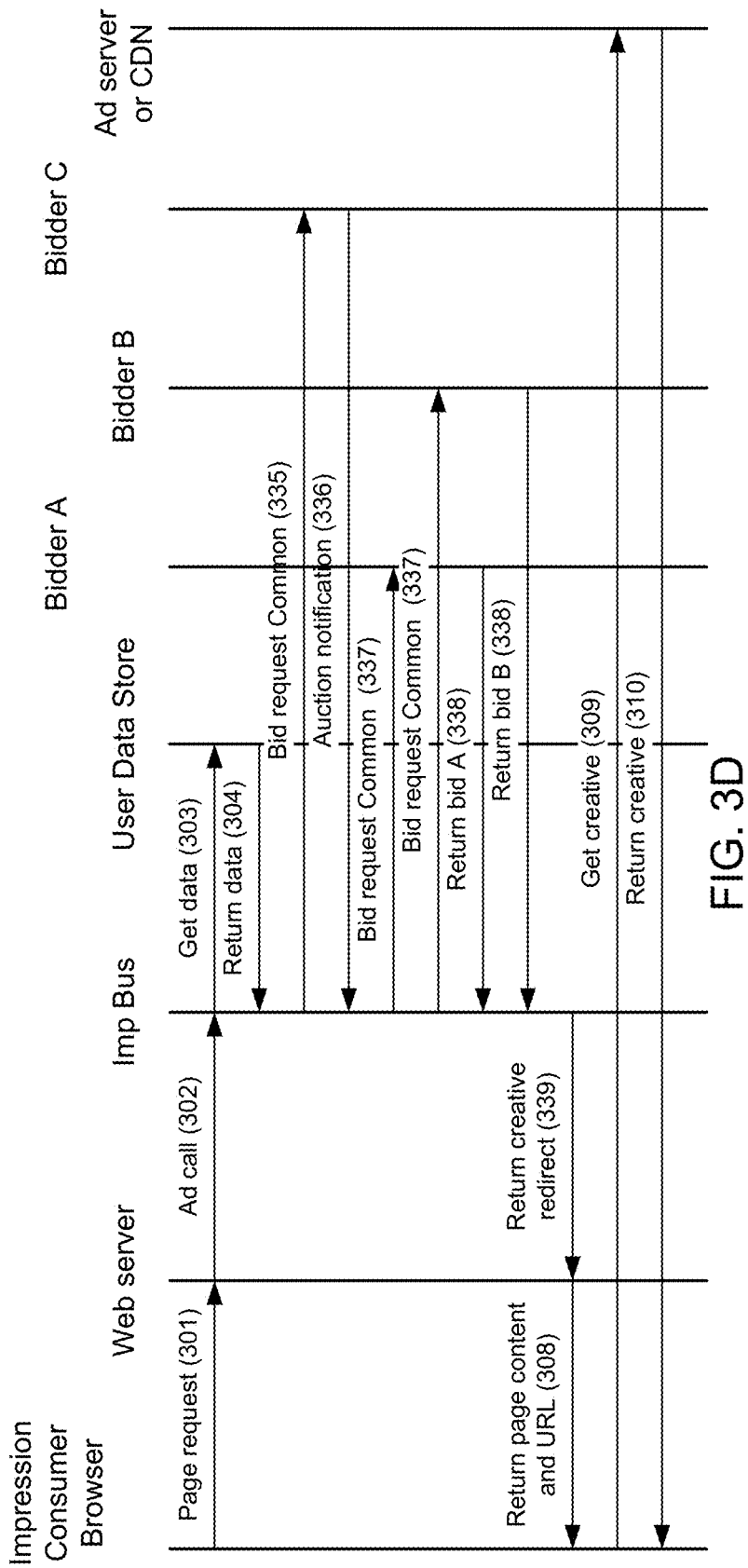

FIG. 1 shows geographically dispersed multi-tenant enterprise data centers 102 that are connected via one or more backbone providers (illustratively depicted by the heavy black lines). Each data center generally includes servers 104, load balancing tools 108 to manage traffic within a single data center and between multiple data centers, and for routing users to the fastest data center 102, storage units 106, and security tools 110 to protect each tenant's data and privacy. Other resources including power-, cooling- and telecommunication-related resources (not shown) are also included in each data center 102.

An infrastructure computer system for an advertising platform may be hosted on one or more of the data centers 102. This infrastructure ("advertising platform") provides an ecosystem ("cloud") in which entities associated with an impression trading industry may collaborate and share industry-specific information without the latency, bandwidth, and security issues typically associated with the public Internet. Such industry-specific information may include information associated with a user, a bidding provider, a member, a publisher page, a price, a creative, or some combination thereof.

The advertising platform includes servers 104 of the data center 102 that have been provisioned and deployed by data center tenants using application programming interface (APIs) specific to the advertising platform. In general, each server 104 that is provisioned and deployed by a tenant is reserved for the exclusive use of that tenant. Doing so provides some measure of predictability with respect to available resources, and provides an extra layer of security and privacy with respect to the tenant's data.

Various tenants of the data center 102 may assume different roles in the context of the impression trading industry. We describe each of these roles briefly as follows:

Advertising platform provider: An entity provisions and deploys a server 104 of the data center 102 to function as a transaction management computing subsystem (at times referred to in this description as a "platform impression bus" or simply "Imp Bus") that facilitates the transaction aspects of impression inventory trading. In general, the Imp Bus processes ad requests, feeds data to members, conducts auctions, returns ads to the publishers, keeps track of billing and usage, returns auction-result data, and enforces quality standards.

Impression seller member: An entity that sells impression inventory may provision and deploy a server 104 of the data center 102 to function as a web delivery engine that accepts HTTP(s) requests from web browsers operable by impression consumers. Such a web delivery engine may implement the following features: authentication and authorization request (e.g., request of username and password), handling of static and dynamic content, content compression support, virtual hosting, large file support, and bandwidth throttling, to name a few.

Impression buyer member: An entity that buys impression inventory may provision and deploy a server 104 of the data center 102 to serve creatives (e.g., in those instances in which creatives are stored on a storage unit 106 within the data center 102) or facilitate the serving of creatives (e.g., in those instances in which creatives are stored on an ad server or a content delivery network located on server outside of the data center 102). The entity may be an advertiser (e.g., Visa Inc.), an advertising network, an advertising agency (e.g., OMG National), an advertising exchange (e.g., Right Media Exchange by Yahoo! Inc.), or a publisher (e.g., MySpace).

Bidder: To buy impression inventory, each impression buyer member engages a decisioning computing subsystem (e.g., a bidder) to operate on its behalf. The term "bidder" generally refers to a piece of technology rather than an entity that operates it, and includes a bidding engine that takes various pieces of bid-specific information as input and generates a bid for a particular item of impression inventory on behalf of an impression buyer member. The advertising platform provides impression buyer members with a number of different bidder options, including:

a. Use a member-specific bidder: The advertising platform provider provides a source code skeleton and allows the impression buyer partner to apply its own secret optimization sauce to fill it in. In this case, the entity that buys impression inventory will further deploy a server 104 of the data center 102 to host a member-specific bidder for its exclusive use.

b. Use the hosted bidder: This bidder is designed, built, hosted, and maintained by the advertising platform provider and allows each impression buyer member to simply upload bid guides or modify basic parameters, such as user data, recency, location, etc. In some instances, multiple impression buyer members use the hosted bidder.

c. Use a Bidding Provider: A bidding provider is an entity that provisions and deploys a server 104 of the data center 102 to operate a bidder on behalf of one or more impression buyer members with which it is contractually engaged. The bidder operable by the Bidding Provider generally includes a proprietary optimization bidding engine.

Each tenant of the data center 102 may further assume additional or different roles than that described above.

The advertising platform also includes a cluster of high-performance storage units 106 of the data center 102. Data stored by a tenant on a storage unit 106 of the data center 102 may be accessed exclusively by that tenant, or shared with other tenants within the data center if so configured. The types of data that may be stored include advertising tags ("ad tags"), reserve price information, creatives, reserve creative information, cookie information, and market analysis information. Other information that may facilitate the trading of impression inventory within the platform may also be stored on storage units of the data center.

1.1 Impression Inventory and Ad Tags

The interactive nature of the Internet provides a number of advertising solutions that take advantage of the two-way communication and direct connections established between browser and content server for every user. Web pages, web-enabled video games, web-based broadcasts of multimedia programming, and web-enabled photo frames are just a few examples of the types of multimedia streams in which electronic advertisements may be injected. Traditionally, creatives (including still images and video advertisements) appear in ad spaces that are located within a web page. More recently, web-enabled video games have been coded to enable a creative to be dynamically loaded within an ad space of a game frame (e.g., in a billboard on the side of a highway of a car racing game, and in signage affixed to a roof of a taxi cab in a character role playing game). Similarly, web-based broadcasts of multimedia programming (e.g., a live broadcast or on-demand replay of a sporting event) may be coded to enable a creative to be dynamically loaded within an ad space of a broadcast frame (e.g., an ad space behind home plate during the broadcast of the sporting event) or within an ad space between broadcast frames (e.g., an ad space that coincides with a live commercial break). Web-enabled photo frames are generally configured to receive digital photos from photosharing sites, RSS feeds, and social networking sites through wired or wireless communication links. Other electronic content, such as news, weather, sports, and financial data may also be displayed on the web-enabled photo frame.

Each of the multimedia stream types described above provides a host of creative serving opportunities. To facilitate the transaction of impression inventory on the platform, an impression seller member (e.g., a publisher of a web site or a video game) may associate each creative serving opportunity with an ad tag. In general, an ad tag specifies information indicative of attributes of an ad space with which the ad tag is associated. In the case of an ad space within a web page, the ad tag may specify the language of the text displayed on the page, the nature (e.g., business, politics, entertainment, sports, and technology) of the content being displayed on the page, the geographical focus (e.g., international, national, and local) of the web page content, the physical dimensions of the ad space, and the region of the page the ad space is located. In the case of an ad space within a web-enabled video game, the ad tag may specify the video game category (e.g., role playing, racing, sports, puzzle, and fighting), the age appropriateness of the video game (e.g., via an Entertainment Software Rating Board (ESRB) rating symbol: early childhood, everyone, everyone 10+, mature, teen, and adults only), and the nature of the content being displayed within the game frame (e.g., via an Entertainment Software Rating Board (ESRB) content descriptor: alcohol reference, animated blood, crude humor, intense violence, language, mature humor, nudity, tobacco reference, and drug reference). In the case of an ad space within a web-based broadcast of multimedia programming, the ad tag may specify the language of the audio associated with the programming, the nature (e.g., business, politics, entertainment, sports, and technology) of the content associated with the programming, the geographical focus of the programming, and the time of day the programming is being broadcast live or the time period in which the programming is available on demand.

In some implementations of the advertising platform, a platform-specific ad tag may be generated and associated with ad space(s). In addition to the types of information described above, other types of information, such as a universal inventory identifier, a reserve price, and a list of approved universal advertiser identifiers, may also be associated with a platform-specific ad tag. The information associated with any given platform-specific ad tag may be specified server-side (e.g., tag_id=123&ad_profile_id=456)

or maintained within the platform by a server-side mapping (e.g., Imp Bus maintains a server-side mapping of tag_id=123 to ad_profile_id=456). In the latter case, once an ad space has been tagged, information associated with the platform-specific ad tag may be easily modified by adding or otherwise changing the information within the platform without having to re-tag the ad space.

Each universal inventory identifier uniquely identifies a multimedia stream within the platform. As an example, a "large" multimedia stream (e.g., the news website CNN.com) may be divided into multiple multimedia streamlets (e.g., CNN.com/entertainment, CNN.com/health, CNN.com/technology, and CNN.com/travel), where each multimedia streamlet is assigned a universal inventory identifier within the platform. By contrast, a "small" multimedia stream (e.g., the news website BostonHerald.com) may be assigned only one universal inventory identifier. The inclusion of a universal inventory identifier within a platform-specific ad tag enables bidders to refer to impression inventory associated with a particular multimedia stream in a common way. The size of the impression inventory associated with a multimedia stream is not the only factor in determining whether a multimedia stream is assigned one universal inventory identifier or multiple universal inventory identifiers. Other factors, such as the multimedia stream brand, may also be in play. For example, a single universal inventory identifier may be assigned to a "large" multimedia stream (e.g., web pages with a myspace.com domain name) based on its brand identity.

In some cases, a multimedia stream or some aspect of it includes impression inventory that is designated within the platform as "direct" inventory. In general, direct inventory refers to impression inventory that is part of a pre-existing media buy. Such a media buy is typically established by way of a contractual agreement between an impression seller member and an impression buyer member. The contractual agreement specifies the specific impression inventory that is subject to an exclusive first right of refusal on the part of the impression buyer member, and the reserve price that bidders other than the bidder operating on behalf of the impression buyer member must meet in order to take the impression inventory away. This process will be described in more detail below with respect to the exemplary use cases in the following section.

In some cases, a multimedia stream or some aspect of it includes impression inventory that may only be acquired by certain impression buyer members, or more specifically, impression buyer members that serve a specific brand of ad creatives. In such cases, a bidder performs an offline process that synchronizes creatives and/or brands that are approved or banned to run on the impression inventory with a specific ad profile ID that is subsequently passed along on the bid request.

1.2 Ad Creatives

Ad creatives for various campaigns may be stored in storage units of the data center that function as an ad server for an impression buyer partner or hosted on ad servers and content delivery networks outside of the platform.

In some implementations of the advertising platform, an impression buyer partner is required to provide information that characterizes each ad creative that may be served responsive to ad calls from the platform, and store such information within the platform. Such information may include attribute information that characterizes the type, dimensions, and content of the ad creative, and information (e.g., a redirect to a content delivery network) that identifies where the ad creative can be retrieved from. In other implementations of the advertising platform, it is merely recommended that such information be stored within the platform and therefore accessible by the bidder acting on behalf of the impression buyer partner with minimal latency during the real-time bidding process (described in more detail below). In still other implementations of the advertising platform, the advertising platform provider itself looks at the creatives and supplies any of these attributes.

1.3 Creative Approval

In some embodiments, the creatives that are served in response to ad calls from the advertising platform conform to requirements, such as legality, decency, and common sense. For instance, creatives that promote gambling; depict libelous, violent, tasteless, hate, dematory, or illegal content; portray partial or complete nudity, pornography, and/or adult themes or obscene content; are deceptive or purposely mislabeled; or spawn pops, simulate clicks, or contain malicious code, viruses, or executable files are generally not permitted.

Some publishers may prefer the creatives that are served to their inventory to comply to even more restrictive standards, for instance in order to maintain the reputation of the publisher's brand or to avoid promoting a rival. To simplify and speed the creative approval process for publishers, a list of preapproved creatives may be generated and maintained by a creative auditing computing subsystem on the advertising platform. When creating ad profiles, impression seller members can search for and/or elect to automatically approve creatives on this list, thus effectively outsourcing initial creative approval to a platform-based audit. For instance, the platform-based audit may review creatives for features such as having a meaningful and easily discernable brand or product offering; rotating images but not rotating brands or products; and having a brand on a platform-based list of approved brands. Additionally, the platform-based audit may prohibit creatives offering sweepstakes, giveaways, quizzes, surveys, or other brand-less games. If a brand is not discernable in a creative, it will not be approved and will run only on a member's exclusive inventory. Creatives that are modified after they have been audited will return to a 'pending' status until they can be audited again. In some instances, advertisers may be charged a nominal fee in order to have their creatives audited.

Impression seller members (e.g., publishers) may also review and approve creatives on a case-by-case basis by creating an ad profile. If no default ad profile is created for a publisher, all creatives will be allowed to run on the publisher's domain. An ad profile includes three elements: members, brands, and creatives. Member- and brand-level approval standards can be used to reduce the number of creatives that need to be explicitly approved. For instance, when setting up the ad profile, a publisher may choose "trusted" for members and brands that the publisher believes will always present acceptable ads. If a member or brand is marked as "trusted," all creatives of that member or brand will run by default, mitigating the need to audit each of that member's/brand's creatives. However, the publisher can override this default by reviewing the creatives and banning individually any creatives of the trusted brand. The publisher may mark other members or brands as "case-by-case," meaning that none of the creatives of that member or brand will run until explicitly approved by the publisher. The publisher may also mark members or brands as "banned," in which case none of the creatives of the banned member or brand will be shown. If a member or brand is banned, there is no ability to override the ban and approve a specific creative without knowing and searching for an individual creative ID. In some instances, a separate ad profile is created for each advertising campaign. The ad profiles are stored by the transaction management computing subsystem in an impression seller data store associated with the corresponding impression seller member and updated upon receipt of a new or updated profile. For more granular control over quality standards, the publisher may also approve and ban at the level of individual creatives. To review specific creatives, the publisher can search for creatives using specific criteria. A preview of the creative will appear and the publisher selects whether to approve or ban the creative.

1.4 Inventory Approval

Similarly, in some embodiments, publishers are required to conform to certain standards of legality, decency, and common sense. For instance, publishers that embody any of the following characteristics are generally not permitted to participate in the advertising platform: desktop applications, download accelerators, non-website based widgets and/or toolbars; gambling (free, paid, or gateway to paid gambling); libelous, violent, tasteless, hate, defamatory, or illegal content; or nudity, pornography, and/or adult themes or obscene content; peer to peer, bit torrent, or other websites facilitating illegal file sharing; proxy sites facilitating anonymous web browsing; sites enabling or permitting illegal activities and/or copyright infringement; or Warez or mp3 downloads.

Inventory may be grouped into predefined lists such that bidder clients can make decisions about a large amount of inventory simply by knowing the group to which the inventory belongs. The site that each impression that passes through the Imp Bus belongs to is on a single class list. The list to which a particular site and its corresponding impression belongs is communicated along with the ad call to each bidder participating in an auction. Individual bidders are then free to make their own decisions about whether to bid on that impression.

For instance, inventory may be categorized as Class 1, Class 2, unaudited or Black List. Class 1 inventory has been audited by a platform-based auditor and represents many of the most popular publisher brands on the Internet. Each of the URLs on the Class 1 list has a minimum monthly volume, e.g., 100,000 impressions per month, and is certified to pass global inventory content standards. The Class 1 list is intended to be completely safe for any brand advertiser to purchase. Class 1 inventory does not contain sites that feature user-generated content or social media. Bidders accept Class 1 inventory by default.

Class 2 inventory includes inventory that has been audited but does not meet the Class 1 volume or content criteria, but does meet the global inventory content standards. Social networking content is included in Class 2 inventory. For instance, myspace.com, although a top publisher that by volume satisfies the Class 1 criteria, is placed on the Class 2 list because it is social media. Bidders accept Class 2 inventory by default. If a bidder has chosen not to accept Class 2 inventory but also owns a Class 2 publisher, the bidder will receive its own Class 2 traffic.

All other inventory that passes through the Imp Bus is assigned the unaudited inventory label. Sites remain categorized as unaudited until audited and assigned to another categorization. To ensure maximum advertiser brand protection, bidders by default do not accept unaudited inventory; however, a flag can be set to enable unaudited inventory if desired. If a bidder does not accept unaudited inventory but owns an unaudited publisher, the bidder will receive its own unaudited traffic.

Inventory contained in the Black List violates inventory content standards and has been prohibited (i.e., it will never reach the auction marketplace). If the inventory originates from a Price Check tag (discussed in greater detail below), the inventory will be redirected to be handled by other demand sources. If the impression originates from a TinyTag (discussed in greater detail below), the ad server will return no content to the browser, essentially blanking the ad space.

1.5 Multi-Tenant Server-Side User Data Store

In some implementations of the advertising platform, a multi-tenant user data store (also referred to in this description as a "server-side user data store") is provisioned within the platform by a first user data store management component to enable members of the impression trading industry to synchronize their user data information with a common set of platform-specific user IDs.

Each platform-specific user ID of the server-side user data store is stored in association with data, some of which may be specific to a particular impression consumer (e.g., data characterizing the impression consumer). In general, data that is stored in association with a platform-specific user ID is supplemented and appended to over the course of time as the impression consumer interacts with web delivery engines within the platform.

In some implementations, all data stored in association with a platform-specific user ID may be shared between all tenants of the data center(s). In other implementations, mechanisms may be put in place to limit access to the data stored in association with a platform-specific user ID based on certain criteria. For example, certain impression trading industry members may have contractual agreements that specify exclusive sharing of data stored in association with a particular set (or sets) of platform-specific user IDs regardless of which web delivery engine a content request is directed to. In another example, an impression trading industry member may specify that all data stored in association with a particular set (or sets) of platform-specific user-ids may be shared with respect to a particular set of web delivery engines, some of which may be associated with other impression trading industry members.

In one specific implementation, user data information stored in association with a platform-specific user ID is formed by multiple segments of key-value pairs, where one or more key-value pairs may define each segment. Access permissions may be associated with one, some, or all of the segments to control which member(s) access (e.g., read and/or write) the user data information of respective segments.

One issue that may arise following the serving of ads to a single impression consumer by impression seller partners located in geographically dispersed data centers is "synching collision." Synching collision occurs when multiple impression seller members attempt to simultaneously sync their user data information with a particular segment of key-value pairs that defines the user data information stored in association with a particular impression consumer's platform-specific user-id. This is best described with an example.

A user 12345 has two browser windows open, one pointing to a landing page of www.SiteAAA.com, which is hosted on a web server ("SiteAAA web server") located in New York City, N.Y., and the other pointing to a landing page of www.SiteBBB.com, which is hosted on a web server ("SiteBBB web server") located in San Jose, Calif. Each web server makes an ad call to the platform when the user 12345 navigates to respective pages of www.SiteAAA.com and www.SiteBBB.com, each of which includes at least one creative serving opportunity. This has the effect of causing the advertising platform to receive two impression requests for user 12345, one from the SiteAAA web server, which gets routed to the platform's New York City data center, and the other from the SiteBBB web server, which gets routed to the platform's Los Angeles, Calif. data center. Each of the platform's data centers includes a server-side user data store that has in it a variable global-frequency associated with user-id=12345.

Suppose, at time t=0, the global-frequency key-value pair of a user's impression frequency counter for user-id=12345 is "25". Traditionally with cookies, the global-frequency is set to a fixed value. Synching collision occurs when two impression requests are received nearly simultaneously and a "set global-frequency to 26" notification is sent responsive to both impression requests. In other words, only one of the impression requests is logged in the user data store even though two are received. To avoid this situation, the advertising platform is implemented to send an "increment global frequency by 1" notification responsive each of the impression requests. Returning to the example above, the New York City data center will increment the global-frequency key-value pair for user-id=12345 to "26" to account for the ad call received from www.SiteAAA.com and transmit a message to the Los Angeles data center to apply the same logic; the Los Angles data center will increment the global-frequency key-value pair for user-id=12345 to "27" to account for the ad call received from www.SiteBBB.com and transmit a message to the New York City data center to apply the same logic. In this manner, even though the messages are processed in different order on each site the final result is the same. That is, the global-frequency key-value pair for user-id=12345 goes from "25" to "27". User data store information is replicated consistently across multiple data centers.

1.6 Multi-Tenant Client-Side User Data Store

Each bidder is assigned a section of cookie space, known as a client-side user data store, in each user's browser. A bidder may freely push and pull data into or out of its own client-side user data store on each impression or pixel call. The data pushed into a particular bidder's client-side user data store is passed into requests for that bidder only, unless data contracts exist to allow the sharing of data with other bidders. However, when data is stored client-side by an advertiser outside of the user data store associated with the advertising platform provider, that data is inaccessible during an ad call, because the advertising platform domain, rather than the advertiser domain is accessing the cookie. For this reason, data stored by the bidder is preferably stored synchronously in the client-side user data store by piggybacking a pixel call from the advertising platform.

In some implementations, user data is passed to the client-side user data store using a JavaScript Object Notation (JSON) mechanism. The advertising platform provider will execute a JavaScript function stored in each bidder's server-side context store and store the results in that bidder's section of the user's client-side user data store. Strings, integers, vectors, hash tables, and combinations of these may be stored and manipulated server side using a fully featured programming language such as JavaScript 1.8.1.

More particularly, a bidder's user data is stored in the user's cookie as a JSON object. During a bid request, the JSON object is forwarded to the bidder. If no JSON object exists, an empty object "{ }" may be returned. The JSON object is parsed for reading using libraries provided by the advertising platform provider. Instead of creating a new JSON object to send back to the client-side user data store, a bidder includes in the bid response a call to a predefined JavaScript function stored in association with that bidder. The JavaScript function, which operates on a global variable containing the user data, is executed by the Imp Bus, and the results are stored in the client-side user data store. In some embodiments, the advertising platform provider may provide functions for use or customization.

For instance, a bidder may wish to track the number of times a creative has been shown to a particular user or the most recent time an ad was shown to that user. In response to receipt of a notification that a creative has been served, a predefined function provided by the advertising platform provider may enable frequency and recency variables associated with that user to be incremented.

In some embodiments, each data provider or bidder has its own scheme for internally identifying users. In order to enable integration between the bidder and the Imp Bus, the bidder-specific user ID for each user is mapped to the platform-specific user ID for the same user.

In general, the platform-specific user ID is stored in a client-side user data store, such as in a client-side browser cookie. The mapping between bidder user ID and platform-specific user ID may exist in the bidder's data store, the server-side cookie store of the advertising platform, or both. In some instances, the bidder's user IDs are stored within the bidder's reserved section of the client-side user data store. In this case, the bidder's user ID is included in each request the bidder receives from the Imp Bus, such as bid requests and pixel requests. In other instances, the mapping information is stored within the bidder's data store. In this case, when impression or pixel requests are received by the bidder related to a platform-specific user-id, the bidder looks up the mapping information in its own data stores.

2. In Operation

Referring also to FIGS. 2 and 3A-3E, in some examples, an impression seller member hosts a web site (e.g., "SiteXYZ.com") on a web server ("SiteXYZ web server" 202). The web site provides a number of creative serving opportunities, each of which is associated with a platform-specific ad tag.

A request for a page of SiteXYZ.com that is generated by an impression consumer's web browser is received (301) by the SiteXYZ web server 202. If the requested page includes one or more creative serving opportunities, the web server 202 makes an ad call (302) to the platform by redirecting the page request to the Imp Bus 204. The Imp Bus 204 examines a browser header of the page request to determine if a platform-specific user ID is included therein.

In the following sections, we describe a number of exemplary use cases following an ad call to the platform. Actions taken by various actors within the platform are tagged with respective reference numerals. To minimize the repetition of textual description, we may at times in the following sections cite a reference numeral as shorthand for an action that may be taken by an actor within or outside the platform.

2.1 Use Case #1 (FIG. 3A): Known Impression Consumer, No Restrictions on Data Sharing, Open Platform-Based Auction If a platform-specific user ID (e.g., User ID 1234) is found within the browser header, the Imp Bus 204 deems the page request as originating from a "known" impression consumer, and retrieves (303, 304) from a server-side cookie store 206 within the platform, data that has been stored in association with the platform-specific user-id.

Let us assume for this use case that none of the creative serving opportunities on the requested page is restricted (e.g., the platform-specific ad tag does not specify a list of approved universal advertiser identifiers) with respect to impression buyer members that may win an open platform-based auction to serve a creative. Let us further assume that data retrieved from the server-side cookie store may be shared between impression trading industry members without constraints.

The Imp Bus 204 or transaction management computing subsystem generates a bid request that provides a multi-faceted characterization of each creative-serving opportunity of the requested page. In some implementations, there is a one-to-one correspondence between creative-serving opportunities and bid requests, i.e., a bid request is generated for each ad tag associated with the requested page. In some implementations, the multiple ad tags associated with the requested page are handled in a single bid request.

In general, the bid request includes information that characterizes the impression consumer (e.g., based on data retrieved from the server-side cookie store), the ad space (e.g., based on information associated with the platform-specific ad tag itself, such as data uniquely identifying the impression seller member, an impression inventory identifier, an impression inventory categorization identifier, or a universal impression inventory identifier; or data characterizing the impression, the impression seller member, the impression inventory source (venue), or an impression inventory category), and an auction identifier. Because there are no constraints placed on the sharing of data between impression trading industry members, one bid request (e.g., Bid request Common 305) may be generated and sent to all bidders 208, 210, 212.

The Imp Bus 204 sends (305) the bid request to each bidder 208, 210, 212 within the platform. The information included in the bid request is used (at least in part) by a bidding engine of each bidder 208, 210, 212 or a decisioning processor of a decisioning subsystem to generate a real-time bid response on behalf of an impression buyer member 214, 216, 218, 220, 222 with which the bidder 208, 210, 212 is associated, and return (306) the bid response to the Imp Bus 204. At a minimum, the bid response identifies a bid price, determined, for instance, using optimization techniques; and a creative that is to be served should the bid be identified as the winning bid of a platform-based auction. Recall that a bidder (e.g., Bidder A 208) may be associated with multiple impression buyer members (e.g., Impression Buyer Member M 214 and Impression Buyer Member N 216). In such instances, the bidding engine may be operable to conduct an internal auction to identify a winning bid from amongst the eligible campaigns of its associated impression buyer members, and to generate a bid response for the platform-based auction based on the result of the internal auction.

The Imp Bus 204 or transaction management computing subsystem identifies a winning bid from amongst the bid responses returned by the bidders 208, 210, 212 or decisioning subsystems within a predetermined response time period (e.g., measured in milliseconds). Although in most instances, the "winning bid" is the bid associated with the highest dollar value, and the "best price" for a creative serving opportunity is the price that yields the highest revenue for the impression seller member, there are instances in which the "winning bid" and the "best price" are based on other metrics, such as ad frequency. If the winning bid response is associated with a creative that has not been approved by the impression seller member, the second-ranked bid response is selected. The Imp Bus 204 returns (307) a URL that identifies a location of a creative of the winning bid to the SiteXYZ web server 202. In the depicted example, the SiteXYZ web server 202 returns (308) to the impression consumer's web browser 224 the requested page, which is embedded with an impression tracking mechanism that causes the impression consumer's web browser 224 to first point to the Imp Bus (for use by the Imp Bus in counting the impression as served) and subsequently cause the impression consumer's web browser 224 to retrieve (309, 310) the ad creative to be served from an ad server 226 within the platform or a server of a content delivery network 228. In another example, the SiteXYZ web server 202 returns to the impression consumer's web browser the requested page, a first URL that points to the ad creative to be served, and a second URL that points to the Imp Bus (for use by the Imp Bus in counting the impression as served).

2.2 Use Case #2 (FIG. 3B): Known Impression Consumer, Some Restrictions on Data Sharing, Open Platform-Based Auction The Imp Bus performs actions (303, 304) as described above.

Let us assume for this use case that restrictions have been placed on the sharing of data retrieved from the server-side cookie store 206 between some of the impression trading industry members. For each impression trading member, the Imp Bus 204 examines the restrictions to identify the subset of data retrieved from the server-side cookie store that may be shared with that impression trading member. For each creative serving opportunity of the requested page, the Imp Bus 204 generates an impression trading member-specific bid request (e.g., Bid request A-specific and Bid request B-specific) that provides a multi-faceted characterization of that creative serving opportunity. In general, the bid request includes information that characterizes the impression consumer (e.g., based on the subset of data retrieved from the server-side cookie store that may be shared with that impression trading member), the ad space (e.g., based on information associated with the platform-specific ad tag itself), and an auction identifier.

The Imp Bus 204 sends (315) the appropriate bid request to each bidder 208, 210, 212 within the platform, which acts on the bid requests in a manner similar to that described above and returns (316) bid responses to the Imp Bus 204. The Imp Bus 204 identifies a winning bid from amongst the bid responses returned by the bidders 208, 210, 212, and returns (307) a URL that identifies a location of a creative of the winning bid to the SiteXYZ web server 202. Actions (308, 309, 310) are performed as described above to effect the delivery of an ad creative.

2.3 Use Case #3 (FIG. 3C): Known High Value Impression Consumer, No Platform-Based Auction The Imp Bus 204 performs actions (303, 304) as described above.

The Imp Bus 204 examines each platform-specific ad tag found within the browser header to determine whether the corresponding creative serving opportunity on the requested page is part of a particular impression buyer member's pre-existing media buy. For each creative serving opportunity on the requested page that is part of an impression buyer member's pre-existing media buy, the Imp Bus 204 generates a bid request (e.g., Bid request Exclusive) that provides a multi-faceted characterization of that creative serving opportunity and directs (325) that bid request to the bidder (e.g., Bidder B 210) within the platform that is operating on behalf of that particular impression buyer member (e.g., Impression Buyer Member O 218).

The bidder (in this example, Bidder B 210) that receives the bid request examines the information that characterizes the impression consumer to determine the value of the impression consumer to the impression buyer member (in this example, Impression Buyer Member O 218) for whom the creative serving opportunity constitutes a pre-existing media buy. If the value of the impression consumer exceeds a predetermined threshold, the bidder (in this example, Bidder B 210) selects a creative from a campaign associated with the impression buyer member (in this example, Impression Buyer Member O 218) for whom the creative serving opportunity constitutes a pre-existing media buy, and returns (326) to the Imp Bus 204 a redirect identifying the location of the selected creative. The Imp Bus 204 sends (327) this redirect to the SiteXYZ web server 202. Actions (308, 309, 310) are performed as described above to effect the delivery of an ad creative.

2.4 Use Case #4 (FIG. 3D): Known Low Value Impression Consumer, No Restrictions on Data Sharing, Constrained Platform-Based Auction The Imp Bus 204 performs actions (303, 304) described above. In this example, data retrieved from the server-side cookie store 206 may be shared between impression trading industry members without constraints.

The Imp Bus 204 examines each platform-specific ad tag found within the browser header to determine whether the corresponding creative serving opportunity on the requested page is part of a particular impression buyer member's pre-existing media buy. For each creative serving opportunity on the requested page that is part of an impression buyer member's pre-existing media buy, the Imp Bus 204 generates a bid request (e.g., Bid request Common) that provides a multi-faceted characterization of that creative serving opportunity and directs (335) that bid request to the bidder (in this example, Bidder C 212) within the platform that is operating on behalf of that particular impression buyer member (in this example, Impression Buyer Member Q 222). In general, the bid request includes information that characterizes the impression consumer (e.g., based on data retrieved from the server-side cookie store), the ad space (e.g., based on information associated with the platform-specific ad tag itself), and an auction identifier.

The bidder (in this example, Bidder C 212) that receives the bid request examines the information that characterizes the impression consumer to determine the value of the impression consumer to the impression buyer member (in this example, Impression Buyer Member Q 222) for whom the creative serving opportunity constitutes a pre-existing media buy. If the value of the impression consumer does not exceed a predetermined threshold, the bidder returns (336) the Imp Bus 204 an auction notification which includes a redirect that identifies a location of a reserve creative and a reserve price that other bidders must meet in order to take the creative serving opportunity away from the impression buyer member (in this example, Impression Buyer Member Q 222) for whom the creative serving opportunity constitutes a pre-existing media buy.

Because there are no constraints placed on the sharing of data between impression trading industry members, the Imp Bus 204 may send (337) the previously-generated bid request (e.g., Bid request Common—now considered a secondary bid request) to each of the other bidders (in this example, Bidder A 208 and Bidder B 210) within the platform. Each of those bidders examines the information that characterizes the impression consumer to determine the value of the impression consumer to its associated impression buyer members (in this example, Impression Buyer Member M 214 and Impression Buyer Member N 216 are associated with Bidder A 208, and Impression Buyer Member O 218 is associated with Bidder B 210), and optionally generates a bid response to be returned (338) to the Imp Bus 204.

The Imp Bus 204 first eliminates from contention those bid responses having a bid price that fails to meet or exceed the reserve price included in the auction notification. If all of the returned bid responses are eliminated, the Imp Bus 204 sends (339) the redirect that was included in the auction notification to the SiteXYZ web server 202. If, however, at least one of the returned bid responses meets or exceeds the reserve price included in the auction notification, the Imp Bus 204 identifies a winning bid, and returns (339) to the SiteXYZ web server 202 a redirect that identifies a location of a creative of the winning bid. Actions (308, 309, 310) are performed as described above to effect the delivery of an ad creative.

Suppose, for example, that the impression buyer member (in this example, Impression Buyer Member Q 222) is an advertising agency and the creative serving opportunity on the requested page is part of the impression buyer member's pre-existing media buy for a first advertiser or advertising network. The advertising agency may choose to have its bidder (in this example, Bidder C 212) conduct an internal auction to identify a winning bid from amongst the eligible campaigns of the other advertisers and advertising networks associated with the advertising agency in those instances in which the value of the impression consumer to the first advertiser or advertising network does not exceed a predetermined threshold. Only if the winning bid resulting from the internal auction does not meet the reserve price set by the first advertiser or advertising network for that creative serving opportunity does the bidder (in this example, Bidder C 212) return to the Imp Bus 204 an auction notification as described above.

2.5 Bid Request

As described above, a bid request generally includes information that characterizes the impression consumer (e.g., based on data retrieved from the server-side cookie store), the ad space (e.g., based on information associated with the platform-specific ad tag itself), and an auction identifier. A bid request may further include the following information:

a. Members: If included, a bidder may only consider the campaigns and creatives associated with impression buyer members having identifiers included in the Members array of identifiers.

b. Userdata: The userdata attached to the user's cookie owned by the bidder receiving the request.

c. Frequency: The total number of impressions for this user across the platform.

d. Clicks: The total number of clicks for this user across the platform.

e. Recency: The number of minutes since the last impression for this user across the platform.

f. Session Frequency: The number of impressions in this session for this user.

g. Estimated Winning Bid Price: The price estimated to win the bid, based on predetermined and/or historical criteria (see below).

2.6 Bid Response

As described above, a bid response typically includes a bid price and a creative that are to be served should the bid be identified as the winning bid of a platform-based auction. A bid response may further include the following information:

a. Member ID: This is the identifier of the impression buyer member whose creative is chosen by the bidder from the "Members" array of identifiers in the bid request.
b. Exclusive: This flag ('yes' or 'no') indicates to the Imp Bus that the creative serving opportunity constitutes a pre-existing media buy and the creative provided in the bid response is to be served. No other bidders will be allowed to compete for the creative serving opportunity.
c. No bid: This flag ('yes' or 'no') indicates to the Imp Bus that the bidder has returned a valid response but has chosen not to bid.
d. Price: The price, expressed as a CPM, that the bidder is willing to pay for this impression. If exclusive, this is used only for reporting purposes; if not exclusive, this value represents a reserve set by the bidder.
e. Userdata: Data to attach to the user (by storing in association with the user's platform-specific user-id) if the bid response is selected as the winning bid.
f. Creative ID: The ID of the creative to be served if the bid response is selected as the winning bid.
g. Used Data Provider: Third-party data providers charge a fee when their information is used to target or optimize an ad. Contractually, bidders must accurately report this by setting the appropriate flag (used_3rdPartyA, used_3rdPartyB, etc) in the bid response.

2.7 Result Notification

At the conclusion of a platform-based auction, the Imp Bus 204 may be implemented to generate a result notification for each bidder 208, 210, 212 that submitted a bid response responsive to a bid request. The information included in a result notification may vary depending upon implementation and circumstance. Examples of such information include:

a. Auction ID: An auction identifier that uniquely identifies this particular auction from amongst all of the platform-based auctions that have taken place within the platform.
b. Transaction ID: A transaction identifier that uniquely identifies a transaction in the auction.
c. Valid Bid: This flag ("yes" or "no") reports to the bidder the receipt of a valid bid response.
d. No Bid: This flag ("yes" or "no") reports to the bidder the receipt of a no-bid response.
e. Impression Won: This parameter notifies the bidder as to whether its bid response resulted in a winning auction and impression served.
f. Impression Won/Deferred: This parameter notifies the bidder that its bid response resulted in a winning auction but serving of its impression is being deferred.
g. Winning Price: This value represents the bid price that won the auction. In some implementations, this parameter is excluded if the reserve price specified by the impression seller member is not met.
h. Bid Price: This value represents the bid price submitted by the bidder in this particular auction.
i. Estimated Winning Bid Price: This value represents a price that was estimated to win this particular auction, based on predetermined and/or historical bid data.
j. Member ID: This value identifies the impression buyer member for whom the bidder operated on behalf of in this particular auction. Typically, this value is provided to the Imp Bus in the bidder's bid response.
k. Bidder ID: This value identifies the bidder used in this particular auction.
l. Response Time: When provided, this value represents the number of milliseconds that elapsed between the sending of a bid request to a bidder and the receipt of a bid response from that bidder. This parameter is excluded if no bid response is received by the Imp Bus.
m. Revenue Generated: This value represents revenue generated by the sale of an impression.
n. Impression Consumer: This parameter reports information associated with the impression consumer or the impression consumer's web browser.
o. Impression Consumer's Response: This parameter reports information associated with the impression consumer's response to a creative that was served.
p. Impression: This parameter reports information associated with the impression or advertising space.
q. Creative: This parameter represents or characterizes the creative selected to be served.
r. Ad Tag: This parameter includes information associated with the ad tag.
s. Third-party ID: This parameter identifies any third-party data providers that contributed data towards the generation of a bid response.

The information provided in the result notification may be used by a bidder 208, 210, 212 or decisioning subsystem to fine tune or otherwise modify its bidding strategy to better position itself to win future platform-based auctions. Suppose, for example, that a bidder consistently loses a platform-based auction with a bid of $2.00 for a car buyer on nytimes.com/autos. By examining the "Winning Price" information provided in the result notification, the bidder may tweak its future bid price to maximize its potential to win such a platform-based auction without overpaying for the impression. Similarly, by examining the "Response Time" information provided in the result notification, the bidder may determine that its bid response is being received outside of the predetermined response time period set by the Imp Bus 204 and tweak its bidding algorithm to accelerate the rate at which its bid response is generated and returned to the Imp Bus 204.

A bidder can also pass the Imp Bus 204 or transaction management computing subsystem additional information (e.g., a user ID, a user frequency, a campaign ID) to be passed back to the same bidder during a result notification. This additional information can also be useful to the bidder or to the impression buyer member to manipulate bidding strategy or to understand the results of an ad campaign.

2.8 Transparency

From the advertising platform provider's standpoint, there are advantages to preventing impression trading industry members from obtaining detailed information about any one particular impression consumer or creative serving opportunities within the platform. For example, this minimizes the potential for an impression trading industry member to sign up to transact on the platform for a short period of time simply for the purposes of obtaining detailed information about impression consumers, and quitting after a sufficient amount of detailed information has been obtained. To that end, the Imp Bus 204 may be configured to filter the information that is passed between the various impression trading industry members during the course of transaction platform-based auctions.

In Use Case #2, we described a scenario in which restrictions have been placed on the sharing of data retrieved from the server-side cookie store between some of the impression trading industry members. In this use case, for each impression trading member, the Imp Bus 204 examines the restrictions to identify the subset of data retrieved from the server-side cookie store that may be shared with that impression trading member, and generates an impression trading member-specific bid request that includes information that characterizes the impression consumer (e.g., based on the subset of data retrieved from the server-side cookie store that may be shared with that impression trading member).

Here, we describe another way in which the Imp Bus 204 or transaction management computing subsystem may filter the information that is retrieved from the cookie store. In one implementation, the Imp Bus 204 analyzes the entirety of the data retrieved from the cookie store or user data store 206 and provides a somewhat abstracted version of the retrieved data in each impression trading member-specific bid request. Suppose, for example, the retrieved data includes information about the impression consumer's gender, age, zip code, income, and behavioral data. Further suppose, for example, that bidder A previously pushed information into the cookie store to identify this particular impression consumer's gender (gender=male), income (income=$138,000), and behavioral data (behavioral data=likes fishing, likes hunting) only; bidder B previously pushed information into the cookie store to identify this particular impression consumer's age (age=28), zip code (zip code=02130), and behavioral data (behavioral data=buys ski gear) only; bidder C has never pushed information into the cookie store with respect to this impression consumer. Other information in the user data store may have been provided by a third-party data provider, an impression buyer member, and/or an impression seller member. For bidder A, the Imp Bus 204 may generate an impression trading member-specific bid request that includes gender=male, age=25-35; zip code=North East USA; income=$138,000, and behavioral data=likes fishing, likes hunting, likes winter sports. For bidder B, the Imp Bus 204 may generate an impression trading member-specific bid request that includes gender=male, age=28; zip code=02130; income=$100,000-$199,999, and behavioral data=likes outdoor sports, buys ski gear. For bidder C, the Imp Bus may generate an impression trading member-specific bid request that includes gender=male, age=25-35; zip code=North East USA; income=$100,000-$199,999, and behavioral data=likes outdoor sports, likes winter sports. Each bidder is provided detailed information that it has itself pushed to the cookie store via a feedback mechanism through the platform, but is only provided an abstracted version of the remaining information that is retrieved from the cookie store.

In addition to providing an abstracted version of the data retrieved from the cookie store, the Imp Bus 204 may also provide an abstracted characterization of the creative serving opportunity. For example, in lieu of specifying the URL of the page being requested (e.g., http://lodgeatvail.rockresorts.com/info/rr.gcchalet.asp) by the impression consumer's web browser, the Imp Bus 204 may simply provide in the bid request an identifier of a category of the page and site (e.g., high-end ski resort). More generally, the Imp Bus 204 may provide data characterizing an impression, an impression seller member, an impression inventory source (venue), and/or an impression inventory category. In some embodiments, the Imp Bus 204 sends a data retrieval request to an inventory management subsystem operable to manage impression inventory information across multiple venues. One example of a scenario in which it is advantageous to obfuscate the creative serving opportunity is as follows: a publisher has a sales force that is tasked with identifying impression buyer members with which to establish a contractual relationship that defines a media buy. An impression buyer member that is aware of the opportunity to obtain this publisher's impression inventory at a lower price through platform-based auctions may choose to bypass the publisher's sales force altogether and take its chances on the open market. This has the effect of reducing the number of media buys that are established between the publisher and the impression buyer member and/or altering the financial worth of the media buy from the publisher's perspective.

In some embodiments, the Imp Bus 204 may provide data uniquely identifying the creative serving opportunity, including data uniquely identifying an impression seller member, an impression inventory identifier, an impression inventory categorization identifier, a universal impression inventory identifier, and/or a universal resource locator.

2.9 Estimated Minimum Price Reduction

In some examples, after a platform-based auction, the Imp Bus 204 can pass a bid related to the platform-based winning bid and optionally location information for the creative (e.g., a URL, a JavaScript variable, a cookie) to a third-party system (e.g., an advertising exchange) to decide how to fill an ad call. In this scenario, the Imp Bus 204 functions as a participant on the third-party system, presenting a value related to the internal winning price and optionally the internal winning creative to compete against other advertisers to fill the original ad call.

Should the bid passed by the Imp Bus 204 be chosen as the winner by the third-party system, the ad call would be passed back to the Imp Bus and the winning bidder's creative would be served.

The Imp Bus 204 can use a rule, or a set of rules, to determine the value of the bid that is passed to the third-party system. A well-chosen value will both help the bid to be competitive in future auctions held by third parties and help the impression seller member earn higher revenue from the bid.

As an example of how a pricing strategy can affect future auctions, consider if a bidder representing Toyota® bids $5 and a bidder representing MasterCard® bids $3 for a particular impression in a platform-based auction. Suppose the Imp Bus 204 is implemented with a standard second price auction mechanism. In such a scenario, the winning bid is a price equal to the second-highest bid, which is $3. If the bid of $3 is passed on to a second ad exchange that is operating its own auction mechanism, the $3 bid would lose to a $4 bid, even though Toyota® was willing to pay $5 for the impression. Alternatively, suppose the Imp Bus 204 is implemented to pass on the highest bid from the platform-based auction to a second ad exchange or to a second platform-based auction. In such a scenario, the $5 bid would beat a $4 bid. However, if the platform-based auction performed by the Imp Bus 204 had required Toyota® to pay only $3, the publisher would lose a dollar.

To mitigate these issues, the Imp Bus 204 can use smarter rules that are better informed by market data to determine what amount to pass on for a winning bid. Instead of passing a value of a winning bid that is equal to the second-highest bid or to the second-highest bid plus a fixed (or variable) percentage, the Imp Bus 204 can implement an estimated price reduction mechanism that is determined by observing historical bids and their success or failure in the third-party system.

In some examples, after an ad call arrives, the Imp Bus 204 can estimate a bid price that is likely to win the ad using analytics on impressions over time, including one or more of user frequency, time of day, publisher's site, or other information. The bid price estimate may also be based on a dynamically varying probability threshold value dependent on a high success rate criterion such as an estimated clear price (ECP; e.g., a success rate of 70-80%) or a moderate success rate criterion such as an estimated average price (EAP; e.g., a success rate of 40-50%). In some instances, the ECP and EAP are determined based on historical data of win rate as a function of price, such as using a bid curve plotting the historical data. The estimated price can automatically be included in the bid request that is sent to bidders, allowing the bidders to make a more well-informed decision to bid above or below the estimated price. While a bid below this threshold may be submitted to third-party systems, the risk of losing the auction in the publisher's ad server would be greater than if the bid were greater than or equal to the estimated price. If the winner's bid is above the estimated price, the bid price sent on to the next auction can equal either the second-highest bid or the estimated price, whichever is higher. If, instead, the winner's bid is below the estimated price, the bid price can equal the winning bid (i.e. no price reduction).

As an example, suppose an ad call for the nytimes.com is to be decided by a third-party system. In a first-round auction, the estimated clear price for this ad call is calculated by the Imp Bus 204 to be $4. The two highest bids for this auction are $5 by Diesel® and $6 by Armani®. Armani® wins the auction and the Imp Bus 204 sends a bid of $5 for Armani® to the third-party system for the next auction. As another example, suppose that instead, the two highest bids for the nytimes.com auction had been $3 by Diesel® and $5 by Armani®, the estimated price still at $4. Armani® wins the auction and the Imp Bus 204 sends a bid of $4 for Armani® to the third-party system for the next auction. As another example, suppose that instead, the two highest bids for the nytimes.com auction had been $2 by Diesel® and $3 by Armani®, the estimated price still at $4. Armani® wins the auction and the Imp Bus 204 sends a bid of $3 for Armani® to the third-party system for the next auction.

In some examples, estimated prices can be used outside the context of an actual auction in order to help develop a bidding strategy.

3. Integration with Third-Party Systems

Figure 5A:
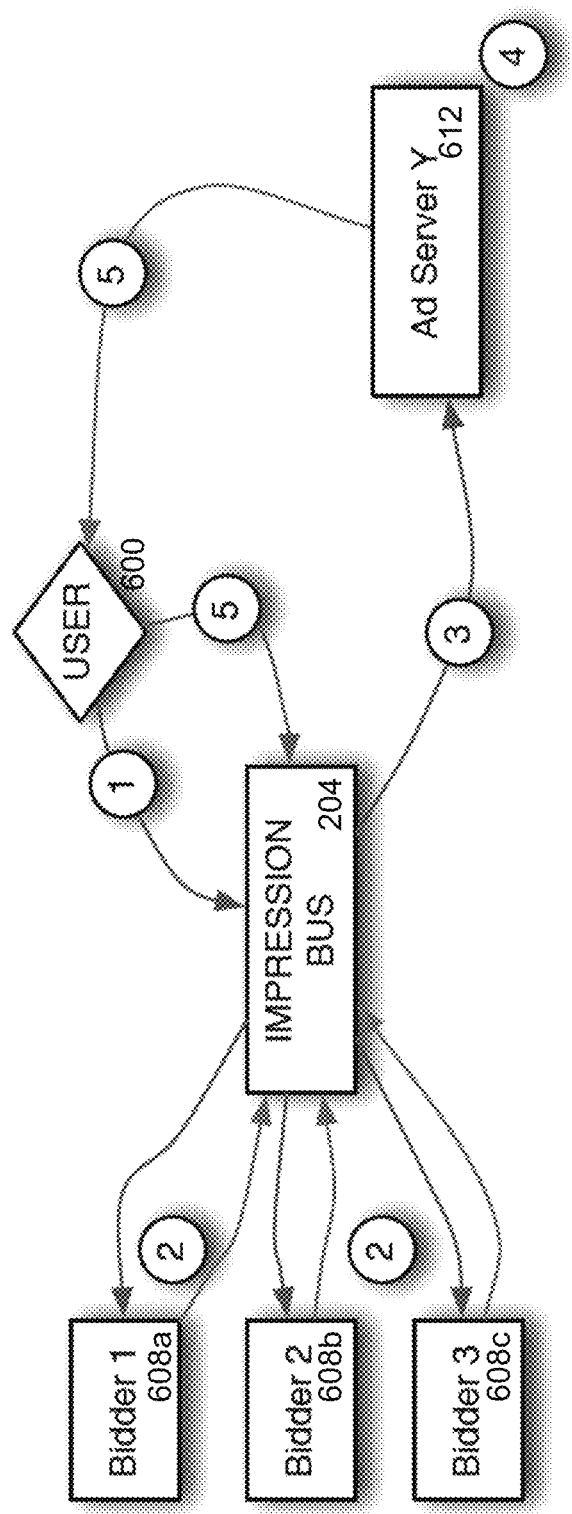
FIGS. 5A and 5B are flow charts for ad calls.

In some examples, tenants of the data center 102 participate in auctions held by third-party systems (e.g., ad exchanges, publisher ad servers) in addition to interactions with the Imp Bus 204. For instance, referring to FIG. 5A, a user 600 generates an ad call to Imp Bus 204 (step 1). The ad call may be, for instance, a preemptible call ("/pt call") that is used to integrate with a third-party ad server capable of performing query string targeting but is unable to make server side calls. The Imp Bus sends bid requests to bidders 608a, 608b, 608c and receives corresponding responses (step 2). The Imp Bus then redirects user 600 to a third-party ad server 612 (step 3) as specified in the referring URL appended to the ad call. Imp Bus 204 inserts a price or price bucket (described below) into the URL via macros. In some examples, a creative is also inserted into the URL; in other instances, the creative is not passed and is instead stored within the browser cookie. Third-party ad server 612 compares the bid received from Imp Bus 204 with internal bids and guaranteed campaigns associated with the /pt tag (step 4). Based on a combination of price and delivery priority, which is a black box algorithm with respect to Imp Bus 204, third-party ad server 612 selects and serves a creative to user 600 (step 5). In the event that the creative passed from the Imp Bus 204 is served, an "lab" call is generated to notify the Imp Bus of successful delivery of the creative (step 5').

Figure 5B:
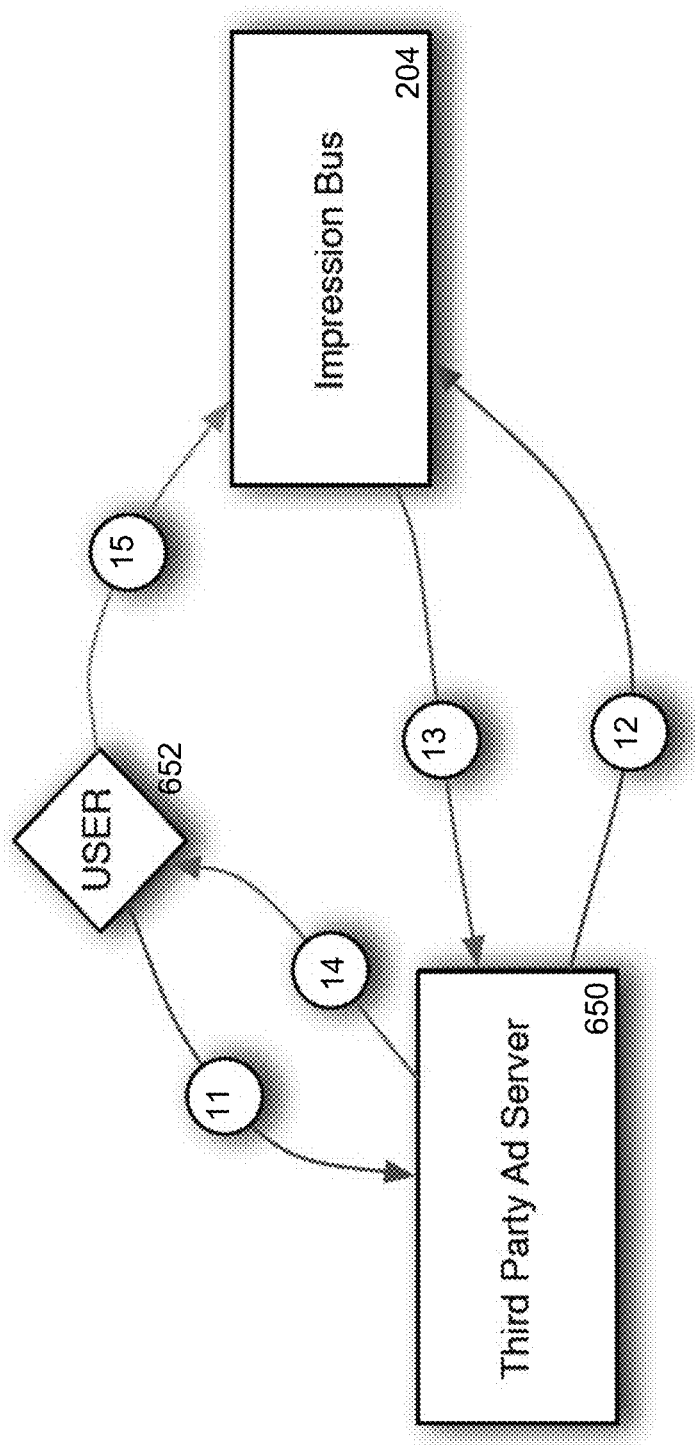

Referring to FIG. 5B, in other examples, a user 650 visits a page with a third-party ad tag (step 11). A third-party ad server 652 gathers user information and sends the information to Imp Bus 204 (step 12). The Imp Bus conducts an auction as described above and returns a creative URL, an auction id, and a bid to third-party ad server 652 (step 13). Third-party ad server 652 writes the auction ID and an "/acb" URL to user 650's cookie so that, if user 650 is shown the creative supplied by Imp Bus 204, the impression may be properly tracked. Third-party ad server 652 selects a creative to serve to user 650 and delivers the ad (step 14). In the event that the creative passed from the Imp Bus 204 is served, an "lab" call is generated to notify the Imp Bus of the third-party auction win (step 15).

In order to ensure a smooth integration with third parties, the Imp Bus 204 passes information, such as a bidding price or a creative, in a format accepted by the known third party (e.g., Right Media Exchange, Google Ad Manager, Double Click, OpenX). Profiles can be created for impression seller members (e.g., publishers) who routinely interact with known third-party systems.

Some third-party systems only accept key-value pairs (e.g., "price=10") that do not encapsulate dollar values. For example, if "price=$1.0594" is passed from the Imp Bus 204 to the Right Media Exchange, the value may not be correctly interpreted for an auction model. To avoid this problem, a tenant can assign small price ranges called "price buckets" to inventory in order for a bid from the Imp Bus 204 to be properly interpreted by a third-party system. The passed prices can be averages and can be edited manually to target campaigns. For example, the Imp Bus 204 can pass "price=10" to the Right Media Exchange and then target a campaign to the key-value pair "price=10" with a CPM of $0.10.

In some examples, priorities can be used instead of price in a third-party system. In a system based on a priority metric, a tenant can create a waterfall of priorities. For example, a campaign targeting "anprice=50" (which represents a payout of $0.50) would be prioritized between the $0.60 existing campaign and the $0.40 existing campaign. The waterfall can appear as follows:

---
3.00 AppNexus anprice=300 campaign
2.80 Existing campaign
2.60 Existing campaign
2.50 AppNexus anprice=250 campaign
2.40 Appnexus anprice=240 campaign
2.30 Appnexus anprice=230 campaign
2.20 AppNexus anprice=220 campaign
2.20 Existing campaign
...
---

When an existing campaign and the AppNexus campaign are the same price, the AppNexus campaign should be prioritized higher if possible in order to maximize revenue from that price point.

Both impression seller members and impression buyer members can create their own price buckets to be used for transactions. For example, an impression seller partner that also participates on the Right Media Exchange can create 20 price buckets ranging from $0.10 to $2.00 in $0.10 increments, in which the price specifies how much will be paid per 1000 impressions. Alternatively or in addition, a publisher (e.g., CNN.com) can create the following price buckets (in units of cents): 0, 10, 12, 14, 16, 18, 20, 22, 24, 26, 28, 30, 35, 40, 45, 50, 60, 70, 80, 90, 100, 110, 120, 130, 140, 150, 160, 170, 180, 190, 200. In either of the previous examples, the values used for the price buckets can be changed as feedback is obtained from the outcomes of auctions.

Third-party systems may specify a preference for the format in which a creative or the price buckets is received. For example, some ad servers may prefer a creative to be presented as a URL, while others prefer that a creative is stored in a cookie or a header (e.g., a JavaScript variable). For example, suppose an impression buyer member, AdCompany123, is selling creatives to three different third-party systems, each with a different preference for how a creative is delivered.

If one of the third-party systems, Exchange ABC, does accept a creative in the form of a URL, an example URL that can be passed by the Imp Bus 204 to Exchange ABC is as follows:
http://ib.adnxs.com/pt?id=1&redir=http %3A//www.SiteXYZ.com/preemp.php%3Fbidprice %3D{BIDPRICE} %26bidurl %3D{BIDURLENC}
in which the macro {BIDPRICE} is replaced with a value from a price bucket and the macro {BIDURLENC} is replaced with a creative URL to be served if the bid is accepted by Exchange ABC.

If another of the third-party systems, Exchange DEF, does not accept a creative as a URL, {BIDURLENC} is not included and instead, the call from the ad server (which in this case is www.SiteXYZ.com.preemp.php) can be http://ib.adnxs.com/acb?member=1&width=728&height=90 and the "/acb" call can read a user's cookies to find a cookie that matches the three criteria of member number, width, and height. Additional or alternative criteria can be included in an ad server call. In some examples, price bucket information can also be stored in the user's browser (e.g., as part of a cookie). Once a match has been made and if the bid has been accepted, Exchange DEF can serve the ad to the user.

If the final one of the three third-party systems, Exchange MNO, does not accept a creative as a URL and prefers a header-based storage to a cookie, {BIDURLENC} is not included and the creative can be stored as a javascript variable: an_ads['a300×250']=http://ib.adnxs.com/ab/. In such a scenario, the ad server (e.g., www.SiteXYZ.com/preemp.php) can make the following call:

```
<script>
document.write('<script type="text/javascript" src="'
+ unescape(an_ads["a300x250"]) + '"></scr' + 'ipt>');
</script>
``` in which "a300×250" can be a predetermined key for that particular placement and may not necessarily include size information of the creative. Price bucket information can also be stored as a javascript variable.

In any of the three examples given above, the Imp Bus 204 can represent an impression buyer, AdCompany123, to a third-party system (e.g., Right Media Exchange). The Imp Bus 204 can be integrated with the ad server of the impression buyer in part by changing an existing alias or a canonical name (CNAME) to point to the Imp Bus instead of or in addition to the impression buyer itself.

Currently, many companies of a third-party system (e.g., Right Media Exchange) have a CNAME set up to ad.yieldmanager.com. This allows the company to give out ad tags which look like "http://ad.siteXYZ.com/st?id=123&size=728×90" instead of "http://ad.yieldmanager.com/st?id=123&size=728×90". By changing the CNAME to point to ib.adnxs.com, the Imp Bus 204 can run an auction, interpreting the existing parameters and redirect the impression to yieldmanager such that the new impression looks like: ad.siteXYZ.com->ib.adnxs.com->ad.yieldmanager.com In some examples, as part of the redirect, the Imp Bus 204 can add a correct query string parameter in order to perform additional processes (e.g., perform a price check auction). Due to the CNAME change, the Imp Bus 204 has to correctly interpret (or correctly redirect) non-impression information as well (i.e., pixel calls, or non-standard calls to the alias).

4. Inventory Targeting

An impression buyer may wish to target certain inventory for a given advertising campaign. For instance, a campaign to promote a brand that appeals to young men may wish to display creatives predominantly on websites containing content of interest to that demographic. As another example, an advertising campaign for a children's brand may wish to avoid displaying creatives on websites containing adult content or unmoderated user-generated content.

Referring to FIGS. 6A-6E, an impression buyer uses a user interface 60 to establish certain inventory targeting parameters for an advertising campaign.

4.1 Inventory Source Targeting

An impression buyer can choose to target only impression inventory provided from certain venues. For instance, referring to FIG. 6B, an advertising campaign can select venues for managed or direct inventory. In some cases, inventory can be targeted generally by publisher; in other cases, inventory can be targeted more specifically by domain.

Figures 6A, 6B:
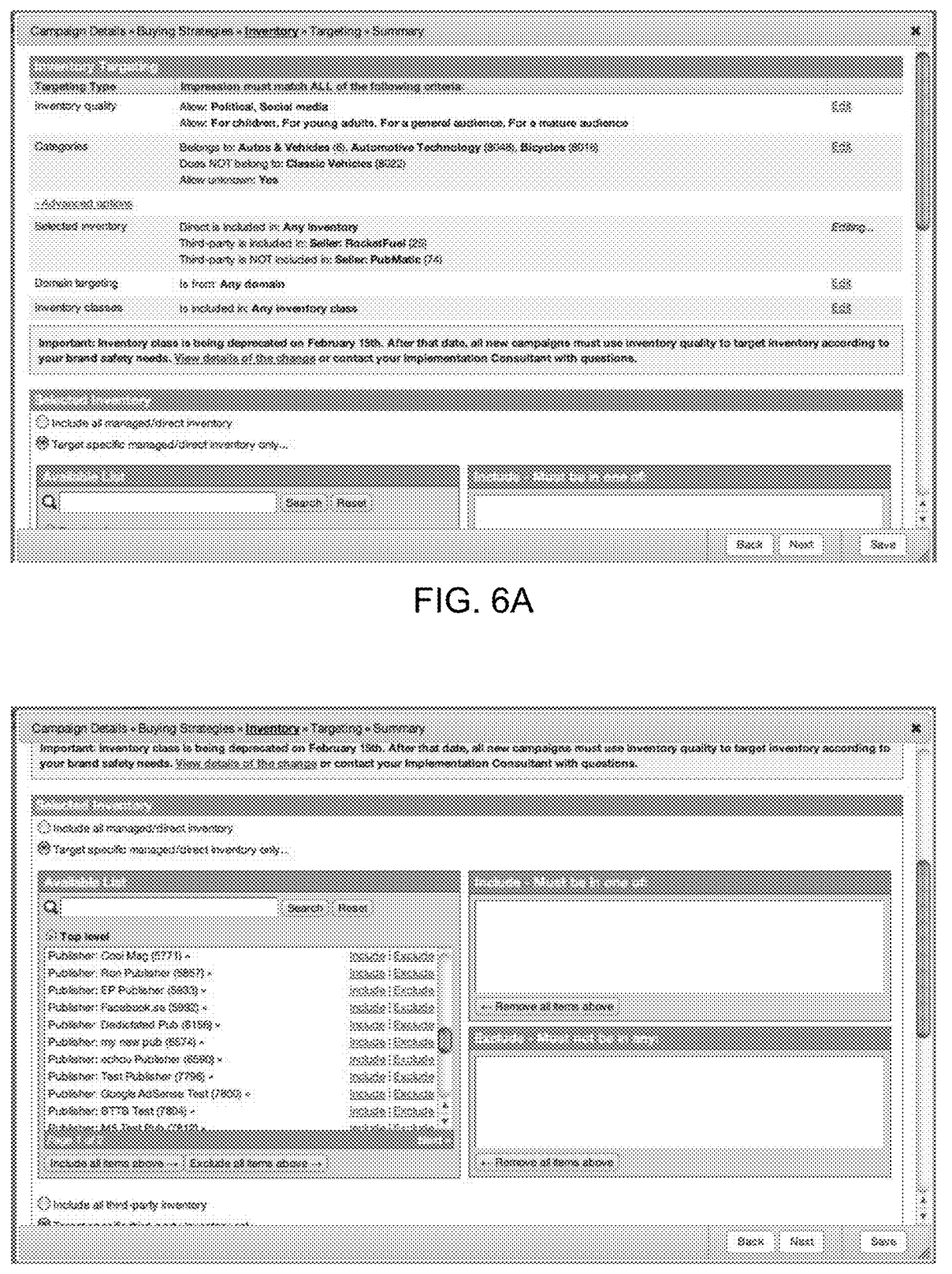
Figure 6C:
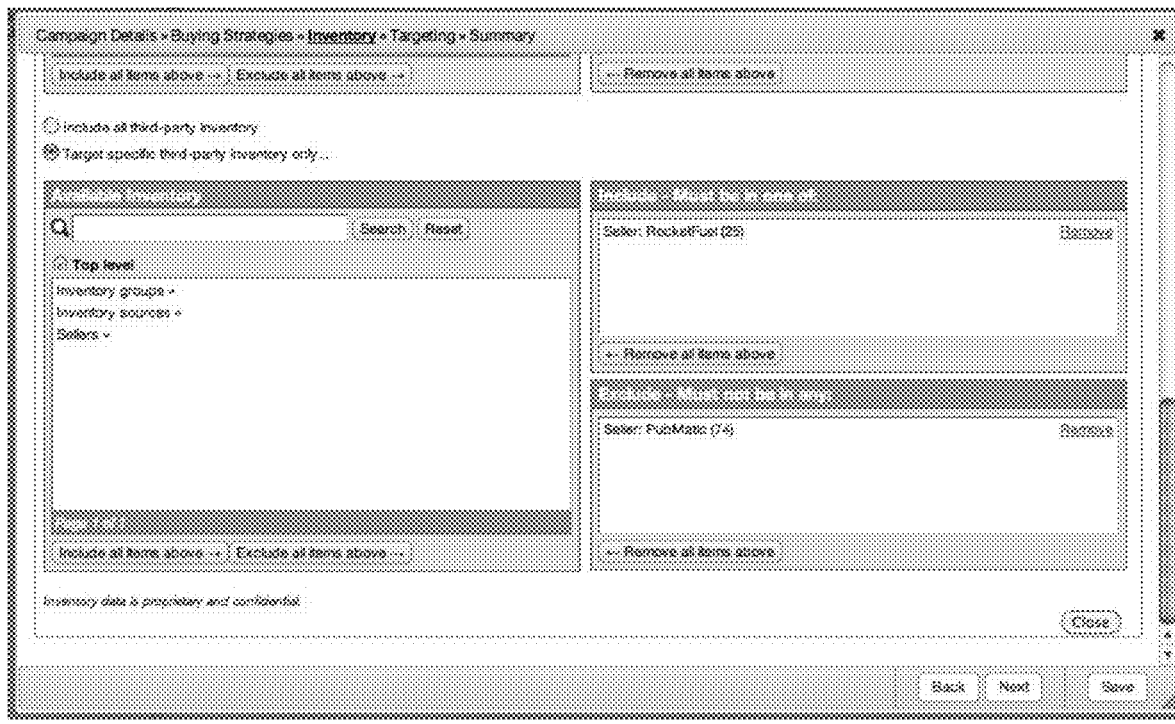

In some embodiments, third-party inventory is provided for sale on the advertising platform by an external advertising network, advertising exchange, or inventory aggregator (e.g., Right Media Exchange, Google Ad Manager, Double Click, or OpenX). Referring to FIG. 6C, third-party inventory can be selectively included in or excluded from an advertising campaign. In the example shown, inventory sold by RocketFuel is included in the campaign while inventory sold by PubMatic is excluded from the campaign.

4.2 Inventory Categories

Impression inventory is classified by content category. Exemplary content categories include, for instance, online community, arts and entertainment, games, internet and telecommunications, news, sports, business and industry, reference and language, shopping, computers and electronics, lifestyles, beauty and personal care, real estate, books and literature, autos and vehicles, food and drink, health, education, finance, pets and animals, travel, recreation, science, home and garden, and law and government.

In some cases, subcategories are specified within a content category. For instance, the autos and vehicles category may include the following subcategories: automotive technology, bicycles, boats and watercraft, campers and RVs, classic vehicles, commercial vehicles, concept vehicles, hybrid and alternative vehicles, locomotives and trains, motorcycles, off-road vehicles, performance vehicles, personal aircraft, and scooters and mopeds.

In a given advertising campaign, impression buyers may choose to bid only for inventory classified in certain content categories or subcategories, e.g., in order to access a target consumer group. For instance, an advertising campaign can be established to target all inventory classified as arts & entertainment, with the exception of inventory in the subcategories humor and fun & trivia.

Figure 6D:
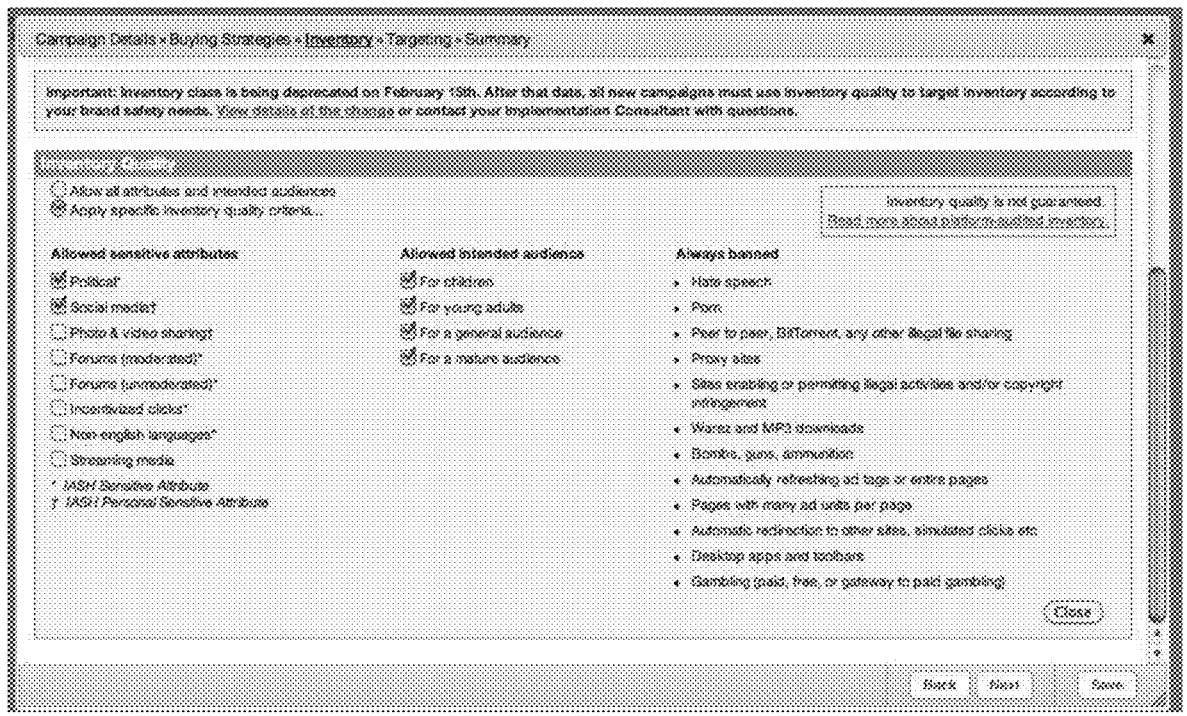
Figure 6E:
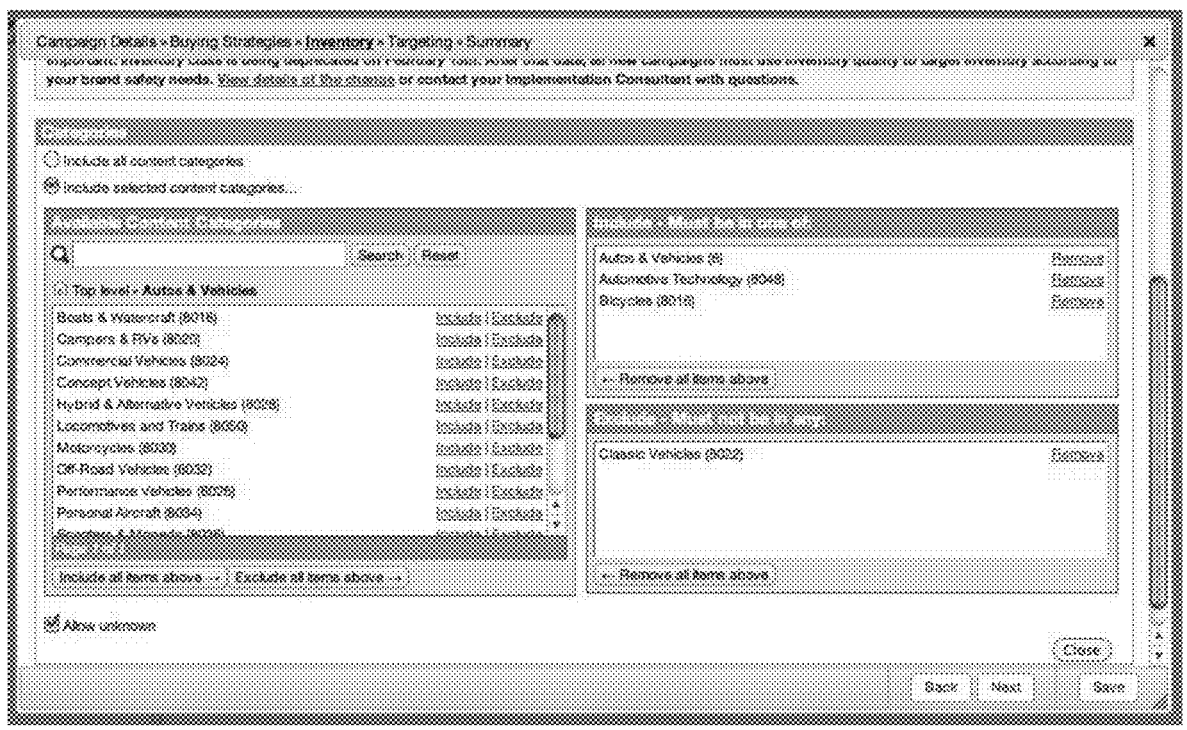

Referring to FIG. 6E, an advertising campaign targets inventory classified in the category "autos & vehicles" and the subcategories "automotive technology" and "bicycles" but excludes any inventory classified in the subcategory "classic vehicles."

In some embodiments, all impression inventory units transacted on the advertising platform are classified by content category. In some instances, impression sellers classify their own inventory. For example, a publisher or advertising network selling or reselling inventory on the advertising platform can classify the content category of the inventory. Publishers can define direct media buys and real-time media buys through classification of the inventory included in the media buys. In other instances, inventory is classified by the advertising platform (e.g., by a human audit or by an audit directed by the Imp Bus). For example, real-time third-party inventory provided by an external advertising network, advertising exchange, or inventory aggregator is classified on the advertising platform. Incoming third-party inventory may be associated with content classifiers that are different from the content categories provided on the advertising platform. In these cases, a mapping between non-platform content classifiers and platform content categories is useful in classifying the third-party inventory.

In some embodiments, campaigns can target inventory content categories at both the website level and at the level of the particular placement, such that a higher level of control can be achieved for particular placement. In other embodiments, inventory targeting can be directed to only one of the website level and the placement level.

4.3 Inventory Quality

In some embodiments, publishers are required to conform to certain standards of legality, decency, and common sense. For instance, publishers that embody any of the following characteristics are generally not permitted to participate in the advertising platform: desktop applications, download accelerators, non-website based widgets and/or toolbars; gambling (free, paid, or gateway to paid gambling); libelous, violent, tasteless, hate, defamatory, or illegal content; or nudity, pornography, and/or adult themes or obscene content; peer to peer, bit torrent, or other websites facilitating illegal file sharing; proxy sites facilitating anonymous web browsing; sites enabling or permitting illegal activities and/or copyright infringement; or Warez or mp3 downloads.

Inventory is audited to apply inventory quality attributes such as sensitive attributes and intended audiences.

Sensitive attributes are applied to inventory associated with a website or particular webpage on which an advertiser may not wish to display a creative. Sensitive attributes may include the following attributes:

Political: a website or portion of a website whose editorial content is predominantly aimed at furthering the cause of a political party, organized campaign, informal pressure group, or other political organization. For instance, political websites may include drudgereport.com or huffingtonpost.com.

Social media: a website on which users independently publish personal content (e.g., personal thoughts, links). Social media websites include, for instance, blogs, personal homepages, and profiles and other user generated content on social networking sites. For instance, social media websites may include myspace.com and bebo.com.

Photo and video sharing: a website on which users independently publish photographs and videos. Photo and video sharing websites include, for instance, photobucket.com and myspace.com.

Forums (moderated): online forums, comment areas, discussion groups, and newsgroups where users exchange ideas about a common interest, subject to editorial control and moderation by or on behalf of the website publisher. In some cases, moderated forums are part of a larger website; in other cases, a website is specifically directed to moderated forums. Moderation may occur either before or after a user's contribution is posted to the forum. Exemplary moderated forums include, e.g., wikia.com and Wikipedia.com.

Forums (unmoderated): online forums, comment areas, discussion groups, and newsgroups where users exchange ideas about a common interest, not subject to any editorial control or moderation by or on behalf of the website publisher. In some cases, unmoderated forums are part of a larger website; in other cases, a website is specifically directed to unmoderated forums. Exemplary unmoderated forums include, e.g., youtube.com and forums.somethingawful.com.

Incentivized clicks: websites or portions of websites containing hyperlinks to be clicked on by live users who subsequently receive a reward or incentive for having made the click (e.g., additional loyalty points added to an account redeemable for goods or services). In some cases, incentivized click inventory enforces a timeout mechanism against repeat clicks on the same link from the same user within a given period of time; in other cases, no timeout mechanism is enforced.

Non-English language: websites or portions of websites having a significant proportion of non-English text. For example, the website telegraaf.nl is non-English language inventory.

Streaming media: websites or portions of websites containing unmoderated streaming music or videos. Websites having streaming media known to be in violation of copyright are not permitted within the advertising platform. For example, the website metacafe.com includes streaming media inventory.

Intended audience attributes indicate the age range of the target audience for content on the website. In some cases, a website will be categorized as "General audiences" unless it includes content that is specifically targeted toward another target audience, such as children, young adults, or mature audiences. Intended audience attributes may include the following:

Children: websites or portions of websites whose content is specifically targeted toward children, such as Disney.go.com and pokemon.com.

Young adults: websites or portions of websites whose content is specifically targeted toward young adults, e.g., between the ages of 13 and 17. Exemplary young adult inventory includes cartoonnetwork.com and girlsgogames.com.

General audience: websites or portions of websites whose content has no particular intended audience and whose content is appropriate for all ages, e.g., cnn.com, edgadget.com, and webmd.com.

Mature audiences: websites or portions of websites whose content is not appropriate for children or young adults under age 17. Exemplary mature audiences inventory includes wwtdd.com and thisis50.com.

In a given advertising campaign, impression buyers may choose to bid only for inventory having certain inventory quality attributes, e.g., to target a specific consumer group or to maintain a brand reputation. For instance, a buyer may not wish to display creatives on any inventory containing user-generated content. Thus, the buyer's campaign will prohibit bidding on inventory classified as social media, photo & video sharing, and moderated and unmoderated forums.

Referring to FIG. 6D, an advertising campaign targets only inventory classified as politics or social media, and targets inventory having any intended audience.

In some embodiments, all impression inventory units transacted on the advertising platform are classified by inventory quality attributes. In some instances, impression sellers classify the inventory quality attributes of their own inventory. For example, as with the classification of content categories, a publisher or advertising network selling or reselling inventory on the advertising platform can define the sensitive attributes and intended audiences of the inventory. In other instances, inventory is classified by the advertising platform (e.g., by a human audit or by an audit directed by the Imp Bus). For example, as with the classification of content categories, real-time third-party inventory provided by an external advertising network, advertising exchange, or inventory aggregator is classified on the advertising platform. The inventory quality attributes characterizing the incoming third-party inventory may be different from the platform-specific classifiers of sensitive attributes and intended audiences. In these cases, a mapping between non-platform quality attributes and platform quality attributes is useful in classifying the third-party inventory.

Often, it may not be possible to audit the entirety of the inventory flowing through the advertising platform. Thus, in some instances, inventory associated with high-volume domains may be audited, while low-volume inventory remains unaudited.

In some embodiments, campaigns can target inventory quality attributes at both the website level and at the level of the particular placement, such that a higher level of control can be achieved for particular placement. In other embodiments, inventory targeting can be directed to only one of the website level and the placement level.

5. Yield Management

Figure 7:
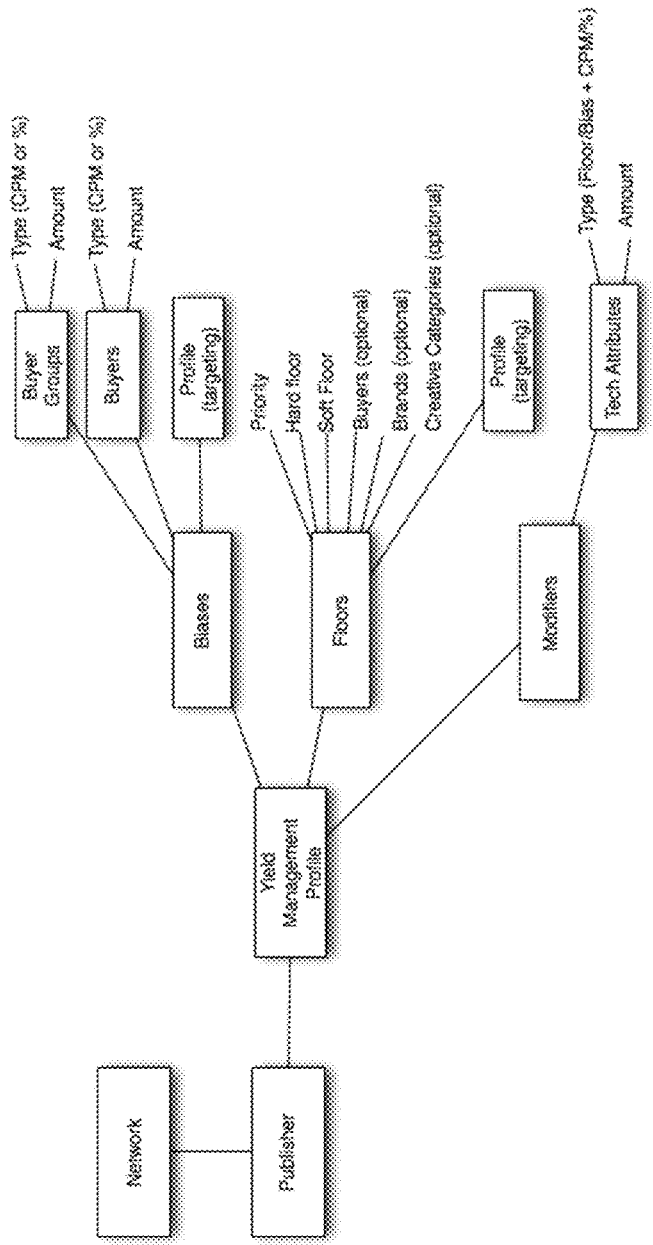
FIG. 7 is a block diagram of a yield management profile.

Referring to FIG. 7, in some embodiments, an impression seller member (e.g., a publisher 702) belonging to an advertising platform 700 establishes a yield management profile 704 to define yield management rules to be applied to impression buyer members bidding on its inventory. In some cases, the rules defined by the yield management profile protect against channel conflict and price erosion. In other cases, the rules defined by the yield management profile attempt to capture additional yield for high value users or inventory.

5.1 Biases

One type of yield management rules involves buyer biases 706. Biasing rules are contained in a bias profile object 712 stored on a server deployed by publisher 702. Buyer biases provide for a bias to be applied to the bid price of certain impression buyer members. A bias may be a percentage bias or a CPM based bias (i.e., an additive bias) and may be either a positive or a negative bias. A bias may be applied to a bid originating form a list 708 of specified impression buyer members (e.g., impression buyer members whose brands publisher 702 wants to favor or disfavor in an auction for a creative serving opportunity) or to a bid originating from impression buyer members in a buyer group 710. A buyer group is a grouping of impression buyer members (e.g., TPANs, trading desks, or marketers) defined by the publisher 702. The bias profile 712 contains the list of impression buyer members and buyer groups to which a bias is to be applied, and contains, for each impression buyer member and buyer group, the type and amount of the bias.

In operation, when an ad call for an impression is received, the Imp Bus broadcasts bid requests to all eligible bidders, as described above, and accepts bid responses containing one or many bids (e.g., CPM bids) and an identifier of a creative to be served for each individual impression buyer member bidding for the impression. Before performing an auction, the Imp Bus removes any ineligible bids (e.g., based on quality restrictions or malformed responses).

For each of the remaining eligible bids, the Imp Bus applies the bias rules stored in bias profile 712 as appropriate. Specifically, for a given bid, if the impression buyer member submitting the bid has a bid bias of type CPM, the CPM bias is added to the bid price for auction comparison only. For example, a bid of $1.00 for a buyer member with a CPM bias of +$0.05 will be sent to the auction with a value of $1.05. Similarly, if the impression buyer member submitting the bid has a bid bias of type percentage, the bid price is multiplied by the bias percentage for auction comparison only. For example, a bid of $1.00 for a buyer member with a percentage bias of −25% will be sent to the auction with a value of $0.75. Subsequent to the auction, the bias is removed from the bid price (e.g., the biased bid of $1.05 is reset to the original bid price of $1.00).

If the impression buyer member submitting the bid is not included on the list 708 of impression buyer members but does belong to one of the specified buyer groups 710, the bias (CPM or percentage) associated with the buyer group 710 to which the buyer member belongs is applied to the buyer member's bid for auction comparison only.

5.2 Floors

Referring still to FIG. 7, price floors 714 provide publishers with the capability to set reserve pricing in order to manage yield. For instance, through the use of price floors, a publisher can protect its existing yield gained through direct deals or can capture additional yield for high-value impression inventory or impression consumers. CPM reserve pricing (i.e., price floors) can be set unique to inventory attributes, consumer attributes, or demand criteria.

Floor rules are contained in a floor profile object 716 stored on a server deployed by publisher 702. Floor profile 716 contains targeting criteria, such as inventory, user, or demand targeting criteria, that are to be used in the application of a floor. Although many floors may be specified within a given yield management profile, only one floor will ultimately be used per bid for any given impression. Each floor is associated with a priority value, e.g., ranging from 1 (low priority) to 10 (high priority), indicative of the logical order in which the floors are to be selected.

The floors contained within floor profile 716 may be hard floors or soft floors. A hard floor represents an explicit reserve price that determines the lowest price at which a bid can be entered into the auction. A soft floor is a shadow bid price that is used to set a floor for price reduction only (i.e., bids above the soft floor will be reduced at most to the soft floor value, and no bids below the soft floor will be price reduced).

In operation, after biases are applied to all eligible buyer members, the Imp Bus determines which, if any, floor to use for each bid. Specifically, the highest priority level is identified which has at least one floor that meets all targeting criteria based on at least one of the following:

Inventory Targeting
Content category: a content-based classification of the underlying impression inventory supplied by the impression seller member (i.e., the publisher), an audit performed by the Imp Bus, or a third party provider. Exemplary content categories include sports, finance, and news.
Placement: the id assigned to the exported publisher ad tag (e.g., MSN Sports—728×90).
URL of the impression inventory.
Other inventory attributes.
Impression Consumer Targeting
Segment: a bucket of impression consumers assembled for targeting. Exemplary segments include behavioral or remarketing segments.
Geography: the country, region, DMA, city, ZIP code, or other geographical identifier of the impression consumer.
Session frequency: the number of times the impression consumer has requested creatives (as determined through tags administered by the advertising platform) within a browsing session, universally or across a specific publisher.
Other impression consumer attributes.
Demand Criteria
Impression buyer member.
Brand.
Creative category: a content-based classification of the creative's offer (e.g., dating, online games).
Other demand criteria If multiple floors meet the targeting criteria for the highest available priority level, the highest hard floor value is selected and compared to the impression buyer's bid. If the floor price is met by the bid, the bid is entered into the auction. If the selected floor also has a soft floor value, then the associated bid will never be price-reduced below the soft floor price during the auction.

5.3 Modifiers

Referring still to FIG. 7, in some embodiments, modifiers 718 are used to adjust biases and/or floors based on additional criteria, such as impression consumer attributes or technical attributes of creatives or impression inventory. Impression consumer attributes include, for instance, demographic segment to which an impression consumer belongs (e.g., based on age, gender, or salary range), a geographic location of the impression consumer, or a browsing history of the impression consumer (e.g., how frequently or recently the impression consumer has viewed a particular creative). Technical attributes 720 include, for instance, technical attributes of a creative, such as its file type (e.g., image, Flash, video, or text), its file size (e.g., greater than 40k), or its mode of display (e.g., an expandable creative), or technical attributes of impression inventory, such as the physical size (i.e., width×height) of the ad space. Modifiers can be used to adjust eligible biases by a CPM or a percentage, or to adjust eligible price floors by a fixed amount or a percentage.

When a yield management profile includes one or many bias-based CPM modifiers, the Imp Bus determines which modifiers apply to each bid based on the modifier selection criteria. For example, a CPM bias modifier of −$0.20 may apply to any bid having an expandable creative. In this case, the −$0.20 bias is added to any existing impression buyer member bias or buyer group bias; the total bias is then added to the bid price to determine the bid value to be presented at auction. Thus, for instance, a $2.00 bid with a +$0.10 buyer bias and with an expandable creative (−$0.20 bias) results in a final bid price of $1.90 ($2.00+$0.10−$0.20) that is submitted to auction.

When a yield management profile includes one or many bias-based percentage modifiers, the Imp Bus determines which modifiers to apply to each bid based on the modifier selection criteria. For example, a percentage bias modifier of −20% may apply to any bid having a creative of file size greater than 40k. The −20% bias is added to any existing impression buyer member bias or buyer group bias; the total bias is then applied to the bid price to determine the bid value to be presented at auction. Thus, for instance, a $2.00 bid with a +10% buyer bias and with a creative flagged as larger than 40k (−20% bias) results in a final bid price of $1.80 ((+10%−20%)*$2.00) that is submitted to auction.

Similar calculations apply to floor-based modifiers. When a yield management profile includes one or many floor-based CPM modifiers, the Imp Bus determines which modifiers to apply to each bid based on the modifiers selection criteria. For example, a floor-based CPM modifier of −$0.20 may apply to a selected floor for any bid having an expandable creative. In this case, the −$0.20 floor modifier is added to the hard floor price prior to determining whether the bid value is high enough to be presented at auction. Thus, a $2.00 bid from a buyer with a $1.20 selected floor and with an expandable creative is subject to a final hard floor price of $1.40. The $2.00 bid is greater than the final hard floor, and the bid is submitted to auction.

When a yield management profile includes one or many floor-based percentage modifiers, the Imp Bus determines which modifiers to apply to each bid based on the modifier selection criteria. For example, a floor-based percentage modifier of −20% may apply to a selected floor for any bid having a creative of file size greater than 40k. The −20% floor modifier is multiplied by the selected hard floor price prior to determining whether the bid value is high enough to be presented at auction. Thus, a $2.00 bid from a buyer with a $1.20 selected floor and with a creative flagged as larger than 40k is subject to a final hard floor price of $0.96 (−20%*$1.20). The $2.00 bid is greater than the final hard floor, and the bid is submitted to auction.

5.4 Price Reduction

For price reduction in an auction involving global price floors that apply equally to all bids, the price reduced final price is decided based on the highest bid and the maximum of the following: the second highest bid, the soft floor (shadow bid), and the hard floor (reserve price). With the integration of yield management logic into the bidding process, the price reduction logic is adjusted to account for the added complexity.

In one embodiment, once the winning bid (i.e., the highest adjusted bid) has been selected, the winning bid is price reduced to the second highest of the following: the highest adjusted bid, the second highest adjusted bid, the hard floor, and the soft floor. The price reduced winning bid is then readjusted to remove all applied biases.

Referring to Table 1, in one example of this approach, four bidders present bids of $1.95, $1.50, $1.05, and $2.11. Each bidder has a unique set of a hard floor, a soft floor, a percentage or CPM bias, a percentage or CPM floor modifier, and a percentage or CPM bias modifier. After the application of all appropriate adjustments, the final bids for auction comparison are $2.05, $1.26, $1.05, and $2.17, of which all but the $1.05 bid exceed the floor price. The winning bid is $2.17 and the second highest bid is $2.05. An effective second highest bid ($2.30) is identified as the soft floor associated with the winning bidder. The winning bid is price reduced to the second highest of these three values, or $2.17. The final price, $2.03, is determined by adjusted the price reduced winning bid of $2.17 to remove the applied biases.

TABLE 1

An auction under an exemplary yield management profile.

| | | Bidder 1 | Bidder 2 | Bidder 3 | Bidder 4 |
|---|---|---|---|---|---|
| Bidding | Bid Price | $1.95 | $1.50 | $1.05 | $2.11 |
| | Hard Floor Selected (pre-modifier) | $1.00 | $1.20 | $1.00 | $2.00 |
| | Soft Floor Selected | $1.20 | | $1.50 | $2.30 |
| | Bid Bias (%) Selected | 10.00% | | | −7.00% |
| | Bid Bias (CPM) Selected | | −$0.24 | | |
| | Total Floor CPM Modifier | $0.02 | | $0.07 | |
| | Total Floor % Modifier | | | | −10.00% |
| | Total Bias CPM Modifier | −$0.10 | | | $0.10 |
| | Total Bias % Modifier | | | | 5.00% |
| | Final Hard Floor (post-modifier) | $1.02 | $1.20 | $1.07 | $1.80 |
| | Final % bias adjustment | 10% | 0% | 0% | −2% |
| | Final CPM bias adjustment | −$0.10 | −$0.24 | $0.00 | $0.10 |
| Auction | Final Bid for Auction Comparison | $2.05 | $1.26 | $1.05 | $2.17 |
| | Above Floor Price? | PASS | PASS | FAIL | PASS |
| | Auction Rank | 2 | 3 | | 1 |
| Post-Auction | Winning Bid | | | | $2.17 |
| | Second Highest Bid | $2.05 | | | |
| | Effective Second Highest Bid | | | | $2.30 |
| | Pre-Bias Adjustment Reduced Price | | | | $2.17 |
| | Post-Bias Adjustment Final Price | | | | $2.03 |

In another embodiment, once the winning bid (i.e., the highest adjusted bid) has been selected, all adjusted bids are readjusted to remove the applied biases. The winning bid is then price reduced to the second highest of the following: the second highest readjusted (i.e., unbiased) bid, the hard floor, and the soft floor.

5.5 Examples

In one example, the following setup is utilized in a yield management profile for a small publisher focused ad network:
3 Publishers
Publisher X (Yield Management Profile ID 1)
Publisher Y (Yield Management Profile ID 2)
Publisher Z (Yield Management Profile ID 3)
5 Placements
Publisher X—728×80
Publisher X—300×250
Publisher Y—160×600
Publisher Z—300×250
Publisher Z—160×600
3 User Segments
Remarketing Segment 123
Auto Intender Behavioral Segment 456
Frequent Traveler Segment 789
3 Buyer Groups
Third Party Ad Networks (TPANs)
Value Ad Networks
Agency Trade Desks
6 Buyers
Network A (Buyer Group 1)
Network B (Buyer Group 2)
Agency C (Buyer Group 3)
Agency D (Buyer Group 3)
Network E
Demand Side Platform (DSP) F
3 Geo Countries
US
UK
Germany
The publisher's goals include the following:
1. DSP F and Network E are owned by the same parent company as the publisher's ad network and therefore have a $0 floor price across impression inventory. This floor is shown in Table 3 below.
2. Bids for both Publisher Z placements are biased as follows for low frequency (1-5) traffic only: TPANs−10%; Value Ad Networks−$0.05; Agency Trading Desks+2%; Vivaki+10%. These biases are shown in Table 2 below.
3. Bids for both Publisher X's placements are biased as follows for low frequency (1-5) traffic only. These biases are shown in Table 2 below.
  a. −10% for TPANs with Publisher X—728×80 placement; −8% for TPANs with Publisher X—300×250 placement.
  b. −$0.05 for Value Ad Networks with Publisher X—728×80 placement; −$0.03 for Value Ad Networks with Publisher X—300×250 placement.
4. Bids for creatives with rich media attributes are biased as follows. These biases are shown in Table 4 below.
  a. File size >40k (Technical Attribute 1): $0.05 for Publisher X; −$0.15 for Publisher Y and Publisher Z b. Expandable creative (Technical Attribute 2): −5% for Publisher X; −10% for Publisher Y and Publisher Z 5. Impression consumers in specific user segments are biased as follows:
   a. Impressions for impression consumers in Remarketing Segment 123 have a $1 floor; impressions for impression consumers in Auto Intender Behavioral Segment 456 a $1.20 floor; impressions for impression consumers in both Segments 123 and 456 have the higher of the two floors (i.e., $1.20). These floors are applied across all three publisher's impression inventory.
   b. Impressions for impression consumers in Frequent Traveler Segment 789 have a $0.50 floor for Publisher X—728×80 placement and a $0.75 floor for Publisher X—300×250 placement.

TABLE 2

Summary of biases for the above example

| Buyer Bias Details | YMP ID | Priority | Bias | Demand Targeting | Supply/User Targeting |
|---|---|---|---|---|---|
| TPAN Pub Z Bias | 3 | 10 | −10% | Buyer Group: 1 | Session Frequency Range: 1-5 |
| Value Ad Network Pub Z Bias | 3 | 10 | −$0.05 CPM | Buyer Group: 2 | Session Frequency Range: 1-5 |
| Agency Trading Desk Pub Z Bias | 3 | 10 | +2% | Buyer Group: 3 | Session Frequency Range: 1-5 |
| Agency C Pub Z Bias | 3 | 10 | +10% | Buyer: Agency C | Session Frequency Range: 1-5 |
| TPAN Pub X - 728 × 90 Bias | 1 | 10 | −10% | Buyer Group: 1 | Placement: Pub X - 728 × 80 |
| TPAN Pub X - 300 × 250 Bias | 1 | 10 | −8% | Buyer Group: 1 | Placement: Pub X - 300 × 250 |
| Value Ad Network Pub X - 728 × 90 Bias | 1 | 10 | −$0.05 CPM | Buyer Group: 2 | Placement: Pub X - 728 × 80 |
| Value Ad Network Pub X - 300 × 250 Bias | 1 | 10 | −$0.03 CPM | Buyer Group: 2 | Placement: Pub X - 300 × 250 |

TABLE 3

Summary of floors for the above example.

| Floor Details | YMP ID | Priority | Floor | Demand Targeting | Supply/User Targeting |
|---|---|---|---|---|---|
| Parent Company Floor Override | 1, 2, 3 | 10 | $0.00 | Buyers: DSP F, Network E | None |
| Remarketing Segment 123 Floor | 1, 2, 3 | 8 | $1.00 | None | Segment 123 |
| Auto Intender Segment 456 Floor | 1, 2, 3 | 8 | $1.20 | None | Segment 456 |
| Frequent Traveler Segment 789 - Pub X 728 × 90 Floor | 1 | 8 | $.50 | None | Placement: Pub X - 728 × 80 |
| Frequent Traveler Segment 789 - Pub X 728 × 90 Floor | 1 | 8 | $.75 | None | Placement: Pub X - 300 × 250 |

TABLE 4

Summary of modifiers based on technical attributes for the above example.

| Modifier Details | YMP ID | Modifier Type | Modifier Value | Demand Targeting |
|---|---|---|---|---|
| Pub X Large File Size Bias | 1 | Bias (CPM) | $0.05 CPM | Technical Attributes: 1 (File Size > 40k) |
| Pub Y&Z Large File Size Bias | 2, 3 | Bias (CPM) | $0.15 CPM | Technical Attributes: 1 (File Size > 40k) |
| Pub X Expandable Ad Bias | 1 | Bias (%) | −5% | Technical Attributes: 2 (Expandable Ad) |
| Pub Y&Z Expandable Ad Bias | 2, 3 | Bias (%) | −10% | Technical Attributes: 2 (Expandable Ad) |

5.6 Auction Tiering

In some embodiments, yield management includes auction "tiering," which allows a subset of bidders to compete among each other in an auction for advertising impressions. In other words, auction tiering facilitates the creation of "private marketplaces" by impression sellers using an advertising auction platform, thus providing "first look" or "prioritized look" tiers specific to one or more sets of impression buyers. In some embodiments, auction tiering is applied in real-time bidding auctions for one or more impressions, while in other embodiments, tiering is used in auctions for impressions to be served at a later time. Auction tiering may also allow an impression supplier to meet auction rule requirements for specifying eligible buyers.

As one example, a large publisher desires to offer a major advertising agency "special access" to its impression inventory by prioritizing that agency's bids over other impression buyers. Although it is possible to set up a positive bid bias (as described above) for that agency by giving it special pricing privileges as compared to other buyers, it may be more useful to create private marketplaces using a set of auction tiers, thereby enabling the agency and/or other buyers to get a first look at certain subsets of the publisher's inventory. Provided, then, that these buyers bid above a pre-defined floor price (if one exists), they do not have to compete against the full marketplace of bidders.

Each auction tier may include a number of associated properties that are used in determining whether a particular bidder has access to a particular subset of impression inventory available in an auction. These properties may include, but are not limited to, Priority, Eligible Buyer Members or Brands, Budget, Flight Dates, Minimum Price Floor, Geographic Location, and Targeting Profiles, each as described in greater detail below.

The Priority of a tier determines the order in which the tier is evaluated. For example, in an auction having ten tiers, the first-evaluated tier may have a priority of 10, thus the tier evaluated last would be assigned a priority of 1. However, any suitable method of ranking the tiers may be used. Further, there may be default tiers that are evaluated first, last, or at other fixed or variable positions.

The Eligible Buyer Members or Brands property is a list of impression buyers and/or advertising brands that are eligible to compete within a particular tier. This list may explicitly specify the buyers and/or brands that are eligible to be included within a given tier or, alternatively, buyers or brands that are not eligible. In some implementations, the list may indicate specific buyers or brands, or sets or categories of eligible buyers or brands, or may indicate that all buyers or all brands are eligible to bid at that tier.

Budgeting constraints may also optionally be applied to any auction tier and may be expressed in any suitable method. In one embodiment, a total amount (or a fixed or variable percentage) of spend and/or impression volume is used as a budget cap for the lifetime of the auction tier. In other embodiments, the spend and/or impression volume is used as a budget cap for a specified time interval, such as Second, Hour, Day, Week, Month, Quarter, Year, or other suitable interval.

The budget may apply separately to individual bidders and/or brands that are eligible to bid in a tier. For example, if impression bidders A and B are in the Eligible Buyer Members list for a tier with a daily budget of $100.00, then both A and B are each permitted to bid up to a total of $100.00 per day. The budget amount may be applied toward all bids, or only winning bids. For example, if the budget only applies to winning bids and A bids $3.00 but does not win the auction, that $3.00 is not subtracted from the tier budget. In other implementations, the tier budget applies to the cumulative bidding activities of all or a subset of bidders/brands eligible to bid in the tier. In such a case, using the previous exemplary bidders, the combined daily bids of A and B for the tier would be limited to $100.00.

Budgeting may further include an "even pacing" requirement within a specified time period, such that only evenly-divided portions of the budget are available to be spent over fixed sub-intervals of the time period. For example, if a day is considered as eight three-hour periods, and the budget is $160/day, the pacing requirement may enforce a $20/period limit. The spend pace may also be variable, in that larger or smaller percentages of the budget are available to be spent by impression buyers during certain sub-intervals. Further, the sub-intervals may be of fixed, equal length, or of variable length.

Flight Dates generally refer to the time period for which advertising impressions will be served. When a Flight Date or Flight Date range is set for a given auction tier, the tier may only be applicable to an auction if the impressions have a Flight Date within the range specified by the tier. In the case of a real-time bidding auction, the Flight Date of the impression will generally correspond with the Flight Date of the auction. In other types of auctions, the impressions may be served at a later time or date.

For example, if an auction tier specifies a Flight Date range of Jan. 1, 2014 to Aug. 31, 2014 (i.e., impressions should be served between those two dates, inclusively), then a real-time bidding auction occurring outside of that range (e.g., on Mar. 15, 2013 for an impression to be served immediately) may disregard the tier when evaluating the tiers for that auction. In other implementations involving non-real-time auctions, the impressions for sale may be served at a later date. If these impressions do not have a Flight Date range that falls completely within the auction tier Flight Date range, or does not overlap any part of the range, then the tier may be inapplicable to the auction. In some embodiments, the assignment of Flight Dates to an auction tier is not required. If no Flight Dates are specified for a particular auction tier, that tier may not be not be restricted from applying to an auction based on any time range.

A Minimum Price Floor refers to the minimum amount that an eligible buyer member in the tier must bid in order to qualify for the auction at that tier. The Minimum Price may be zero, meaning that there is no minimum bid requirement. As one example, if a tier having members A and B requires a minimum bid price of $3.00 for 1000 impressions, either or both members A and B must bid at least $3.00 for this tier to be considered in the auction process. If A bids at least $3.00 and B does not, then the tier may be evaluated, but only A's bid will be considered. If there are no additional tier requirements that must be met, the highest bidder meeting at least the Minimum Price will be selected as the winning bid within this tier. If there is a tie among the highest bidders, one of the tied bidders may be chosen randomly as the winning bid within this tier. In other implementations, no winner is selected, and the next highest priority tier, if any, is evaluated.

An auction tier may include target requirements within a particular Targeting Profile. The Targeting Profile property of the tier specifies supply and user-related targeting. Supply targeting generally refers to any target requirements related to the inventory being sold, and may include, but is not limited to, URL, Domain, Content Category, Page Position, Media Type, Publisher, Site, Placement, and Inventory Quality Attributes. User Targeting generally refers to any target requirements specific to potential advertisement viewers, and may include, by is not limited to, Audience Segments, Browsing Session Frequency, Geographic Location, Browser, Operating System, Device, Cellular or Internet Carrier or Provider. If no Profile is associated with a tier, no supply or user based targets are required for a bid to be considered eligible for the tier.

An exemplary order of operations for auction tier evaluation is described as follows. One of ordinary skill in the art will appreciate how the method described below may, in other embodiments, include more or fewer steps, and/or include variations on the listed steps, yet still accomplish the purposes of the present invention.

Figure 12:
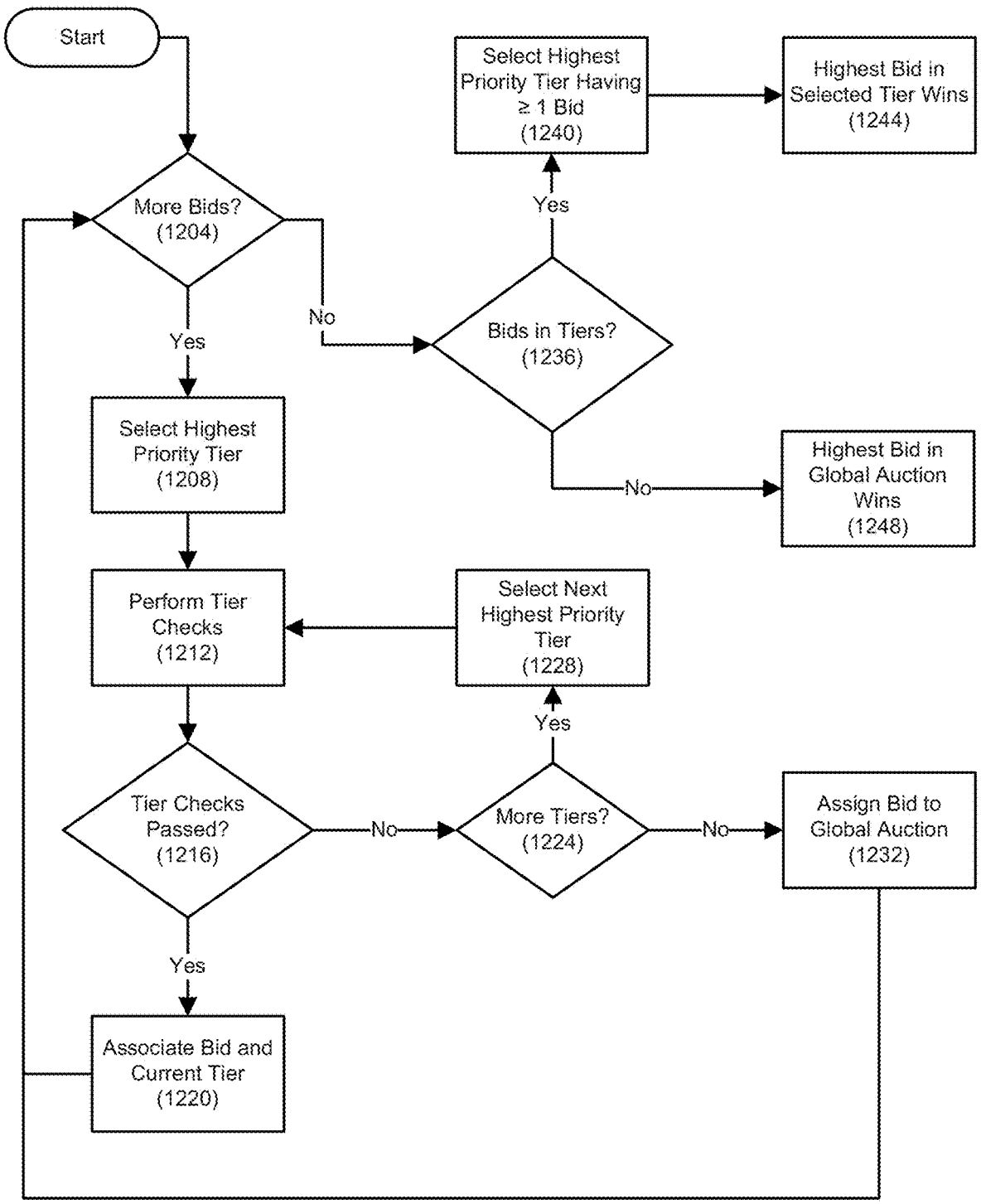
FIG. 12 is a flow diagram illustrating by example a process for tiered auctioneering according to an embodiment of the invention.

Referring to FIG. 12, in one implementation, for each valid bid submitted in response to a Bid Request for a given Auction, the Impression Bus 1120 determines which tier will be applied to the bid within the Auction using the following process:

(1) For each bid (Step 1204), start with the highest priority auction tier included for the impression(s) being auctioned (Step 1208) and perform a series of checks (Step 1212), including determining whether: (a) the Buyer and/or Brand associated with the bid is/are included in the list of Eligible Buyers and Brands for the tier (this list may also specify that all buyers and/or brands are eligible); (b) the Supply and User Targeting profile data associated with the tier (if any) pass for the auctioned impression(s), (c) the auction tier has remaining budget (if applicable), (d) the impression(s) (or auction) falls within the specified Flight Dates (if any), and (e) the bid is not less than the specified Minimum Price (if any). In some embodiments, not all checks are made for each bid. For example, some tier attributes, such as Targeting and Flight Dates, may only need to be evaluated once for each tier in an auction. This one-time evaluation is useful particularly if the attributes are not associated with individual bids, but rather with tiers and/or auctioned impressions, which may having unchanging attributes over the duration of an auction.

(2) A determination is then made as to whether the checks have passed (Step 1216). If all checks pass, the auction tier is assigned to the current bid (Step 1220) (or the current bid is assigned to the auction tier). If, however, any of the checks fail, then the process determines whether there are additional auction tiers (Step 1224). If there are more tiers, the next auction tier, chosen by next highest priority, is selected (Step 1228) and the checks are run against the new auction tier (Step 1212).

(3) If no auction tier is applied to the current bid, it is assigned an auction tier Priority of zero, representing a global auction for all bidders (Step 1232).

(4) Once all bids have been assigned the Priority value for the selected highest priority auction tier, a determination is made as to whether there are any tiers associated with the bids (Step 1236). If so, the highest priority auction tier having at least one bid is selected (Step 1240), and the bid(s) assigned to that tier are compared based on price to determine a winning bid (Steps 1244).

(5) If no non-global auction tiers are applied to any bids within a given Auction, all bids will be eligible to compete, based on price, in the Auction at the same Priority level (Step 1248).

It should be noted that a valid bid may be considered as any bid with a properly formatted response that passes all Ad Quality criteria specified by a publisher for a valid Buyer. Further, any Yield Management Modifier and Floor Prices may be applied to the bid before determining the final value and eligibility to be assigned an auction tier. If the bid is rejected, it may not receive an auction tier, and therefore may not be included in the Auction.

5.6.1 Exemplary Tiered Auctions

Figure 13:
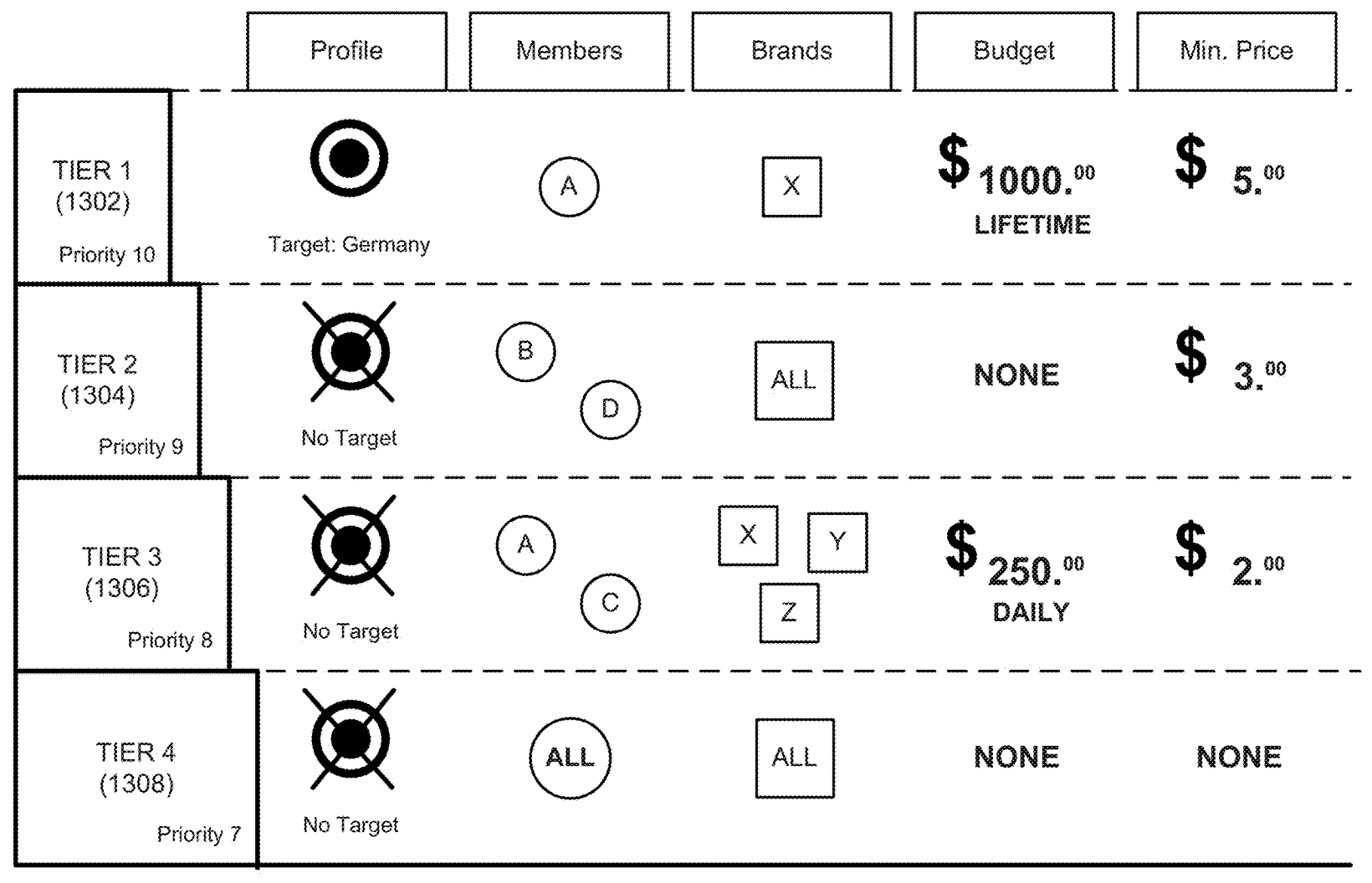

An exemplary tiered auction is illustrated in FIG. 13. This particular auction includes four tiers, although in practice, any number of tiers may be included. The tiers are arranged from highest priority (top) to lowest (bottom), and are configured as follows:

| Tier | Priority | Profile | Members | Brands | Budget | Min. Price |
|---|---|---|---|---|---|---|
| Tier 1 | 10 | Targeting Germany Only | A | X | $1000.00 (Lifetime) | $5.00 |
| Tier 2 | 9 | No targeting | B, D | All | None | $3.00 |
| Tier 3 | 8 | No targeting | A, C | X, Y, Z | $250.00 (Daily) | $2.00 |
| Tier 4 | 7 | No targeting | All | All | None | None |

The following examples of auctions use the tier structure as illustrated in FIG. 13 and described in the table above.

Auction 1

Auction 1 is an auction for a number of impressions to be served in Germany. Buyer A bids $10.00, Buyer B bids $2.00, Buyer C bids $1.50, and D bids $0.50. Tier 1 (1302), having the highest priority, is evaluated first for each eligible bid. As there is a match for the target profile for the tier (Germany) and the lifetime budget has not yet been reached, any bids of the single eligible members (A) with Brand X are evaluated to determine if the minimum price ($5.00) is met. In this case, because A has bid $10.00 (i.e., more than the minimum price), A is the only Buyer assigned to Auction Tier 1 (1302) (the highest priority tier), and will therefore win the auction.

Auction 2

Auction 2 has the same parameters as Auction 1; however, on this occasion, A bids $1.00, B bids $2.00, C bids $1.50, and D bids $0.50. Tier 1 (1302) again matches the target profile (Germany) and is evaluated first for each eligible bid. Ultimately, however, the only eligible member (A) does not meet the minimum bid ($5.00), and so Tier 2 (1304) is evaluated, as it has the next highest priority. Tier 2 (1304) has no target profile, therefore it is irrelevant to that tier that the locale is Germany. Again, however, neither eligible member (B or D) meet the $3.00 minimum price. The same occurs for Tier 3 (1306): neither A nor C are bidding at least $2.00. Therefore, the final tier, Tier 4 (1308), is reached. All bidders are eligible for this tier, and there is no minimum price. Tier 4 (1308) may be considered as a default tier that opens the auction up to the entire marketplace of bidders. Therefore, the highest bidder wins; i.e., B, with its $2.00 bid.

Auction 3

Auction 3 is an auction for a number of impressions to be served in the United States. A bids $10.00, B bids $4.00, C bids $1.50, and D bids $0.50. Although Tier 1 (1302) has the highest priority, its profile target locale is Germany, and so the tier is not applicable to the current auction. Evaluating the next tier (1304), D does not reach the minimum bid ($3.00), but B has bid enough and therefore wins the auction at Tier 2 (1304).

Auction 4

Auction 4 has the same parameters as Auction 3; however, A bids $6.00, B bids $2.00, C bids $8.00, and D bids $2.50. Again, Tier 1 (1302) fails because it is targeted to Germany.

For Tier 2 (1304), neither B nor D have bid at least $3.00, and so the next tier is evaluated. On Tier 3 (1306), both A and C have exceeded the minimum bid ($2.00), but C has bid the largest amount and so wins the auction. Of note, if the daily budget ($250.00) for the tier had already been reached, the auction would proceed to Tier 4 (1308), and all bidders would be eligible to participate. Nevertheless, C would still win the auction with the highest bid ($8.00).

6. Optimization of Advertising Campaigns

The effectiveness and/or success of a given campaign can be measured using any number of performance metrics (e.g., return on investment (ROI)). To maximize ROI, it is highly desirable to display creatives of an advertising campaign on inventory that allows for a sufficient number of auction wins, and optionally, a sufficient number of successful events to occur while satisfying various constraints (e.g., overall campaign budget, daily min-/max-budget spend, budget over time, etc.)

In some embodiments, the advertising platform provides an optimization mode in which performance data is collected and used to optimize the performance of an advertising campaign. In general, an optimization system uses the stated goals and targeting criteria of an advertising campaign to learn about performance and optimal bidding strategy based on inventory parameters, creative and advertiser information, frequency and recency targeting data, and other user data.

Optimization mode provides efficient algorithms to minimize learning cost while maximizing the ROI for an advertising campaign. For instance, automatic optimization to publisher and advertiser attributes facilitates the construction of an effective campaign. Data gathering and learning is assisted both by a modifier system that allows integration of continuous variables without drastic increases in learning costs and by the availability of custom breakouts on any targeting variable.

6.1 Learning Mode

When an advertising campaign is first established on the advertising platform, the advertiser may have little or no knowledge about how that campaign will perform. In learning mode, the first step of optimization, data is gathered on the performance, measured as cost-per-mille, cost-per-click, or cost-per-acquisition, for a single combination of a creative, a campaign, and a group of inventory (e.g., a venue, discussed in greater detail below). Performance is tracked, e.g., by a conversion pixel or a platform-tracked click.

In learning mode, the initial bid is calculated as starter bid*cadence modifier. The starter bid is a moderate-level bid based on a platform-wide historical price for the selected inventory. In some embodiments, the bid may be based on an estimated average price that will win a certain percentage of impressions for a given venue or venue type. The cadence modifier may be incorporated into the bid in order to allocate bids appropriately. The initial bid is used until one of two situations occurs: a confidence threshold is surpassed or a dead end is reached.

The campaign reaches a confidence interval when a certain number of success events (e.g., view-through events, click events, click-through events, and/or any other type of conversion event) are received. Such successes determine the statistical accuracy of the optimization. In some embodiments, the confidence interval is controlled, per campaign, by the optimization system. In other embodiments, the confidence interval is controllable by the advertiser whose campaign is undergoing optimization.

In some embodiments, if no, or very few, successes and/or impressions are achieved, the campaign is considered to have reached a dead end. In this case, the optimization system concludes that the campaign cannot be competitive on the selected inventory. In some examples, a maximum CPM value is determined based on the number of impressions and success events achieved. A dead end is then identified through a comparison between the maximum CPM value and the estimated average price of the inventory. In other embodiments, a threshold number of impressions is used to determine when campaigns should stop bidding while operating in learn mode. This mechanism, described as the "GiveupThreshold," is further explained below.

As an example of the platform operating in learning mode, a cheese-of-the-month club initiates an advertising campaign targeting males, aged 25-30, living in Oklahoma, who are myspace.com users, and who are not currently subscribed to the club. A year's subscription to the club generates $50 in revenue.

When establishing the parameters of the campaign, the advertiser considers the likelihood that showing a target customer a particular creative will convince the consumer to subscribe. The amount that the advertiser is willing to pay to show the ad to the target consumer is determined based on the consumer's likelihood of subscribing. These questions are answered by the data collected in learning mode.

In learning mode, the optimization system acquires enough 25-30 year old Oklahoman men on myspace.com to obtain a statistically significant number of clicks or conversions (e.g., 31 conversions). In this example, the conversion rate is determined to be 1 per 4000 impressions (i.e., 0.025%) when a target consumer is shown a particular creative. In other words, if an advertiser pays $1 CPM for such an impression, a conversion will cost $4.

Because the bids used in learning mode are based on the estimated clear price or average price rather than on ROI goals, learning impressions are often delivered at a very low or even negative ROI. That is, learning involves spending money in order to obtain information that will accurately predict the performance of a particular creative. In an advertising campaign, minimizing learning costs is desirable in order to best utilize the available advertising budget.

Furthermore, because optimization is based on a unique combination of a creative, a campaign, and a venue, it is generally not recommended for an advertising campaign to dilute its budget over a large number of combinations in learning mode. For instance, if one campaign includes 20 creatives, each campaign-creative combination requires about 10 events before exiting learning mode on that venue. Similarly, if a campaign targets all real-time inventory, each venue requires its own 10 events to exit learning mode. Therefore, it is often preferable to determine a set of venues for learning mode that makes optimal or near-optimal use of a learning budget. This learn set should include those venues likely to provide the number of success events necessary to exit learning mode, but not likely to prematurely exhaust a learn budget.

6.1.1 Learn Rank

In some embodiments, impression seller members (e.g. publishers) are provided with a choice to serve either an "optimized" impression or a "learn" impression. If the seller chooses an optimized impression, a campaign that is bidding using the optimized bidding algorithm is selected. If the seller instead chooses to serve a learn impression, a "Learn auction" is held among "Optimization Nodes," or combinations of campaigns, creatives and venues (described below), that are in learning mode.

Rather than allowing all Optimization Nodes operating in learning mode to bid the same estimated average price, the highest-priority Optimization Node for learning is determined using a "Learn Rank" process. The Learn Rank process orders and prioritizes the learning Optimization Nodes. The Optimization Node that has the highest calculated Learn Rank value in the Learn auction is the one that serves when an impression seller chooses to serve a learn impression.

Impression sellers may configure the percentage of learn impressions that are served among the total mix of optimized and learn impressions. This percentage is configurable because it is always possible that a new campaign will perform much better than all other campaigns using optimized bidding. By allowing the Learn Rank process and learn percentages to be configurable at the publisher level, new campaigns and new advertisers are able to discover the best matches between sellers and advertisers even in the absence of significant amounts of historical data.

The Learn Rank may be represented as:

$$LearnRank = Goal * \frac{SuccessEvents + ProjectedLearnEvents}{Impressions} * 1000$$

where "Goal" is the amount a particular advertiser is willing to pay for a success event (e.g., clicking on an ad, signing up for something or purchasing something).

The Learn Rank equation is similar to the basic optimized equation (described below) with an additional "Projected Learn Events" variable. This variable can be manually or programmatically adjusted from a default value, e.g., three projected learn events. Including a number of projected learn events in the Learn Rank equation is necessary to avoid bids of 0.00 by every Optimization Node that had yet to accumulate even a single success event (i.e., zero over anything will produce a result of zero).

Using the Learn Rank algorithm, initial bids tend to be inflated, as the number of Projected Learn Events has more weight in the equation than is desirable. For example, if the equation is completed using inputs of zero success events and three impressions, the equation will use a probability of 3/3 (3 Projected Learn Events/3 impressions) to compute Learn Rank, and will result in a bid value that is 1000×Goal (higher than preferable). As the number of real impressions accumulates, the significance of the Projected Learn Events decreases, and the calculated bid ultimately finds equilibrium as enough impressions are collected to achieve real success events.

6.1.2 Targeted Learn

To help campaigns bid more accurately with little or no data, and to counter the issue of inflated bids on new Optimization Nodes, the "Targeted Learn" process is used. In addition to Projected Success Events, the Targeted Learn equation also has Projected Learn Impressions. Adding Projected Learn Impressions balances the Projected Success Events and speeds up the rate at which the Learn Equation finds the correct value to bid.

The Targeted Learn equation, in simplified form, may be represented as:

$$LearnRank = Goal * \frac{SuccessEvents + ProjectedSuccessEvents}{Impressions + ProjectedLearnImpressions} * 1000$$

The equation contains adjustment factors that allow it to take the form of a Beta distribution. Therefore, the Target Learn equation may be depicted more accurately as:

$$eRPM = Goal * \left( \frac{Conversions + \alpha - 1}{Impressions + \alpha + \beta - 2} \right) * 1000 * CadenceModifier$$

In this version of the formula, Alpha denotes successes (impressions that lead to a success event) and Beta denotes failures (impressions that do not lead to a success event). Cadence modifiers are described further below.

Referring back to the previous version of the Target Learn equation, the ratio of Success Events and Projected Success Events to Impressions and Projected Learn Impressions represents the "Conversion Rate" portion of the equation. Projected Success Events and Projected Learn Impressions help guide the Conversion Rate when there is not enough data to base the Conversion Rate on real success events and real impressions. By controlling the values of Projected Success Events and Projected Learn Impressions, the Targeted Learn algorithm produces a Conversion Rate based on a best guess at the probability of a real success event.

To define the value of the Conversion Rate guess, it is necessary to look to historical data. However, because no data has yet been accumulated, "higher-level" data sources are used to estimate what the real conversion rate would be.

For example, suppose an existing advertiser creates a new advertising campaign. The new campaign has no real success events or real impressions, but the advertiser may have a large number of success events and impressions which it has accumulated through other campaigns. Therefore, in the absence of data at one level (in this case, the Campaign level), a "higher level" (in this case, the Advertiser level) may be used to compute a Conversion Rate (by dividing Success Events by Impressions), and that higher-level Conversion Rate is then used to control the input of the Projected Success Events and Projected Learn Impressions for the new campaign's Learn algorithm.

Figure 9:
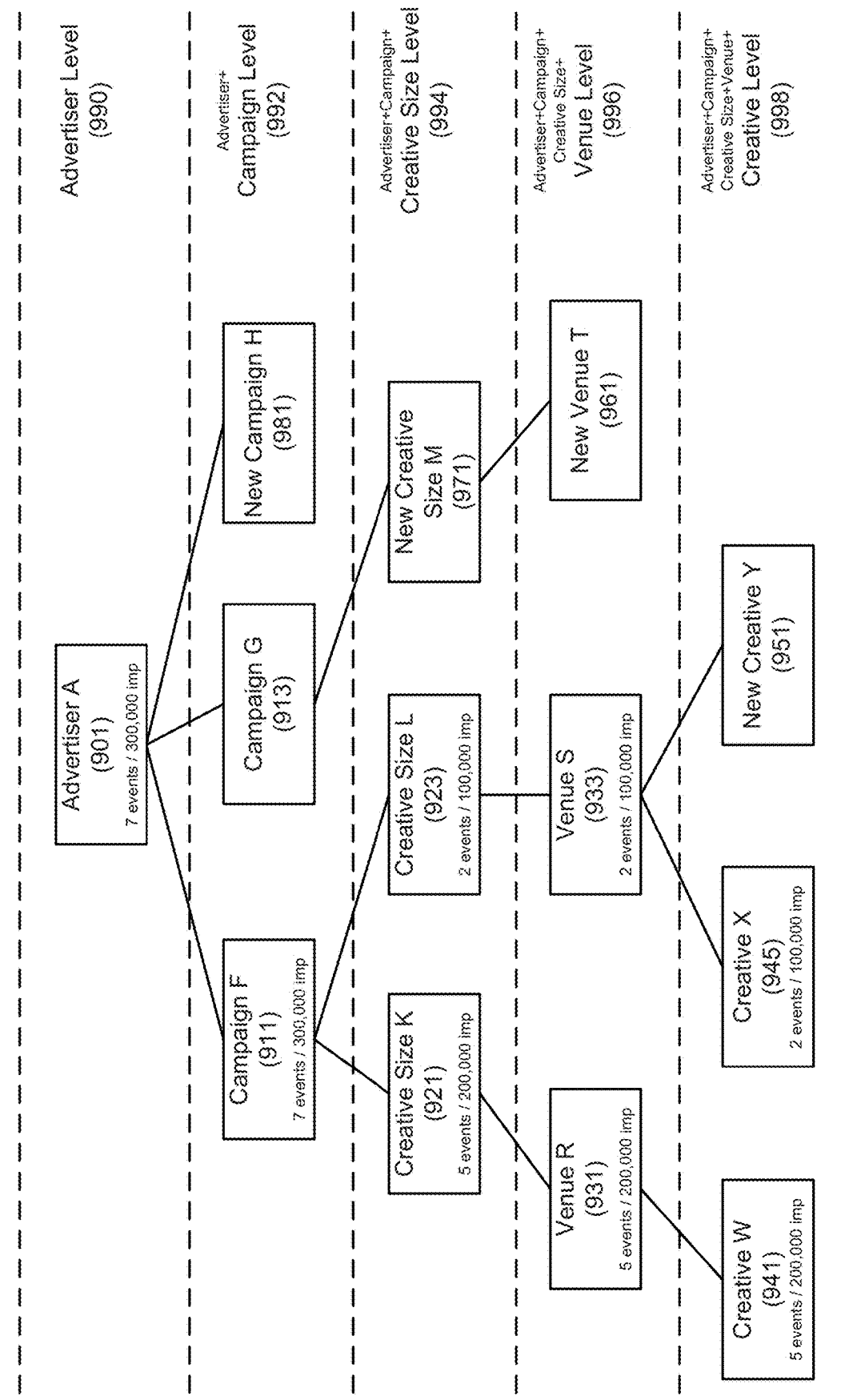
FIG. 9 shows an exemplary hierarchical structure for tracking creative performance.

In addition to looking at data at the Advertiser level when launching new campaigns, the same approach of looking to higher levels of generality may be used when data is scarce at other levels. For example, when campaigns introduce a new creative size, metrics from the Campaign level can be used to inform the higher-level Conversion Rate, and when new creatives are introduced, performance on other venues can be observed to determine a higher-level Conversion Rate at the Venue level. This hierarchy of levels generally follows a ladder-type diagram from the most granular level to the most broad level inside a particular advertiser. In some embodiments, the hierarchy is as follows:

Level 1: Advertiser
Level 2: Advertiser, Campaign
Level 3: Advertiser, Campaign, Creative Size
Level 4: Advertiser, Campaign, Creative Size, Venue
Level 5: Advertiser, Campaign, Creative Size, Venue, Creative An exemplary hierarchy incorporating these five levels is shown in FIG. 9. Each level of the hierarchy is associated with an advertising attribute, in addition to the attributes of the levels above it. For example, Creative Size Level 994 is associated with the attributes Advertiser, Campaign, and Creative Size.

For simplicity, the Advertiser level 990 is shown with a single advertiser; however, many distinct advertisers may exist at this level. Advertiser A 901 has two existing campaigns, Campaign F 911 and Campaign G 913. Campaign F 911 uses Creative Size K 921 in Venue R 931 with Creative W 941, and uses Creative Size L 923 in Venue S 933 with Creative X 945.

Within a certain time period (e.g., 24 hours, 7 days, 14 days), Creative W has been served 200,000 times (impressions), and has resulted in 5 success events (e.g., view-through events, click events, click-through events, and/or any other type of conversion event). In the same time period, Creative X has had 2 success events over 100,000 impressions. If Campaign F 911 introduces New Creative Y 951, there is insufficient knowledge of that creative's performance to formulate an accurate bid. To obtain the necessary historical data and calculate a useful Conversion Rate, the performance of other creatives for Advertiser A 901 can be aggregated to determine a higher-level Conversion Rate at the Venue Level 996. In some instances, the higher-level Conversion Rate is based on available and/or recent data from all creatives for the advertiser (here, Creative W 941 and Creative X 945 for Advertiser A 901). In other instances, the Conversion Rate may be based on data from creatives that are in the same venue as the new creative (here, Creative X 945 for Venue S 933). In further instances, the Conversion Rate may be based on data from creatives that share other advertising attributes with the new creative, such as creative size and campaign.

If the higher-level Conversion Rate is based solely on the performance of creatives in the same venue as New Creative Y 951, then the Rate is equal to 2/100,000, or 0.002%. If the Conversion Rate is based on the performance of all creatives for Advertiser A 901, then it is equal to the combination of data from Creative W 941 and Creative X 945. In some embodiments, the Rate is calculated by aggregating the total success events and impressions, and taking the ratio of the two (i.e., Conversion Rate=(5+2)/(200,000+100,000) =0.00233%). In other embodiments, the Rate may be calculated by averaging the conversion rates of the individual creatives (i.e., Conversion Rate=((5/200,000)+(2/100,000))/2=0.00225%).

Campaign G 913 consists of a New Creative Size M 971 and New Venue T 961. As no data yet exists for these nodes, the higher-level Conversion Rate may be derived from the Campaign level (or above, if insufficient data exists at that level). Likewise, the higher-level Conversion Rate for New Campaign H 981 will be based off of available data from Advertiser A 901. If other advertisers exist at the Advertiser level 990, data from those advertisers could potentially also be used to inform the Conversion Rate.

In other embodiments, the levels of the hierarchy may be ordered differently (e.g., Level 3 may be Advertiser, Campaign, Venue; and Level 4 may be Advertiser, Campaign, Venue, Creative Size; and so on). In further embodiments, a different number of levels may be used: more levels for greater granularity, fewer levels for increased generality. The Advertiser level may be the top level, or there may be a broader level above it. One skilled in the art will readily appreciate the various forms that the hierarchy may take.

In one example using the five-level hierarchy, Member #123 creates a new campaign (Campaign #999) for Advertiser #5555.

TABLE 5

Initial success event data for new campaign.

| Level | Impressions | Success Events | Conversion Rate |
|---|---|---|---|
| Campaign #999 | 0 | 0 | N/A |

As shown in the table above, Campaign #999 is new and has not yet accumulated any impressions or success events. Because of the lack of data, the Conversion Rate for Campaign #999 (Success Events/Impressions) is not calculable. Looking only at this data, it is not possible to calculate a historical Conversion Rate to serve as an input for the Learn algorithm. However, Advertiser #5555 has other campaigns that have already accumulated historical data that can be leveraged for the Learn equation.

TABLE 6

Success event data for new campaign including advertiser-level data.

| Level | Impressions | Success Events | Conversion Rate |
|---|---|---|---|
| Advertiser #5555 | 1,000,000 | 100 | 100/1,000,000 = 0.0001 (.01%) |
| Campaign #999 | 0 | 0 | N/A |

Referring to the table above, the performance of other campaigns for Advertiser #5555 can be aggregated (either all campaigns or some subset thereof), and the Advertiser level Conversion Rate for those campaigns can be determined. The resulting Advertiser level Conversion Rate is then used in the Learn equation for new Campaign #999. To do this, the Advertiser level Conversion Rate is used to calculate Projected Success Events and Projected Learn Impressions using the following equations:

$$ProjectedSuccessEvents = \text{Max}\left(1, 5 * \left(1 - \frac{Impressions}{GiveupThreshold}\right)\right)$$

and $$ProjectedLearnImpressions = \left(\frac{ProjectedSuccessEvents}{HigherLevelConversionRate}\right) - ProjectedSuccessEvents$$

In calculating Projected Success Events, "Impressions" is the number of impressions at the at the most granular level (in this case, the Advertiser, Campaign, Creative Size, Venue, Creative level (Level 5—see above)). "GiveupThreshold" is the mechanism by which campaigns stop bidding while operating in Targeted Learn mode. If an Optimization Node at the Creative Level (Level 5) reaches the GiveupThreshold without accumulating a single real success event, that Optimization Node will be killed and will no longer bid. As exemplary values, the GiveupThreshold is set at 90,000 impressions for campaigns with a Click goal (CPC); 300,000 Impressions for campaigns with a Post-View goal (CPA); and 500,000 for campaigns with a Post-Click goal (CPA). However, various other ranges of thresholds may be used depending on the characteristics of the campaign. For example, general trends among various types of campaigns may be observed to determine how many impressions are required to obtain a useful number of success events (i.e., to optimize the campaign). These trends may then be used to determine the GiveupThreshold for new campaigns.

In the Projected Success Events equation, the value for the first parameter may range from 1 to 5, decreasing to a minimum of 1 as more and more impressions accumulate. In some embodiments, the maximum value may differ from the value of 5 used above. In general, however, this maximum value should be selected such that the calculated Projected Success Events do not overtake the Learn equation and make it too difficult to exit learning mode. In essence, the maximum value should be selected such that there is a minimal reliance on the fabricated projected event data.

In the above exemplary case, assuming a Post Click goal campaign, the equations produce the following results when just starting out:

$$ProjectedSuccessEvents = \text{Max}\left(1, 5 * \left(1 - \frac{0}{500{,}000}\right)\right) = 5$$

$$ProjectedLearnImpressions = \left(\frac{5}{0.0001}\right) - 5 = 49{,}995$$

$$LearnRank = Goal * \left(\frac{0 + 5}{0 + 49{,}995}\right) * 1000 = Goal * 0.1$$

After 200,000 impressions and 3 conversions, this new campaign produces the following bids:

$$ProjectedSuccessEvents = \text{Max}\left(1, 5 * \left(1 - \frac{200{,}000}{500{,}000}\right)\right) = 3$$

$$ProjectedLearnImpressions = \left(\frac{3}{0.0001}\right) - 3 = 29{,}997$$

$$LearnRank = Goal * \left(\frac{3 + 3}{200{,}000 + 29{,}997}\right) * 1000 = Goal * 0.026$$

As shown by the results of the Learn equation, the availability of real data for performance of the campaign allows for the calculation of the Conversion Rate as applied to the Goal, and results in a bid value that more accurately represents the value of the advertising space to the member.

6.1.3 Bayes (Dynamic) Funnel

The "Bayes Funnel," or "Dynamic Funnel" involves defining granular slices of historical advertiser data, which, in some embodiments, may be the increasingly granular slices as described above (e.g., Advertiser, Campaign, Creative Size, Venue, Creative). Advertiser data collected at the lowest level of the hierarchy (i.e., the unique combination of an attribute from each level) represents an optimal set of data.

The Targeted Learn process uses the most granular level of this funnel for which a minimum number of success events exists (e.g., at least five success events, although any suitable number may be used). For example, if a particular campaign has only three success events, but that campaign's advertiser has had eight success events total (i.e., there is an accumulated total of eight success events for all or some set of campaigns of that particular advertiser), then the Advertiser level of the funnel is used for calculating the higher-level Conversion Rate (if there are less than five success events at the Advertiser level, a default global valuation is instead used, as explained below). As described above, this Conversion Rate may be the ratio of the number of success events as compared with the total impressions associated with that level of the hierarchy.

Once the campaign reaches five (or some other predetermined threshold value) success events, the next level down is used—in this case, the Campaign level. As additional success events are identified and event data is acquired, and while a campaign is still in learn mode, lower levels of the hierarchy can be used to calculate the higher-level Conversion Rate. For example, once there are at least five success events at the Creative Size level, the higher-level Conversion Rate can be calculated based on success events and impressions at the Creative Size level. This funnel process may continue until either the GiveupThreshold is reached and bidding is terminated, or until enough success events are acquired at the lowest hierarchy level such that learning mode is complete and optimized bidding can be used.

When traversing levels in the hierarchy during the Bayes Funnel process, the higher-level Conversion Rate may change, thereby affecting the calculation of ProjectedImpressions (see equation above). The equation for determining ProjectedSuccessEvents can also consider these level changes, as shown in the following variant, where α is the number of projected success events:

$$\alpha_{new} = \text{Max}\left(1, \alpha_{old} * \left(1 - \frac{Impressions}{GiveupThreshold}\right)\right)$$

Using the above equation, $\alpha_{old}$ is initialized to 5 when a new level in the Bayes funnel hierarchy is reached. In contrast, when the equation is re-evaluated on the same level, $\alpha_{old}$ is set to previously calculated value of $\alpha_{new}$.

6.1.4 Default Higher-Level Conversion Rate

In some embodiments, the "higher level" chosen by the Targeted Learn algorithm may be the most granular level of detail (the lowest level of the hierarchical ladder) that has accumulated a threshold number of success events over a fixed period of time (e.g., at least five success events in the past seven days). The threshold and time period values are configured such that enough data will accumulate at the higher level to have a reasonable sample size.

If fewer than the threshold number of success events have been accumulated at the top level of the hierarchy (here, the Advertiser level), then the higher-level Conversion Rate is dictated by a "dynamic" Default Learn Rank equation. This equation considers the Venue Average CPM (platform-wide) in the calculation of what the bid value should be. By using the Venue Average CPM, the conversion rate may be determined on a campaign in order to generate a Learn Rank that matches the Venue Average CPM.

The equation for the dynamic default higher-level conversion rate may be represented as:

$$\text{Default Rate} = \left(Weight * \frac{AdvertiserLevelSuccessEvents}{AdvertiserLevelConversions}\right) + \left((1 - Weight) * \frac{VenueAverageCPM}{Goal}\right)$$

where $$Weight = \frac{AdvertiserLevelImpressions}{GiveupThreshold}$$

"GiveupThreshold" is set at 90,000 impressions for campaigns with a Click goal (CPC), 300,000 Impressions for campaigns with a Post View goal (CPA), and 500,000 for campaigns with a Post Click goal (CPA). However, it is to be appreciated that various other ranges of thresholds may be used depending on the characteristics of the campaign.

"VenueAverageCPM" is the average CPM observed on that Venue platform-wide. If the Venue is brand new (and thus does not have enough data to calculate a VenueAverageCPM, then the probability may be set equal to fixed defaults, for example: 0.001 for Click campaigns (CPC) or Post-View Action Campaigns (CPA—post view) and 0.00005 for Post-Click Action campaign (CPA—post click). Other default values may be used based on observing trends in success event data for various types of campaigns.

6.1.5 Bootstrapping

As advertising performance data is accumulated conversion rates from more granular levels of the hierarchical ladder are available; i.e., from the Advertiser level Conversion Rate, to the Campaign Level Conversion Rate, to the Creative Size Conversion Rate, and so on, down to the most granular level (in the exemplary five-level hierarchy, the Creative level). However, rather than abruptly jumping down the levels of the ladder, a "Bootstrapping" equation is used to "smooth out" the transition to lower levels of the hierarchy.

The Bootstrapping equation considers a weighted average of the Conversion Rates at two different levels of the ladder. In one embodiment, the first level is always the Advertiser Level and the second is the most granular level of the ladder that has accumulated a threshold number of success events in a fixed time period (e.g., 5 success events within the past 7 days). By taking a weighted average of these two Conversion Rates, the resulting Conversion Rate falls between these two levels. In other embodiments, however, the conversion rates of any levels of the hierarchy can be used or combined to produce the desired Conversion Rate.

If the Advertiser level and the most granular level of the hierarchy with sufficient success event data are used to calculate the Conversion Rate, the Bootstrapping equation may be represented as:

$$p = \omega * \frac{\alpha_{level}}{\alpha_{level} + \beta_{level}} + (1 - \omega) * \frac{\alpha_{adv}}{\alpha_{adv} + \beta_{adv}}$$

where Omega denotes the weight applied to each conversion rate, Alpha denotes successes (impressions that lead to a success event) and Beta denotes failures (impressions that do not lead to a success event).

In a more simplified form, the above equation is:

$$p = \omega * P_{curr} + (1-\omega) * P_{adv}$$

In this form, $P_{curr}$ is the probability of success based on the current level of the Bayes funnel and $P_{adv}$ is the probability computed solely from the Advertiser level; i.e. $P_{curr}$=current level successes/current level impressions and $P_{adv}$=advertiser level successes/advertiser level impressions.

As data is accumulated and Conversion Rates at lower and lower levels of the hierarchy are used, it is possible that some higher CPM venues will be unfairly excluded. The Bootstrapping algorithm is meant to counteract this effect.

For instance, consider a universe having only two Venues, one existing Advertiser and one new Campaign, in which Venue A has an average CPM of $1 and Venue B has an average CPM of $10. Because the campaign is completely new, the Advertiser level data (Level 1) will be used to compute the bid. The campaign, while bidding using the Level 1 Conversion Rate (i.e., the Advertiser level Conversion Rate), may accumulate enough success events from Venue A to move to Level 2 (the Campaign level) without winning many impressions on the more expensive Venue B. If the Conversion Rate at Level 2 is lower than Level 1, the calculated bid will be even lower on Venue B and win even fewer impressions.

Following this path down the hierarchy, it's unlikely that Venue B will ever achieve enough impressions to allow an accurate judgment of its value. While Venue A may be the cheaper, low hanging fruit, some number of impressions on Venue B should be shown as well. For example, Venue B may be more expensive, but it also may have a much higher conversion rate, and therefore be just as, if not more profitable. In order to help give Venue B a chance—rather than jumping down and using the Conversion Rate from Level 2, the Bootstrapping equation results in the use of a weighted average between the Conversion Rates of Level 1 (Advertiser) and Level 2 (Campaign).

The weight of each Conversion Rate is determined by the distance between the conversion rates at the two levels If the Level 2 Conversion Rate is below the Conversion Rate at Level 1, the Level 1 Conversion Rate is more heavily weighted. Conversely, if the Conversion Rate at Level 2 is higher than the Conversion Rate at Level 1, the Level 2 Conversion Rate will be attributed the heavier weight. In other words, weighting may be used to artificially favor the higher conversion rate.

One method of computing the level weighting is to use the following equation:

$$\omega = \int_0^{P_{curr}} \text{Beta}(t, \alpha, \beta_{adv}) dt$$

In this equation, $\beta_{adv}$ represents the failures that are expected to occur to obtain a successes based on $P_{adv}$, the success rate at the advertiser level. Omega is defined as the area under the beta distribution with parameters $\alpha$, $\beta_{adv}$ from 0 to $P_{curr}$. In other words, Omega is the probability of observing a success rate less than or equal to $P_{curr}$, assuming the probability of a success event is equal to that at the advertiser level, $P_{adv}$.

Note that the average of the beta distribution with parameters $\alpha$, $\beta_{adv}$ is $\alpha/(\alpha+\beta_{adv})=P_{adv}$. Therefore, if $P_{curr}<P_{adv}$, the weighting is biased toward the Advertiser level data. On the other hand, if $P_{curr}>P_{adv}$, the bias is toward the current Bayes level data in the hierarchy.

In certain circumstances, the Bootstrapping equation may result in the calculation of overoptimistic bids. For example, consider a case where a traditionally successful advertiser enters learning mode with a bad campaign. As the new campaign starts perform poorly, bootstrapping will bias toward the favorable advertiser level data, keeping the campaign from reaching the GiveupThreshold and terminating bidding. The worse the campaign does, the more bootstrapping will bias toward advertiser level data, continuously slowing the crawl towards bid termination. Eventually the node will terminate bidding, but in the meantime the advertiser may have overspent its budget, and the advertiser's other campaigns will be slowed in their learning because of the impressions being allocated to this campaign.

To address these overoptimistic niche cases, the calculated weighting is compared against a threshold cutoff value. For example, if Omega <0.01, no bootstrapping is applied. In other words, if a creative is performing especially badly at the Bayes funnel level, only the data at that level is considered, allowing the creative to reach the GiveupThreshold.

6.2 Optimized Bidding

Once sufficient data has been collected in learning mode, the bidding strategy of the campaign can be optimized. The optimal bid is one that is equal to the amount that the advertiser is willing to pay for a success event (e.g., click or conversion).

In a first stage of bidding optimization, the accuracy of the bids is improved using the following algorithm to set the initial optimized bid price:

$$\text{Convs/imps} * 1000 * CPA \text{ goal} * \text{Margin modifier} * \text{Cadence modifier}$$

The parameter convs/imps is the historical conversion rate (i.e., conversions per impression).

CPA goal is set by the bidder based on desired revenue for the advertising campaign. In general, the CPA goal is set to equal the revenue. Margin modifier is then adjusted by the bidder to generate the desired profit margin.

For instance, if an enrollment in a bicycle rental business is worth $50, the CPA goal is set to $50. However, if a $50 CPA was actually paid in the advertising campaign, no profit would be made. Suppose that the desired profit is $10; that is, the actual CPA is $40 and the margin (also known as ROI) is 25%. The margin modifier, which is defined as 1/(1+margin), would then be 0.8. As another example, assume an advertiser desired a 200% margin. In this case, the margin modifier is 0.33 (1/(1+2)); for a $50 CPA goal, the spend is $16.67 and the profit will be $44.44. In some instances, an advertiser may set a static CPA goal (e.g., $40) indicative of the amount the advertiser is willing to pay in order to acquire a sale, in which case the margin modifier is 1.

As another example, let us return to the cheese-of-the-month club example discussed above. It was determined that the conversion rate is 1 per 2000 impressions for 25-30 year old Oklahoman men on myspace.com. The optimal bid price can then be determined using the above algorithm. Since the revenue for an acquisition is $50, the CPA goal is set to $50. Although any acquisition that costs less than $50 will net profit, impressions can preferably be acquired for much less than $50. The margin modifier helps control the revenue: if the cheese-of-the-month club desires a 95% profit margin, the margin modifier is set to 0.05. Ignoring the cadence modifier (which adjusts the bid according to frequency; discussed below), the bid price is then set at $1.25 (1/2000*50*0.05*1000).

When sufficient bid accuracy has been achieved, bid optimization moves to the second stage, throttling, in which the pacing of the bidding is controlled to ensure that the campaign does not spend through its budget too quickly. The throttling algorithm caps the bids that are submitted based in part on the number of conversion events: Max CPM=EAP+(ECP−EAP)*prediction confidence, where prediction confidence=(conversion events)$^2$/(confidence threshold)$^2$. In some embodiments, the confidence threshold is static (e.g., 1000); in other embodiments, bidders can set their own confidence threshold. The bid price itself is still set using the algorithm provided above.

Once there have been 31 conversion events, the campaign nears the confidence threshold of 1000 and is considered optimized. At this point, pacing may still be used to deliver the budget (e.g., by declining to bid on every eligible impression), but throttling via optimization mode ends.

6.3 Cadence Modifiers

Cadence modifiers are used to modify bids by adjusting the bids up or down based on various factors. For instance, after a bid value is calculated, it may be multiplied by a cadence modifier to produce an adjusted bid. Cadence modifiers may be based on factors such as impression frequency and recency. Frequency reflects how often a user has been exposed to an ad, while recency reflects the time since a user was exposed to an ad. Generally speaking, the more times a user has seen an ad within a shorter amount of time, the less additional impact the next ad shown will have on that user to click or make a purchase. Other factors may be used in the calculation of cadence modifiers, such as the time of day, the day of the week, the month, whether it is a holiday, and so on. For example, on particular websites, users may be more receptive to ads on a Saturday night, even when the users have seen the ad frequently.

If one assumes that incremental response rates are always higher with greater recency and lower frequency, an exemplary cadence modifier formula may be represented as:

$$e^{B_0 + B_1 * FrequencyModifier + B_2 * RecencyModifier} + C$$

where the frequency coefficient $B_1$ is always negative and the recency coefficient $B_2$ is always positive. In addition, $B_1$ and $B_2$ are modeled separately from each other, so the interaction effects between frequency and recency are not taken into account. A constant C is added to ensure that the modifier has an absolute floor (i.e., does not reach zero), such as 0.05.

In actuality however, lower frequency and greater recency do not always result in increased response rates. For example, in some instances, the highest conversion rates may occur when frequency is low to moderate, combined with a moderate recency. Essentially, the varying characteristics of visitors to certain websites may result in unique patterns in the response rates of those visitors to advertisements displayed on the website. Thus, it is necessary to use cadence modifiers that account for these variations in response rates to a range of frequency and recency values.

To provide more accurate cadence modifiers, frequency and recency range pairs are divided into a grid with multiple sections. Referring to FIG. 11, an exemplary grid contains nine sections, each having a predefined cadence modifier value, and an additional high frequency section having a lower value. This allows the use of more flexible cadence modifier models that may not always increase valuations with higher recency and lower frequency. Other arrangements with a greater or fewer number of sections are also possible. Such arrangements may depend on how frequency/recency range combinations are divided to produce a cadence modifiers that are each statistically representative of a set of combinations. Additional factors, other than frequency and recency, may be incorporated into the calculation of the cadence modifiers and thereby into the grid. For example, a grid based on frequency, recency, and time of day will be three-dimensional. Adding further factors to the grid will add that number of dimensions.

Conceptually, the sections can be represented as follows, where, for example, m(1,1) represents the cadence modifier value for Frequency section 1 and Recency section 1, and each Frequency and Recency section represent a frequency or recency bucket (range of values), respectively. In some embodiments, each m value is an average of all of the values within that section. For example, m(1,1) would be the average of all points lying below Frequency 2 and below Recency 2.

Borders for each grid section are determined based on frequency and recency points that result in minimum error versus the average for each section. In other words, each distinct section optimally contains points that are substantially uniform. One method to determine the grid section borders is to first iterate through the different frequency and recency points, and calculate the total error by determining the difference in response rates between each point and the average within the section. Then, the borders are set to the frequency and recency points that result in the least total error within the section. As a result of the iteration, all possible frequency and recency borders are explored.

The border for the high frequency section, m(High Freq), is set at the approximate point where the greatest change in performance relative to the average of previous frequency points is seen. Again, this calculation is made for every iteration of frequency points up to the maximum frequency stored in the cadence modifier table (e.g., max frequency=20). The default value for the high frequency section is generally set to a value that causes the resulting calculated bid to be very low. For example, the default high-frequency cadence modifier may be 0.01, resulting in very low bids on when a user has already been shown the same advertisement many times. In some embodiments, there may be, in addition or alternatively, special cadence modifiers associated for low and/or mid-level frequencies, low, mid-level, and/or high recencies, or any special value or range of frequency, recency, or other factor requiring special treatment.

In other embodiments, the predefined cadence modifiers are arranged in any suitable format, and may include other factors in addition to frequency and recency, thereby forming multidimensional matrices, with each matrix element containing a cadence modifier value. These matrices may contain any number of rows, columns, and dimensions, and each element may be associated with individual values or ranges of values (e.g., a single frequency or a range of frequencies, in combination with any other factors associated with the element).

Some campaigns may be uniquely calibrated; i.e., their cadence modifiers are not determined based on a pre-defined grid or other arrangement. Unique calibration may be performed when a particular venue does not exhibit behavior that fits within the expected patterns on which the pre-defined grid is based. In these unique cases, the appropriate cadence may be calculated by dividing the average unique action rate by the total action rate. In certain instances in which a user has not previously seen a particular ad, a unique cadence modifier may be determined. In cases in which the system can definitively determine that the user has not seen the ad, one value may be used, whereas in instances in which the system cannot make such a determination, another value may be used. Such a determination is important because users that are known not to have viewed an ad are considered valuable, whereas users for whom such a determination cannot be made (because, for example, they have the cookies function disabled in their browser) are of much less value.

In some embodiments, cadence randomization is incorporated into the determination of a cadence modifier. The reasoning for this stems from the observation that when a cadence model is shared amongst multiple creatives, the best performing creative will win the vast majority of inventory. If there is only a slight difference in performance, the other creatives will almost never have the chance to serve. If the error in the cadence model (i.e., standard error between the model and observed data points) is known at the time of calibration (there is always some degree of error), that data may be incorporated into the bid valuation.

For example, assuming there are three creatives:
Creative 1: base valuation of 1, unique cadence of 1.5
Creative 2: base valuation of 1.1, unique cadence of 1.5
Creative 3: base valuation of 0.95, unique cadence of 1.5
In this example, all of the creatives have very close valuation, but because Creative 2 is valued highest, it will be shown to every unique user (in many cases, unique users are considered more valuable to advertisers). Thus, without sufficient randomization, the other creatives are served only to non-unique, less valuable users.

Assuming an accepted error of 10%, the bid equation with cadence randomization becomes:

$$\text{Base Valuation} * \text{Cadence Modifier} * (1 \pm \text{random error})$$

By adding the randomization, Creative 2 will still win most of the time, but when it gets a 10% hit and another creative gets a 10% bump, Creative 1 or 3 is shown instead. If 20% is used rather than 10%, more randomness is introduced, which results in greater "rotation" of the creatives. In a sense, this is a lever that facilitates control over the rotation of creatives. The randomization parameter may be preset, or, in some cases, may change over time and converge on a specific value that achieves a particular rotation frequency among the creatives.

6.4 Exemplary Embodiment of Optimization System Architecture

Figure 11A:
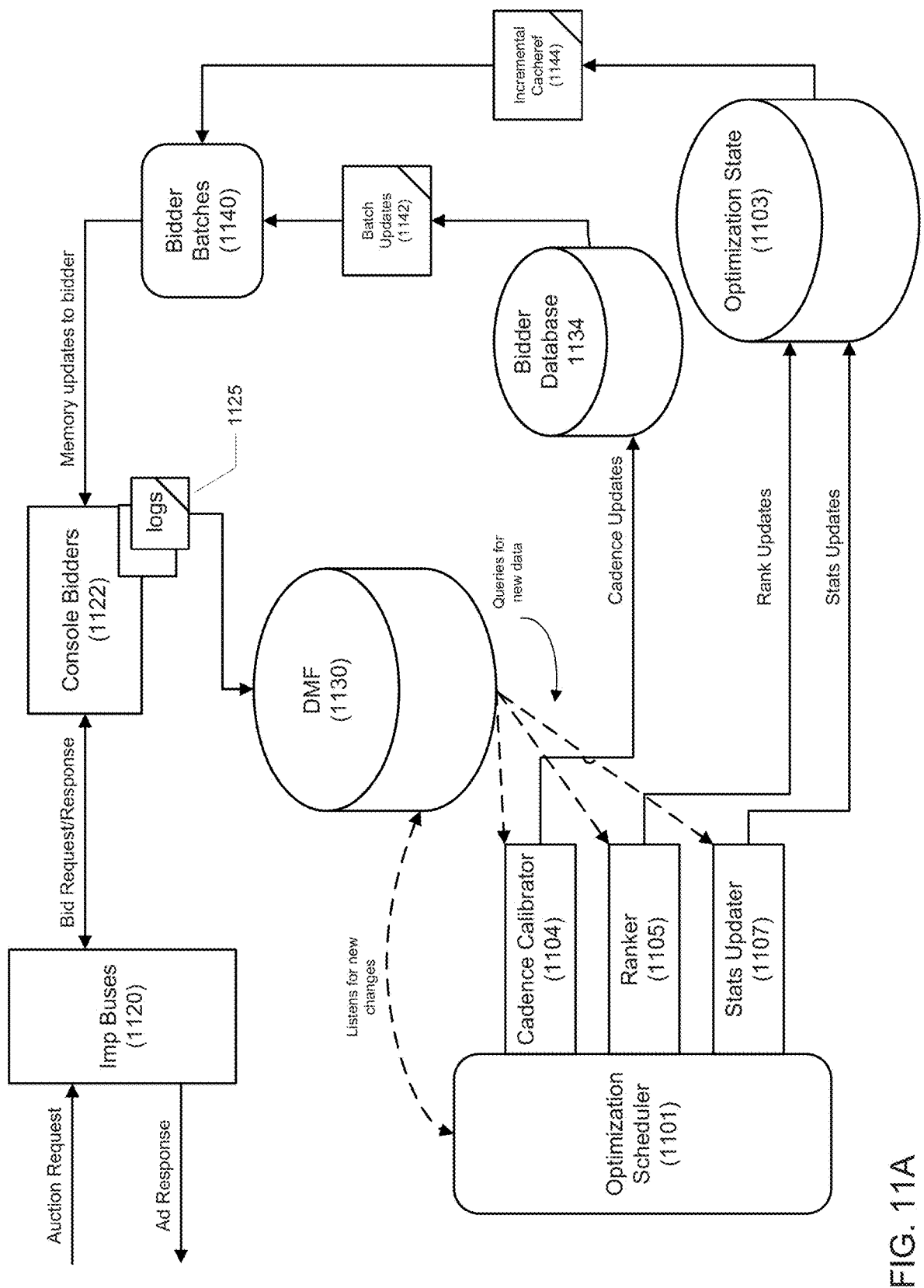
FIG. 11A shows a high-level diagram of an exemplary optimization system architecture.

In an exemplary implementation of a bidding optimization system using the Targeted Learn algorithm, each campaign uses optimization data to inform bidders where and how to achieve optimal bidding results. The optimization data stream allows for incremental updates that can take in data from multiple processes. FIG. 11A illustrates one embodiment of an optimization system architecture, in which there are multiple Implementation ("Imp") Buses 1120 and Console Bidders 1122. The Console Bidders 1122 generate logs 1125, which contain information on every impression served. The logs 1125 are aggregated and transmitted to the Data Management Framework (DMF) 1130 via a log processing pipeline. The DMF 1130 includes database storage, and scheduling components, and may be located remotely from other components of the system. Following aggregation and other processing in the DMF 1130, the processed results are pushed to a high-performance data warehousing system where they can be retrieved and analyzed.

The Optimization Scheduler 1101 listens to the DMF 1130 for new data. In some embodiments, the DMF 1130 alerts the Scheduler 1101 when new data is available, while in other embodiments, the Scheduler 1101 queries the DMF 1130 to determine if updates exist. Upon determining that new data is available, the Scheduler 1101 invokes the Cadence Calibrator 1104, Creative Ranker 1105, and Stats Updater 1107 to retrieve any relevant information. The Cadence Calibrator 1104 updates the cadence models maintained by the system. This Calibrator 1104 may process data and update the models at a fixed interval, e.g., once per day, or at any other suitable time. The Creative Ranker 1105 calculates expected revenue for creatives (via the Bayes funnel method, described above). The Ranker 1105 may run more frequently than the Calibrator 1104, e.g., once an hour—and in some instances the two components run independently of each other. The Stats Updater 1107 reads optimization data, such as impressions, clicks, conversions, and other data, and updates associated statistics for later use in calculating optimized bids. The Updater 1107 may run at any periodicity, e.g., daily, hourly, on demand, or any other suitable frequency.

The Bidder Database 1134 and Optimization State 1103 may be maintained as two separate data stores; however, they may be stored in the same environment. Cadence updates are sent via the Cadence Calibrator 1104 to the Bidder Database 1134, and creative ranker and statistics updates are sent via the Ranker 1105 and Stats Updater 1107, respectively, to the Optimization State database 1103. Bidder Batches 1140 repeatedly queries the databases 1134 and 1103 to check for new information (typically at a fixed interval, e.g., 30 seconds, 2 minutes, or any suitable polling period) and pulls this information directly into cache memory. Batch Updates 1142 and Incremental Cacheref 1144 are the same processes for Bidder Database 1134 and Optimization State 1103, respectively, that return data when queried by Bidder Batches 1140. Bidder Batches then distributes the new information to the Console Bidders 1122 so that bids can continue to be formulated in an optimized manner.

Figure 11B:
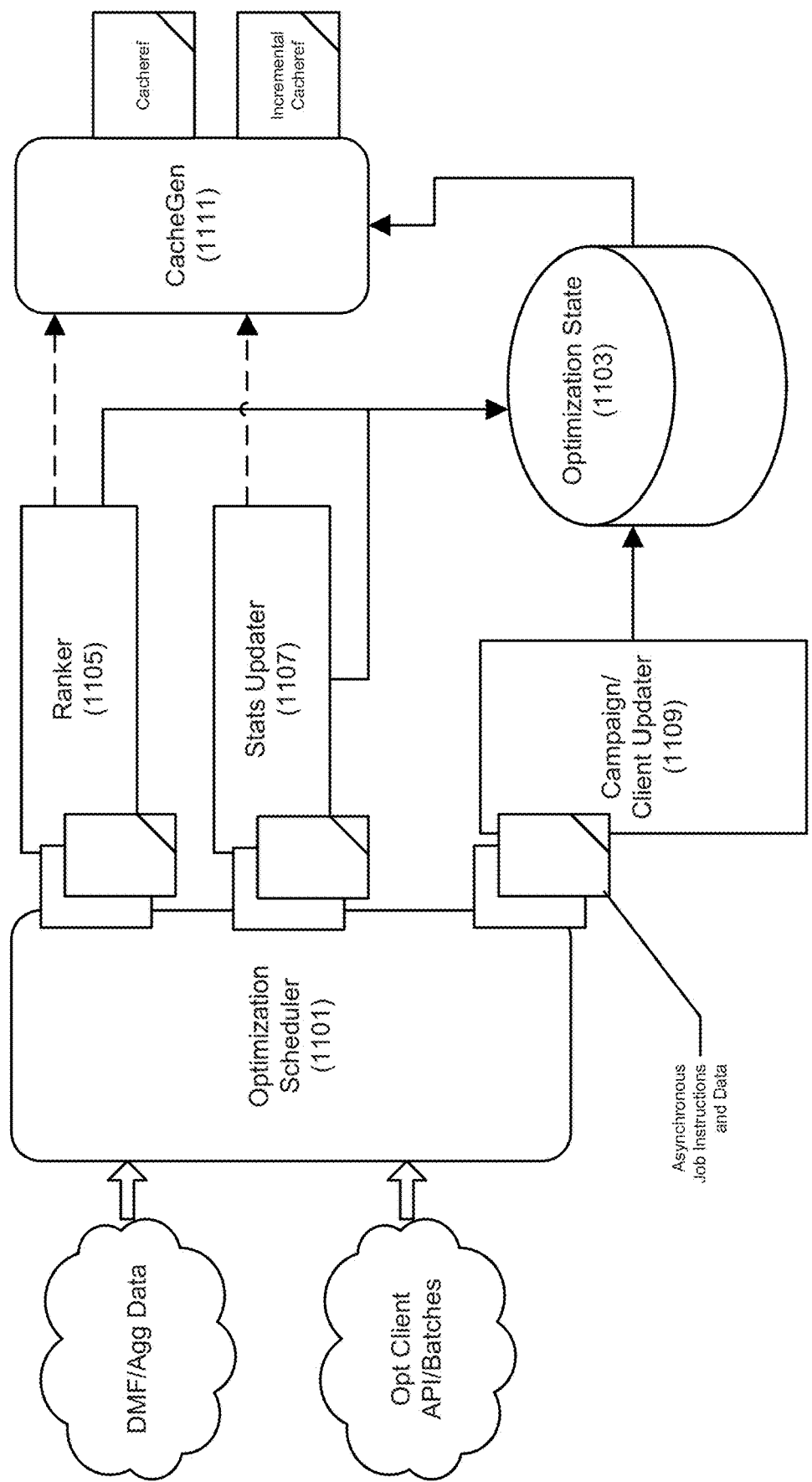
FIG. 11B shows a high-level diagram of a portion of the exemplary system illustrated in FIG. 11A.

FIG. 11B illustrates a more detailed view of a portion of the architecture shown in FIG. 11A. Optimization Scheduler 1101 handles the scheduling of updates of different types. The Scheduler 1101 permits updates to be performed asynchronously, rather than updating all data at once. It also exposes RESTful APIs that can be used for optimization data updates—for example, if a campaign owner wants to manipulate their own valuation data and targeted learn order.

As described above, the Optimization State database 1103 takes in updates from different sources and feeds the cache that the Bidder Batches 1140 reads from. It also allows for faster cache file regeneration in the event that the cache file is lost. The Ranker 1105 produces batches of ranking/valuation updates that are fed to the Optimization State 1103. It can also pass updates to the Cache Generator 1111 directly in order to reduce the number of times the Optimization State 1103 needs to be read to keep the cache files up to date.

The Stats Updater module 1107 consumes aggregated data supplied by the Scheduler 1101 and updates the Optimization State 1103 (and like the Ranker 1105, can update the Cache Generator 1111 directly as well). The Campaign/Client Updater 1109 updates the Optimization State 1103 with new campaigns and clients, and the Cache Generator 1111 handles the creation of incremental and full cache refs used in getting updated data to bidding modules.

7. Venue Creation

In some embodiments, a venue creation system groups impression inventory units into venues containing impression inventory units having similar historical performance characteristics (e.g., CPM, cost-per-click, or cost-per-acquisition). In some cases, impression inventory units are characterized based on historical impression volume; venues are then formed such that the constituent impression inventory units have an aggregate impression volume that exceeds a threshold. Multiple venues may be created, each venue with a different threshold aggregate impression volume. In some embodiments, venues are created based on other inventory attributes (e.g., geo_country, tag_id, or url) in addition to or instead of performance data. Venues preferably include a group of inventory that will have substantially consistent performance over a period of time.

Venues are often used in conjunction with the optimization system described above. For instance, the initial bid price for a bid price optimization is determined based on pricing data associated with one or more venues. Alternatively, bid price optimization may be performed using only inventory in a particular venue (e.g., a venue selected based on its aggregate impression volume).

7.1 Automated Venue Creation

In operation, the venue creation system selects all inventory combinations of site/tag/geo, retrieves the impression volume for that inventory for a period of time (e.g., 7 days prior). Each combination of inventory having an impression volume above a certain threshold is added to the container of venues, and removed from the list of possible combinations. The list is then collapsed, grouping by geo; that is, the list is converted to a list of site/tag pairs, each with an impression volume equal to the sum of all site/tag/geo tuples with the same site/tag value. From this list, site/tag pairs above the impression volume threshold are selected, and added to the container of venues. All combinations of site/tag/geo having the site/tag pairs that were added to the container of venues are removed from the initial list of possible combinations. With what remains in the initial site/tag/geo list, the site parameter is collapsed out, leaving tag/geo pairs. Any tag/geo pairs having impression volume above the threshold is removed from the list and added to the venue container. The process is then repeated one more time to obtain the stand-alone tag pairs. The venue container that results is the up-to-date list of venues.

Many of the venues in the up-to-date list of venues may be already in production, and there may be many venues in production that are not included on the list. To rectify this, all existing venues are read from tinytag and venue_lookup and loaded into a production list. Anything that appears in the up-to-date venue container is removed from the production list. What remains on the production list are the venues that need to be deleted, which are added to a list of deletes. Next, everything in the list of existing venues is removed from the list of up-to-date venues. Each remaining venue needs to be added. The result of this comparison process is two sets of sql, one for removing venues and one for adding venues.

There are two main parameters in the above algorithm: the look back window size and the impression threshold. If the look back window size is made too large (i.e., impressions in the too distant past are considered), volume changes may not be noticed quickly. Conversely, if the look back window size is made too small, random variations or predictable but short-term (e.g., day of the week) variations will needlessly complicate the creation of venues. In some embodiments, a 7 day look back window is appropriate. As for impression threshold, a threshold that is large enough to allow multiple creatives to be optimized within a reasonable time is preferable. However, such a threshold can vary between managed inventory and real-time inventory, and between CPC and CPA type bidding.

Several containers of venues and lists of sql statements are held in memory at any given time. Thus, if too many venues are created, the venue creation system runs the risk of consuming too much memory. For instance, for an advertising platform having 5 billion impressions per day and more than 500,000 impressions per venue, the number of venues preferably does not exceed 10,000. If the number of impressions increases, the size of venues decreases, or the complexity of the venue creation algorithm increases, memory concerns become more pressing.

In some embodiments, venues are grouped in more complex ways than that described above. For instance, several countries may be grouped together in the same venue, rather than grouping either all countries or a single country, based on the geo tag. Furthermore, additional attributes (e.g., performance, audience, or category) may be used in conjunction with or instead of the tag, site, and geo attributes and the publisher and buyer default attributes in the creation of venues.

For managed inventory, all volume of inventory is winnable. However, when bidding on external exchanges, win rates at ECP are often well below 100%. In these cases, a better measure of volume is the sum over all components of a venue that have an ECP value of (Win Rate at ECP*average daily volume). In these cases, venues are created based on the actual volume of winnable inventory.

7.2 An Example of Venue Churn

Figure 8B:
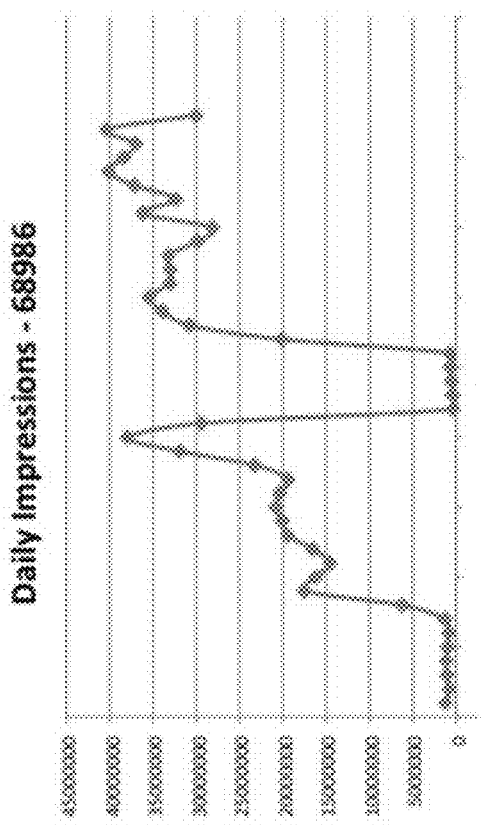
FIG. 8B shows inventory availability plotted for a two-month period across an annual boundary.
Figure 8A:
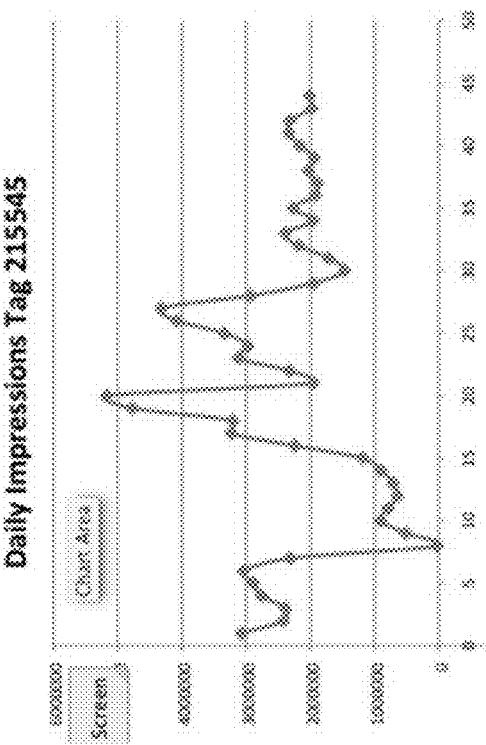
FIG. 8A shows inventory availability plotted for a two-month period across a quarter boundary.

Referring to FIGS. 8A and 8B, as an example of churn, inventory availability is plotted for a two-month period across a quarter boundary (FIG. 8A) and across an annual boundary (FIG. 8B). Note that tag, rather than venue, is used as the unit in this example. A random subset of 290 tags were selected for consideration; the venue creation threshold was set at 5 million impressions and the venue deletion threshold was set at 1 million impressions. With these parameters, only 18 out of 290 tags (~6%) meet the parameters. Even in those cases, most tags do not fluctuate to above or below the threshold for a significant duration. Notably, the annual boundary does not appear significantly disruptive. Referring to FIG. 8A, it can be seen that Tag 215545 only briefly crosses above the venue threshold at a point 800 around day 20, but generally remains below the venue threshold. Referring to FIG. 8B, Tag 68986 only briefly crosses below the venue threshold for a period 802, before rebounding quickly.

Given the short-term instability of impression volume, 7-day and 14-day moving averages may be used to smooth out some of the noise.

7.3 Reducing Venue Churn

If a hard threshold is set for the number of impressions required to form a venue, there will invariably be a number of venues that cross above and below this threshold as impression volume fluctuates. That is, for instance, a given chunk of inventory may have sufficient volume to form a venue on one week but may no longer have enough volume the following week. This fluctuation, known as venue churn, in turn causes other venues to move above and below the threshold. Repeatedly removing and re-adding venues and copying all the associated learn data is inefficient. Furthermore, optimization data may be lost in the process. Thus, if venue churn affects only a small number of venues or otherwise does not significantly impact the optimization process, it can be ignored.

If venue churn is more significant, the venue creation system is configured to minimize the impact of violent swings in impression volume due to ordinary business cycles or extraordinary events and the appearance and disappearance of various inventory sources on venue creation.

One way to minimize the impact of venue churn is to minimize the number of optimization keys. In general, optimization data is accessed by a bidder using a key into the data cache. The key is composed of several pieces, one of which is venue. As new venues are created, the number of keys increases, bloating the cache. Thus, the venue creation system reduces the number of new keys created and eliminates unused or unnecessary keys. For instance, the venue creation system may remove low volume venues that are not well suited to optimization, e.g., venues with fewer than 50,000 daily impressions. To handle the possibility of volume fluctuations, a grace period (e.g., 1 month) may be applied; small venues with low volume can persist for the grace period before being removed. In some cases, member-level venues are not removed even if their impression volume is below the threshold.

As venues churn and inventory moves between venues, the venue creation system ensures that learn data is not lost and that it remains accessible to inventory buyers. Preferably, the accuracy of bids based on acquired learn data should change as little as possible as venues change. For instance, if small venues are merged into larger venues, the buyers of the small data are preferably able to continue to make intelligent bids even when bidding on inventory in the larger venue. Minimizing the sort of churn that causes small venues to be converted into larger venues is one way to avoid any changes in bidding strategy that may be warranted due to a change in venue size.

Venue churn can be reduced or entirely eliminated by the creation of one or a few very large venues. However, a small number of large venues does not serve the desired purpose of maximizing the amount of inventory in optimizable venue chunks. Thus, the venue creation system appropriately addresses the trade-off between minimizing venue churn and grouping inventory into venues that are small enough so as to be optimizable.

In minimizing the effect of venue churn, the venue creation system works under the assumption that inventory is generally stable, with some inventory volume fluctuation and the occasional appearance or disappearance of venues. Additionally, the venue creation system generally creates venues daily and of a predetermined size, optimizing for granularity of venue. That is, inventory is added to the most granular venue possible.

7.4 Removing Low Volume Venues

Venues that have low volume because they have been orphaned by the venue creation process are fundamentally different than venues that have had dwindling volume due to changes in the makeup of inventory. Orphaned venues that are below a certain threshold (which may be different than the low-volume threshold discussed above) may be removed immediately so that buyers do not bid incorrectly on venues that have changed their composition and so that buyers do not attempt to optimize on venues with little or no volume. It is important to note that, if an orphaned venue is removed, there will be some bidding on the new venue (i.e., the venue that orphaned the removed orphan venue) that does not take into account some fraction of its inventory. In this case, the remaining inventory from the orphaned venue can by copy-learned into its parent pub or member venue or can be ignored. However, copying learn up implies that the learn data will not exactly correspond to the inventory that is becoming part of the parent venue.

Based on the data shown in FIGS. 8A and 8B, there is significant churn of volume into and out of the venue range. While the venue creation system does not actively remove venues unless the fall below the lower deletion threshold, it may actually force a venue below the threshold due to the venue creation process. That is, if a venue falls below the upper creation threshold, it will not create a venue. Consequently, the venue script considers the inventory of that venue to be fair game for creating a new venue; this is, the venue creation system may "steal" its impressions and place them in a different (e.g., less granular) venue, effectively reducing the inventory in the original venue. This then reduces the significance of any learn data which is now merged into the old (less granular) venue. Moreover, the remainder of this venue will eventually be considered a low volume venue that is to be removed.

To avoid this situation, in some cases, then inventory data that is already part of a venue is not redistributed even if the venue no longer has sufficient volume to create a venue (e.g., if the impression volume of the venue decreases from 5.5 million per day to 4.5 million per day). Such a venue's inventory is thus removed from the inventory pool before the venue creation process is run, provided the venue has more volume than the threshold for deletion. In some embodiments, the venue creation process tracks split venues and computes how much volume will be left after a split. If the remaining amount is less than a threshold parameter, the venue removal sql is run and the orphan venue learn data is copy-learned into the parent venue. In some embodiments, any inventory that belongs to an existing venue is removed from the venue creation inventory pool, provided the venue remains above the lower deletion threshold and below the upper creation threshold. In some cases, a clean-up process computes the maximum 7-day moving average over a period of time (e.g., a month). If the maximum is less than a certain threshold, the venue is removed and the learn data is copied into the parent pub or member level venue. Each removed venue is logged to facilitate copy learning.

8. Additional and Alternative Embodiments 8.1 Preemptive Auctions

In the use cases described above and depicted in FIGS. 3A-3D, each ad call received by the Imp Bus 204 is a server-side ad call. The advertising platform also accommodates client-side ad calls.

In one example scenario, an impression seller member desires to do a price check on its impression inventory. When an impression consumer's web browser navigates to a web page hosted by a server operable by the member, the server returns to the impression consumer's web browser a snippet of HTML, generally either some JavaScript or an IFRAME that tells the browser to make a client-side ad call to the Imp Bus 204. The Imp Bus 204 receives the client-side ad call and performs a platform-based auction (as described above) to identify a winning bid. The Imp Bus 204 returns to the impression consumer's browser a URL ("winning bid URL") and a price. The Imp Bus 204 also sends to the bidder of the winning bid a "won but deferred" notification, which identifies to the bidder that although its bid is the winning bid, the serving of the impression is being deferred for the moment.

The impression consumer's web browser forwards information characterizing the price of the platform-based winning bid to a server ("member server") operable by the member. The member server implements its own logic to determine (perhaps in part based on the price of the platform-based winning bid) whether to serve the ad creative of the platform-based winning bid or serve its own ad creative (e.g., a default ad creative from its own ad server and/or an ad creative associated with a winning bid of an auction conducted by the member server itself). If the member server determines that the ad creative of the platform-based winning bid is to be served, the member server returns to the impression consumer's web browser a snippet of HTML that tells the browser to point to the winning bid URL. When the winning bid URL loads, the Imp Bus 204 logs that an ad creative resulting from a platform-based auction is to be served and returns to the impression consumer's web browser a redirect to the location of the ad creative to be served.

Over a period of time, use of preemptive auctions enables the impression seller partner to obtain information (e.g., the price of the platform-based winning bids) sufficient to determine the true market value of certain creative serving opportunities. This true market value may subsequently be used to set the reserve price for the respective creative serving opportunities.

8.2 Bidder-Specific Debugging

If a bid request is sent to a bidder and the bidder chooses not to bid (e.g., replies with a $0 bid), the reasons for the $0 bid (e.g., campaign spans non-US inventory, segment targeting) would be unknown to the Imp Bus 204 and to other auction participants. A debug log is a tool that can be used by any of the tenants of the data center 102 to better understand the auction process performed by the Imp Bus 204 or to test that a bidder is functioning properly when exposed to real traffic and volume. A debug tool can be built into a bidder framework open source code and/or an Imp Bus "debug text."

In a call for an impression, a "debug" parameter can be added that shows communications between the Imp Bus 204 and all active bidders during an auction that is run as a "debug auction." All bidders will be informed that an impression is flagged as a "debug impression," and all participants will proceed in a standard way, with the exception that each bidder will log text related to a bidder's response that is unique to that given impression. As the auction proceeds, all decisions are logged for each bidder as it proceeds from one advertiser to a first campaign and to a second campaign and so on. When the Imp Bus 204 sends a bid request to a bidder during a "debug auction," the bidder replies to the Imp Bus with all of its debug text. If a bidder responding to the Imp Bus 204 appears to malfunction (e.g., the bidder uses a malformed JavaScript object notation or sends an invalid response), the debug log will display errors.

Below is an example debug log with a description of how the Imp Bus determines the winning bid. Actual log entries are in italics.

Stage 1: Imp Bus 204 is Contacted

1. The TinyTag on the publisher page causes the browser to contact the Imp Bus 204. Debug logs may be obtained by calling "http://ib.adnxs.com/tt?id=yourtagid&debug=1" Because the Imp Bus 204 can be a cluster of load-balanced instances, the instance "impbus-01" is contacted in this example. "Sand-07" indicates the current development version of ImpBus 204 and API software, and "NYM1" indicates the data center in which this activity is taking place.

Impbus impbus-01.sand-07.nym1:8002

2. The referrer (the page where the TinyTag originates) and the URL class (whitelist, blacklist, greylist) are displayed.

*Blank referer. Inventory greylisted.*
*Inventory class: greylist*

3. The information contained within the TinyTag is displayed.

*Standard 728×90 tinytag 11—member 5, reserve $0.000, tag data (null)*

4. The Imp Bus 204 assigns an "auction ID" to this transaction, and the user's geographical information and ID are collected from his cookie.

*Auction ID: a00244e7-919c-4c0e-abd4-af98fc295b8d*
*Geo: US NY 501*
*User ID: db154e9c-7aab-4c12-9661-1df3b8e78cfa*

5. Third-party data providers are contacted. In this case no third-party data is available.

*Skipping datran phase - not configured or saturated*
*No IXI data found*
*Data provider phase complete - 0 ms elapsed*

Stage 2: Owner Phase

6. If the tag's owner is associated with a bidder, that bidder is sent a bid request first. In this case the owner is associated with Bidder 9.

```
sending bid request /Bidder09/bidder_09.php to bidder 9 at
x.xx.xxx.xxx:xx
Waiting for owner to bid
Response from bidder 9 received in 1 ms
    Bidder 9:
        a00244e7-919c-4c0e-abd4-af98fc295b8d: failed - Creative
does not belong to response member id
    Owner phase complete - 2 ms elapsed
```

Stage 3: Bidding Phase

7. Bid Requests are sent to all listening bidders. The bidders pass back Bid Responses and the Impression Bus validates member IDs and computes net prices based on the tag's revshare with the Imp Bus 204 and any bidder fees included in the Bid Response.

```
Response from bidder 13 received in 0 ms
Total revshare for member 21: 95.00%
Bidder fees for member 21: $0.000 (revshare 0.0%, $0.000 min CPM)
    Bidder 13:
        a00244e7-919c-4c0e-abd4-af98fc295b8d: Member 21 bid
$4.200 (net $3.990)
Response from bidder 9 received in 1 ms
Total revshare for member 3: 95.00%
Bidder fees for member 3: $0.388 (revshare 5.0%, $0.000 min CPM)
    Bidder 9:
        a00244e7-919c-4c0e-abd4-af98fc295b8d: Member 3 bid
$7.770 (net $7.012)
Response from bidder 8 received in 50 ms
    Bidder 8: Connection throttled, failed, or timed out
```

Stage 4: Auction Winner Determined

8. The auction winner is determined by ranking the net bids above. Here we have net bids of $3.990 and $7.012. The $7.012 bid wins, but the price is reduced to the second bid price of $3.990. Bidder fees and exchange fees are added on to $3.990 to make a gross price of $4.421. The buyer will pay $4.421 (this shows up as $4.421 in reporting as buyer_spend) and the seller will receive $3.990 (this shows up as $3.990 in reporting as seller_revenue).

```
Bidding phase complete - 50 ms elapsed
Auction a00244e7-919c-4c0e-abd4-af98fc295b8d result: SOLD
    Winning bid: $7.770; Tag min: $0.000
    Second bid: $3.990
    Net winning price: $3.990; Gross price: $4.421; Bidder fees; $0.221
    Member 3 creative 28 has the highest net bid: $3.990
```

Auction Timing

The Imp Bus 204 displays how long each stage of the auction took.

```
Auction timing:
    Init phase: 0 ms
    DP phase: 0 ms
    Owner phase: 2 ms
    Bid phase: 50 ms
    End phase: 0 ms
    --------------------
    Total: 53 ms
Auction complete
```

A debug log can be customized in order for each independent decisioning engine associated with a bidder to output its internal debug messages for any given auction. This can be important, for example, because each bidder is independently determining its response (e.g., choosing creative A over creative B, excluding campaign X) and the bidder's metrics for each response can be unique to that bidder.

An example custom debug log from one bidder can include the following text:

```
Member 3:
    Available - adding
Member 13:
    Available - adding
2 available member(s)
Tag 1307:
    Member 3
        Advertiser 2
            Campaign 12
                Bans URL - skipping
            Campaign 13
                Does not meet reserve price - skipping
            Campaign 14
                Does not meet reserve price - skipping
            No eligible campaigns - skipping
        No eligible advertisers - skipping
    Member 13
        Advertiser 1
            Campaign 1
                Bans segments - skipping
            No eligible campaigns - skipping
        Advertiser 5
            No eligible campaigns - skipping
        No eligible advertisers - skipping
    No eligible members - skipping
```

Another example custom debug log can include the following text:

```
16:32:11 (DEBUG) Decoded bid request:
16:32:11 (DEBUG) Partner id is None
16:32:11 (DEBUG) *** failed rule for li 432, (Match rule for segments. Include items
set(['104']) Exclude items set([ ]))
16:32:11 (DEBUG) *** failed rule for li 446, (Match rule for segments. Include items
set(['599']) Exclude items set([ ]))
16:32:11 (DEBUG) *** failed rule for li 448, (Match rule for segments. Include items
set(['599']) Exclude items set([ ]))
16:32:11 (DEBUG) *** failed rule for li 426, (Match rule for segments. Include items
set(['104']) Exclude items set([ ]))
16:32:11 (DEBUG) Valid line items are
16:32:11 (DEBUG) No found items
```

-continued

```
16:32:11 (DEBUG) Bidding response is empty. None found
16:32:11 (DEBUG) BidRequest/Response is {'auctionID': '43a5516f-2dc8-43fa-a549-
5432d9201278', 'request_data': {'tags': [{ 'reserve_price': 1.0, 'auction_id': '43a5516f-2dc8-
43fa-a549-5432d9201278', 'tag_format': 'iframe', 'id': 1307, 'size': '300×250'}], 'bid_info':
{'accepted_languages': 'en-us,en;q=0.5', 'user_id': 'fe3ca2dd-3ac9-4427-ac89-a173d524f998',
'inventory_class' : 'class_1', 'city': 'New York', 'url': 'babynamenetwork.com', 'country': 'US',
'region': 'NY', 'dma': 501, 'within_iframe': False, 'time_zone': 'America/New_York',
'total_clicks': 0, 'postal_code': '10012', 'user_agent': Mozilla/5.0 (Macintosh; U; Intel Mac
OS X 10.5; en-US; rv:1.9.0.6) Gecko/2009011912 Firefox/3.0.6', 'no_flash': False,
'session_imps': 0, 'mins_since_last_imp': 1112, 'ip_address': '64.59.43.186', 'total_imps': 27,
'no_cookies': False}, 'timestamp': '2009-03-03 21:32:10', 'debug_requested': True,
'members': [{'id': 30}, {'id': 49}], 'allow_exclusive': False}, 'isp': 'ELINK
COMMUNICATIONS', 'uid': 'fe3ca2dd-3ac9-4427-ac89-a173d524f998', 'ectr': 0.0,
'exchange_owning_partner_id': None, 'ip': '64.59.43.186', 'tag': None, 'user_data':
{'adnexus_id': 'fe3ca2dd-3ac9-4427-ac89-a173d524f998'}, '_logVersion_': 1.0,
'creative_frequency': 0, 'cost': 0, 'clientID': 0, 'size': (300, 250), 'partners': [{'id': 30}, {'id':
49}], 'placementID': 0, 'time_bucket': '1:21', 'creative_recency': 1099511627776, 'segments':
[ ], '_eventType_': 'BidRequest', 'publisher_item': None, 'dma_code': '501', 'subID': None,
'insertionID': 0, 'other': { }, 'tag_format': 'IFRAME', 'partnerID': 0, 'creativeID': 0, 'bid': 0,
'zip_code': '10075', 'inv_group': None, 'second_bid': 0, 'client_frequency': 0, 'clickURL':
None, 'inv_unit': None, 'win_frequency': { }, 'publisher_insertion_order': None,
'adnexus_partner_id': 0, 'interface': 'adnexus', 'inv_source': None, 'testCreativeID': None,
'client_recency': 1099511627776, 'no_bid': True, 'tinytag_id': 1307, 'campaign_recency':
1099511627776, 'pubRedirectUnencoded': False, 'language': 'EN', 'url':
'babynamenetwork.com', 'country': 'usa', '_utcMessageTime_': '2009-03-
03T21:32:11.049988', 'campaignID': 0, 'campaign_frequency': 0, 'frequency': '{ }',
'exclusive': False, 'lineitemID': 0, 'bid_request_url': None, 'inv_size': None, 'os':
'MAC_OS_OTHER', 'region': 'usa_ny', 'browser': 'FIREFOX_3'}----
```

8.3 Logging and Reporting

A tremendous amount of information passes through the Imp Bus 204 or transaction management computing subsystem per impression inventory transaction. The Imp Bus 204 may be implemented to log various pieces of information in the data store 230 for each and every impression inventory that is transacted within the platform. Such log data may include information specific to the impression consumer (e.g., demographic, psychographic, and behavioral data); information specific to the impression consumer's web browser (e.g., browsing history or purchasing history); information specific to the ad tag, creative serving opportunity, or combination thereof; information specific to the creative that was selected to be served; information representative of the impression consumer's response to the creative that was served (e.g., clickthroughs and conversions); information representative of the transactional nature of the platform-based auction itself (e.g., identifier for each bidder that responded and what the bidder responded with in terms of creative and price, response time of each bidder, which bidder elected to no bid, and identifier for each third party data provided who contributed data that was used by each bidder to optimize or otherwise generate a bid response); or information related to a third-party data provider that contributed data towards the generation of a bid response.

The Imp Bus 204 collects detailed information about individual platform-based auctions on an on-going basis. Because the Imp Bus 204 collects and logs a large amount of data, the file sizes of the logging tables stored in the data store can grow large. If all of this information is stored for a long time, it quickly consumes too much disk space. To conserve disk space and to keep these files small, the Imp Bus 204 periodically can summarize in real-time the stored data and re-log it to a summarization table. The summarized versions of the data that are re-logged include far less detail about the individual platform-based auctions. However, through careful selection of summarization parameters, the data summarization provides useful snapshots of the nature of the platform-based auctions that are occurring during a given time interval.

In some examples, these summarized versions or the original, non-summarized versions of the data may be freely obtained by any impression trading industry member without cost. In other examples, these summarized versions or the original, non-summarized (e.g., impression-level) versions of the data may be obtained for a cost that is dependent on the nature of the contractual relationship agreed upon between the advertising platform provider and the respective impression trading industry members. As an example, a first bidder establishes a "basic" value service relationship with the advertising platform provider and is entitled to a report of activity within the platform ecosystem within a 24-hour period; a second bidder establishes a "moderate" value service relationship with the advertising platform provider and is entitled to a report of activity within the platform ecosystem within a 1-hour period; a third bidder establishes a "premium" value service relationship with the advertising platform provider and is entitled to a report of activity within the platform ecosystem within a 15-minute period. The timing of updates provides the third bidder a market advantage in terms of obtaining information and making changes to its bidding strategies in real time as compared to that of the first and second bidders.

The above-described information that is collected by the Imp Bus 204 can be pushed to impression trading industry members at specific intervals, as specified in the contractual relationship between the advertising platform provider and the industry member. Alternatively or in addition, the Imp Bus 204 can update its databases at predefined intervals (e.g., every 10 seconds, every 30 seconds, every minute, every hour) or in response to a change in information related to a platform-based auction (e.g., behavioral data related to an impression consumer, information specific to the ad tag or winning bid or selected creative, information related to third-party data provided).

The Imp Bus 204 can provide incremental updates to users using batch generation, which allows users to pull updates at regular intervals or sporadically or whenever a database is reported to have changed. The Imp Bus 204 can provide updates in real-time, in a ticker format, in various levels of granularity, such as impression-level updates or aggregate updates. For example, the number of U.S. impressions for an ad campaign can be streamed to an impression buyer member, an impression seller member, a third-party data provider, or to another auction participant. Alternatively or in addition, data can be streamed on a per impression basis, made available in a textual log format or as a queryable database table.

8.4 Batch Services for Bidders

In some examples, an impression seller member's preference for ad quality (e.g., an offer type, preferred creatives) can be monitored by bidders by using batch generation. As an impression seller member can approve a large number of potential ads (e.g., 10,000, 100,000), it is not realistic to pass all of them to a bidder. Instead, an impression seller member can set up a target ad profile in which preferences (e.g., preferred creatives, brand/offer-type standards, trusted and brand members) are stored and can be changed by the impression seller member. For example, the website nbc.com could specify a preference for an ad in English and related to tax preparation to be displayed for the months of February and March.

An impression seller member (e.g., a publisher) associated with a large multimedia stream (e.g., the news website CNN.com) can set up a profile for each of its multiple multimedia streamlets (e.g., CNN.com/entertainment, CNN.com/health, CNN.com/technology, and CNN.com/travel). An identification number can be assigned to each profile created by a publisher and can be shared with other tenants (e.g., bidders).

Whenever a publisher changes information in a profile (e.g., a preferred ad content, a geographical preference, a preferred brand associated with the creative, an unwanted type of creative), the Imp Bus 204 can update (e.g., using incremental batch generation) an ad quality process. After such an update, when a bidder pulls an ad quality process, they can also pull an ad profile service that pulls any publisher updates upon request or within a predefined interval (e.g., 10 seconds, 30 seconds, 10 minutes, 30 minutes, 1 hour) into the bidder's cache. Thus, bidders can have a full view of imp bus standards and can avoid wasted bids on creatives that may be rejected by the publisher.

In some examples, foreign currency-based transactions can be supported within the platform and a currency clearinghouse computing subsystem of the Imp Bus 204 can serve as a clearing house for all currencies used by tenants. To aid participants of an auction in generating bids, the Imp Bus 204 can pull a feed of exchange rates from a source (e.g., x-rates.com, OANDA Rates®, FXSolutions.com) that is sampled at different times (e.g., 30 min, hourly) and stored within the platform. Bidders can pull currency updates at different intervals (e.g., 20 seconds, every minute) to ensure their bids are appropriate for the currency used.

For example, if Volkswagen® wanted to place an ad for the new Passat™ on the news websites lemonde.fr, welt.de, bbc.co.uk, and nytimes.com, bidder transactions would take place in euros, British pounds, and U.S. dollars. If the U.S. dollar-euro exchange rate were to suddenly change from 1.26 to 1.45 dollars per 1 euro, a bidder representing Volkswagen® and paying in euros should lower the bid to place an ad with nytimes.com.

8.5 Hosted Bidder

In some implementations, the advertising platform includes a hosted bidder framework that enables an impression buyer member to provide a bid guide of API-driven bidding rules (also known as decisioning rules) to the platform on an ad hoc basis. These member-specific bidding rules will subsequently be executed by a hosted bidder operable by the advertising platform provider on behalf of the impression buyer member during the platform-based auctions. The hosted bidder removes the need for an impression buyer member to engage a third-party Bidding Provider to operate on its behalf or to set up and configure its own bidder within the platform—a process that can be difficult and time consuming for the impression buyer partner.

Generally, a bid guide explicitly states how much the impression buyer member will pay based on specific targeting parameters. Each bid guide is a pricing matrix for the data points the impression buyer member values. For example, a bid guide may specify that an impression buyer member will bid $1.00 for a U.S. impression of size 728×90, and $0.50 for an international 728×90 impression.

The key to successful bidding is frequent updating of bid prices based on performance data. Accordingly, an impression buyer member may use the reports generated by the Imp Bus 204 to view bid performance and upload modified bid guides on an on-going basis.

8.6 Bidder Instances

A data center tenant that operates a bidder within the platform may deploy one or more instances of a bidder at any given time. In a typical implementation, each bidder instance runs on a machine that is uniquely addressable within the platform via an IP address and port numbers.

The Imp Bus 204 may be implemented with load balancer functionality that enables the Imp Bus 204 to spread bid requests between multiple instances of one or more bidders without requiring a dedicated load balancer hardware device to be deployed within the platform. The Imp Bus 204 maintains a list of bidder instances and corresponding machine IP addresses and port numbers. In some examples, in order to load balance across bidder instances, the Imp Bus 204 sends a ready call to each bidder instance periodically (e.g., every 100 milliseconds, every second, every five seconds, every 10 seconds, every 30 seconds) and monitors the queue responses from each individual bidder instance. The Imp Bus 204 throttles requests to any bidder instance that either fails a "ready check" or appears to be unresponsive to or overloaded with requests. The Imp Bus 204 spreads the remaining load (e.g., processing of subsequent bid requests) among the other instances of that bidder.

Integrating the load balancer functionality within the Imp Bus 204 provides numerous advantages from a connection-handling perspective, thereby increasing performance and reducing network bottlenecks. This arrangement removes one layer of complexity and latency that would exist in the internal network of the platform if a bid request were instead routed from the Imp Bus 204 to a dedicated load balancer hardware device, and then to a machine on which a bidder instance is run.

8.7 Secure Content

Figure 14:
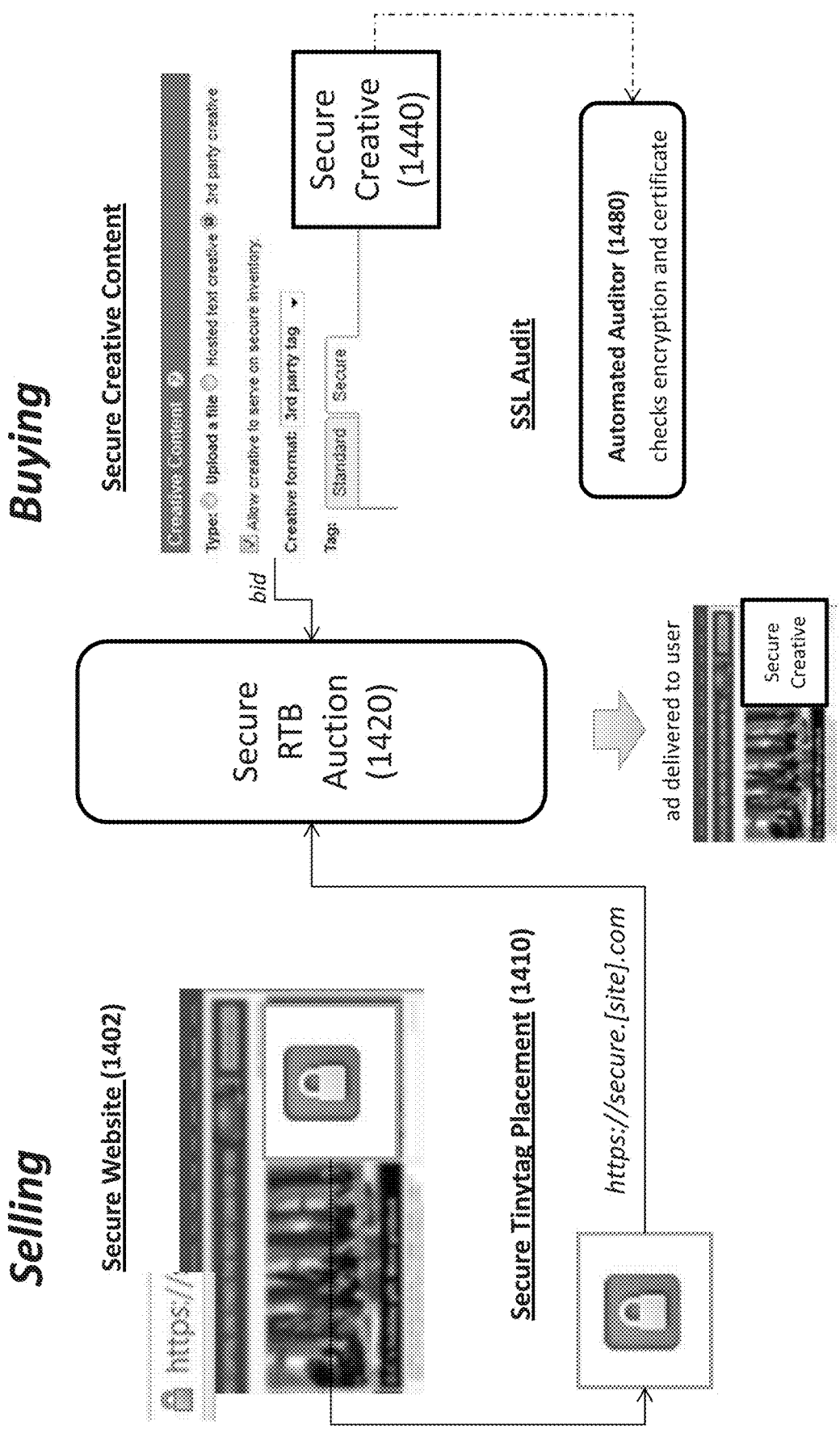
FIG. 14 is a diagram depicting at a high-level the purchase and sale of secure content according to an embodiment of the invention.
Figure 15:
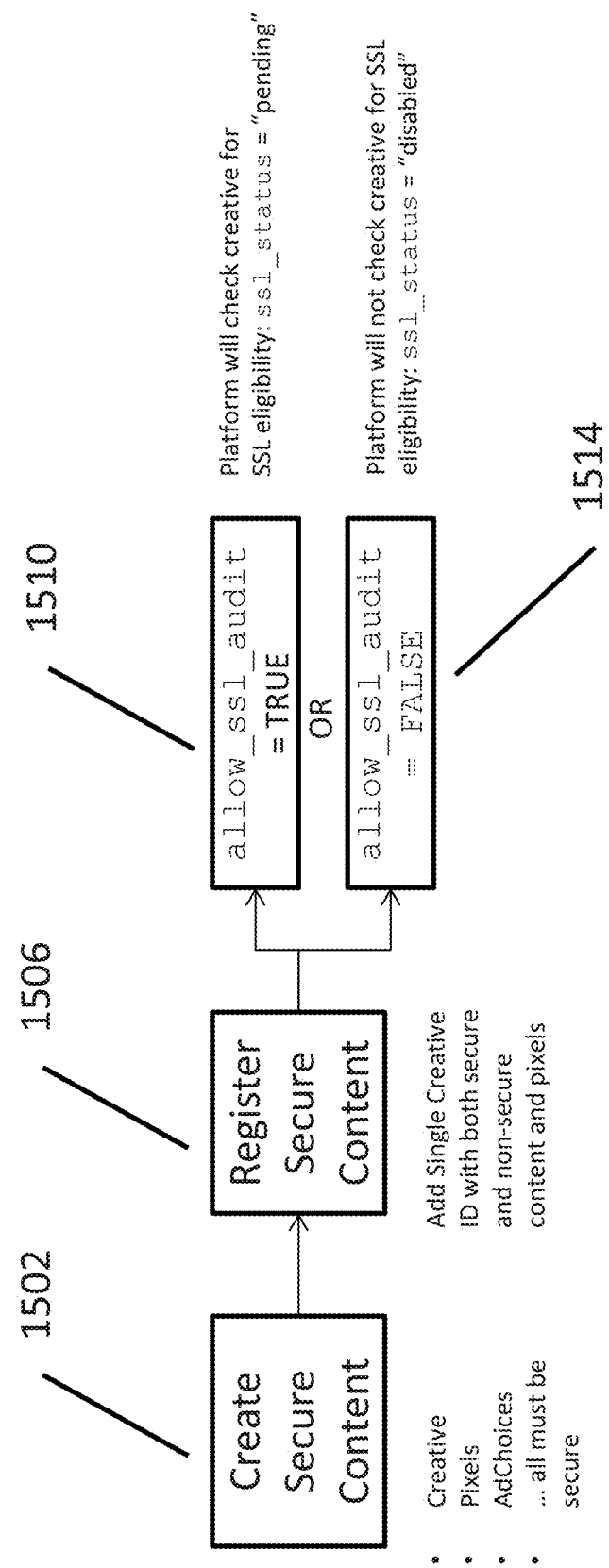
FIG. 15 shows an exemplary creative registration process according to an embodiment of the invention.

In various embodiments, the online advertising auction platform described herein provides for the registration, auditing, and serving of secure creative content, and for real-time bidding among impression buyers of impressions requiring secure advertisements to be served. Referring to FIG. 14, a secure page 1402 on a website includes an advertisement placement. The page and associated content may be transmitted via HTTPS over any suitable cryptographic protocol, such as Secure Sockets Layer (SSL) or Transport Layer Security (TSL) The page 1402 may include an ad tag 1410, such as a Tinytag, that calls the platform via a secure channel. A real-time bidding (RTB) auction 1420 may then run for the impression associated with the tag 1410. The auction 1420 may include bids offering secure creative content 1440 previously registered with and audited by the platform auditor 1480. Upon the determination of a winning bid in the RTB auction 1402, the secure creative associated with that bid is served to the secure website 1402.

In some circumstances, ad tags are placed by impression sellers (e.g., publishers) on websites in order to sell ad space. However, ad tags can also refer to advertiser ad tags, used to direct a web browser to a particular image or Flash creative, or a kind of "in between" tag that moves an ad call along to the next step in the decisioning chain. Generally, these tags are all the same in structure: they are all requests for content of a certain size and type from a particular URL. The content may be either a creative or another ad tag, and it may be returned immediately in one step or after multiple steps (an auction, redirects, etc.), each with its own tag. An ad tag may appear long and complicated if information about the ad call is included in the tag itself, or it may be short and simple if ad call information is stored in the server to which the tag's URL is pointed. In some embodiments, an ad tag has two parts: (1) a URL, from which a browser will request content; and (2) markup language (e.g., HTML, for static content) and possibly some scripting (e.g., Javascript, for dynamic content).

In some embodiments, the platform enables users to buy secure impression inventory using the platform API. This enables re-selling advertising impressions which originate behind secure pages, and enables bidders to bid with secure creatives on secure impression inventory such as that on Hotmail and Facebook. The phrase "secure inventory" refers to impressions from placements which are accessed by users through a secure connection (e.g., over SSL). When a user visits a page that is behind a secure connection (e.g., ad-supported webmail), a non-secure ad would result in a prompt to the user regarding non-secure content on a secure page. If the user decides not to load the non-secure content, this will result in discrepancies and wasted impressions.

FIGS. 15-18 depict the end-to-end flow of the secure content registration, auditing, and auction processes. The creative registration process, shown in FIG. 15, includes the initial steps that are followed. At step 1502, the secure content is created. This step is typically performed outside of the platform, and may involve well-known media content creation practices. The developed content may be made available both through a non-secure and a secure channel.

Once the creation step is complete, the creatives are registered with the platform (step 1506), including population of the secure fields in the Creative object (described below). Following this, the flag for allowing an SSL security audit (allow_ssl_audit) should be set to true (step 1510), which indicates that the platform should check whether or not the creative is SSL-compatible and thereby allowed to serve on secure inventory. If set to false (step 1514), the check will not be performed, and the creative may not be able serve on secure inventory.

Figure 16:
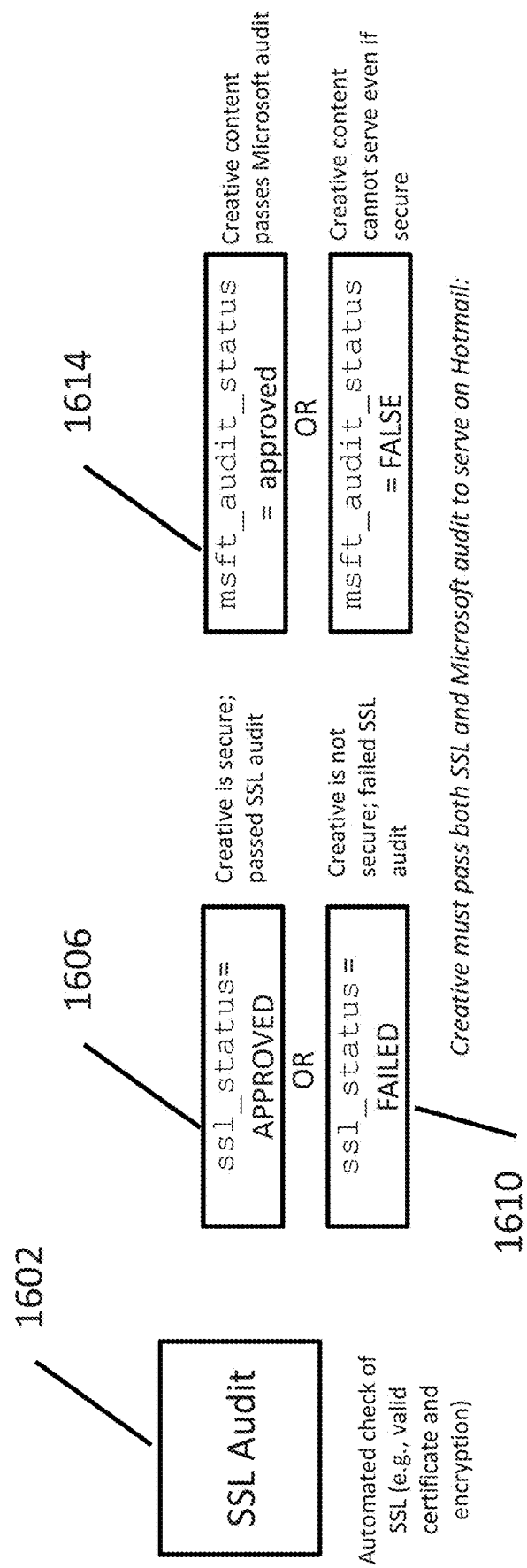
FIG. 16 shows an exemplary security audit process according to an embodiment of the invention.

Now referring to FIG. 16, the next flow verifies SSL eligibility (i.e., performing a security audit). If the allow SSL audit flag is set to true, an automated and/or manual SSL check is performed at step 1602. If the SSL audit status is approved (step 1606), then the creative may be permitted serve on all or a subset of secure inventory. If the SSL audit fails (step 1610), then creative may not serve on any secure inventory. For certain impression inventories, special audits must also be passed for secure inventory to serve. One example of this is Microsoft Hotmail. To be able to serve on Hotmail the creative must be both SSL status approved and Microsoft audit status approved (step 1614). If either one of these is false (if either audit fails), the creative will not be allowed to serve in Hotmail secure impression inventory.

Figure 17:
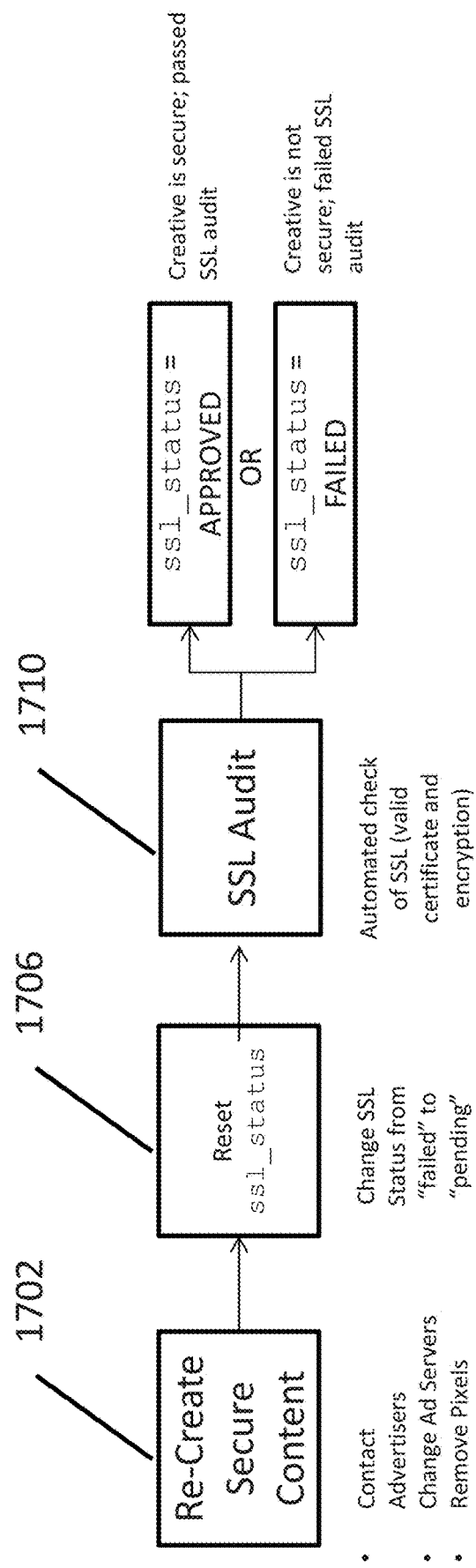
FIG. 17 shows a security re-audit process according to an embodiment of the invention.

The third flow, illustrated in FIG. 17, shows the re-audit process that may be followed upon creative content failing an SSL audit. The first step 1702 is to fix the cause of the failure, whether there is a bad certificate, a piece of the content was not found secure, and the like. Once the issue is rectified, a user may reset the SSL status from failed back to pending (step 1706), which will trigger another security audit (step 1710). In some implementations, resetting the SSL status will not affect the status of other audits that are not dependent on the SSL audit, such as the standard platform audit or the Microsoft audit. Changing the status may also not incur audit fees in the case that the audit is performed automatically. However, if an audits must be performed manually, audit fees may be applied to each reviewed creative (e.g., $1.00 per creative audited).

Figure 18:
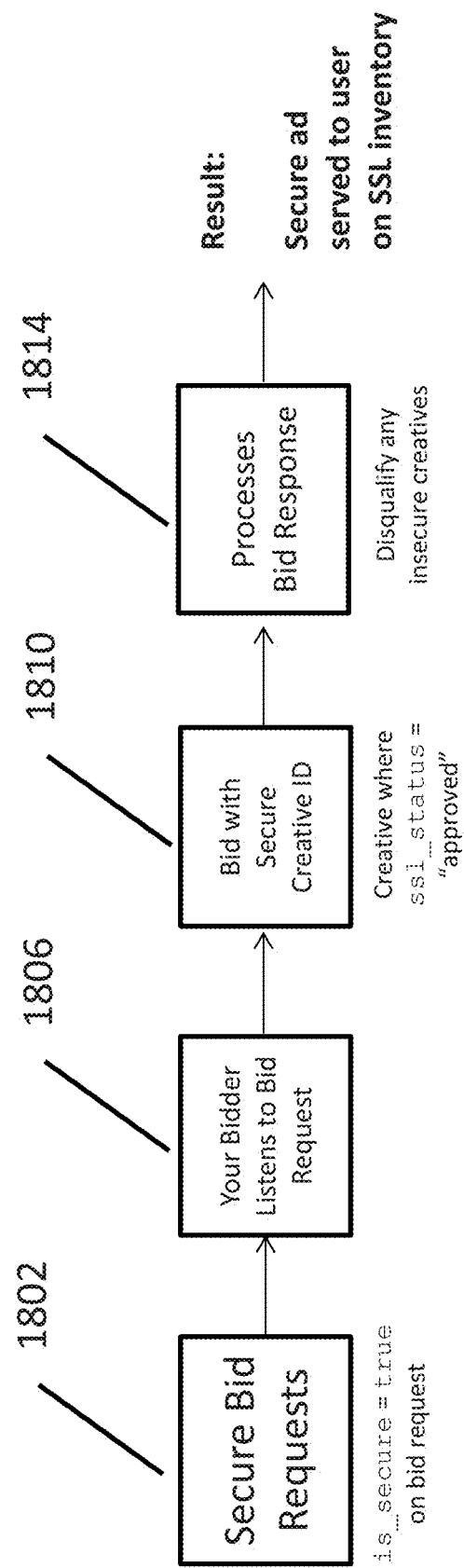
FIG. 18 shows an auction process for secure content according to an embodiment of the invention.

Referring now to FIG. 18, the final flow includes the response to secure impressions with secure creatives. Upon the platform receiving a call for a secure impression, a bid requests is sent with a field indicating that the impression must be securely served (i.e., with the is_secure field set to true) (step 1802). Bidders that are listening (step 1806) to the request may choose to respond with a bid value and secure creative content (step 1810). As the bid responses are processed in step 1814, any non-secure creatives (where the SSL audit has not completed or has failed the creative) are disqualified and the bidders are appropriately notified of the invalid bids. Any secure creatives are then eligible to continue in the auction, which may result in the secure delivery of a winning creative.

In one embodiment, the platform includes an interface for registering secure content. The registered content may be associated with bids in real-time bidding auctions for secure online impressions, or may be served as part of a bulk managed sale of impression inventory. For existing non-secure creatives or other content that is already registered with the platform, the creative may be edited to indicate that it may be served on secure impression inventory. For example, referring to FIG. 19 the indication may be made using a checkbox 1902 that, when selected, reveals secure entry fields 1906. The tag fields 1906 may allow a platform user (e.g., impression buyer) to specify a secure URL (secure tag) associated with a secure version of the advertising content, as well as a secure version of any third-party impression tracking pixel that may be for tracking user data or ad performance, or for other purposes.

Using the information entered into the secure fields 1906 when a secure impression is purchased, the secure version of the tag will be served. Conversely, when a standard impression is purchased, the content served will correspond to that specified in the standard (non-secure) fields. In some implementations, secure tags can be specified in the standard field, and can be served as a standard impression; however, standard tags may not be specified as secure. If a standard tag is entered into a secure field 1906 the creative auditing process will prevent the tag from serving any secure impression inventory, because the audit will detect that a browser warning would be presented to a website visitor viewing the ad. The standard and secure content associated with an individual creative may appear the same in both cases, but in the secure case the creative will be trafficked using a tag that calls all of the content via https so that no user browser warnings are triggered.

For specifying non-secure content, the platform may include fields in the "Creative" data structure and "Creative Service" (API) (i.e., the structure that holds information pertaining to creative content objects and the interface for accessing the structure), such as content, media_url and pixel_url. In some embodiments, either the content field or the media_url field is required, but both may be specified. The content field specifies creative content, such as HTML, XHTML, XML, Javascript, Python, Perl, Ruby, or markup language, scripting, or other source code, or text, image, video, Flash, audio, media, or other form of content. The media_url field indicates the resource identifier of the creative, which may be the various types of content as referred to with respect to the content field. The pixel_url field specifies the resource identifier (e.g., URL) of an impression pixel to serve with the media URL or content.

One of ordinary skill in the art will appreciate the various forms the Creative object may take. The fields may be strings, items of an enumeration, arrays of strings, and so on. For example, the pixel_url field may instead be a pixels array that allows a user to specify multiple impression pixels to be served together or separately.

To support secure content, the platform may include secure counterparts for the above fields in the Creative object. For example, these fields may be content_secure, media_url_secure, and pixel_url_secure, each specifying the secure versions of the referenced objects. Alternatively or in addition, arrays may be used in which certain elements correspond to secure versions of the content, or which secure content is recognized using an identifier such as "https."

An exemplary URL creative is as follows:

```
{
    "creative":{
        "id":1241,
        "format":"url-html",
        "media_url":"http://ad.doubleclick.net/adj/N2713.290440.-
        MEDIATIVE.CA/B5762619;sz=300×250;pc=[TPAS_ID];
        ord=${CACHEBUSTER};"media_url_secure":
        "https://ad.doubleclick.net/adj/N2713.290440.MEDIATIVE.CA/
        B5762619;sz=300×250;pc=[TPAS_ID];ord=$
        {CACHEBUSTER};"allow_ssl_audit":true,
        "pixel_url": "http://d.p-
        td.com/r/dd/id/L21rdC80L2NpZC8zMDI4ODkxL3QvMi9jYX
        QvMTYxNjQ1ODA",
        "pixel_url_secure":"https://d.p-
        td.com/r/dd/id/L21rdC80L2NpZC8zMDI4ODkxL3QvMi9jYX
        QvMTYxNjQ1ODA",
        "ssl_status":"approved"
    }
}
```

An exemplary third-party tag creative is as follows:

```
{
    "creative":{
        "id":1241,
        "format":"url-html",
        "content":"<SCRIPT language='JavaScript1.1'
        SRC=\"http://ad.doubleclick.net/adj/N2713.290440.-
        MEDIATIVE.CA/B5762619;sz=300×250;pc=
        [TPAS_ID];ord=${CACHEBUSTER};
        click=${"content_secure":"<SCRIPT language=
        'JavaScript1.1'
        SRC=\"https://ad.doubleclick.net/adj/N2713.290440.-
        MEDIATIVE.CA/B5762619;sz=300×250;pc=[TPAS_ID];
        ord=${CACHEBUSTER};click=${"allow_ssl_audit":true,
        "ssl_status":"pending"
    }
}
```

After secure content is registered with the platform, it may be subject to various audits before it will be permitted to serve secure impression inventory and/or participate in an auction therefor. To perform these functions, secure content must pass at least an SSL security audit, although in some embodiments, each secure creative must pass both the SSL security audit and the standard platform audit (as described above in Sections 1.3 and 1.4). Generally, the SSL audit performs an automated check of the content to verify whether it can be deemed "secure."

The SSL audit may include checks to determine that the content is served securely; for example, whether the protocol of the resource identifier (e.g., URI, URL, etc.) referring to content is specified as HTTPS, and whether the content (and any associated pixels) is served over a secure connection. The SSL audit may include verifying whether an acceptable cryptographic protocol is used, such as SSL version 3.0, TLS version 1.0 or higher, or any other suitable protocol. The audit may further include determining whether sufficiently strong encryption has been used, including secure encryption algorithms (e.g., AES, Serpent, Twofish), and adequate key length (e.g., 80-bit, 128-bit, 256-bit, or other appropriate length). Checks may also be made to ensure that the public key certificate(s) (e.g., SSL certificate) associated with the secure connection is valid, unexpired, uncompromised, not blacklisted, and so on.

Figure 20:
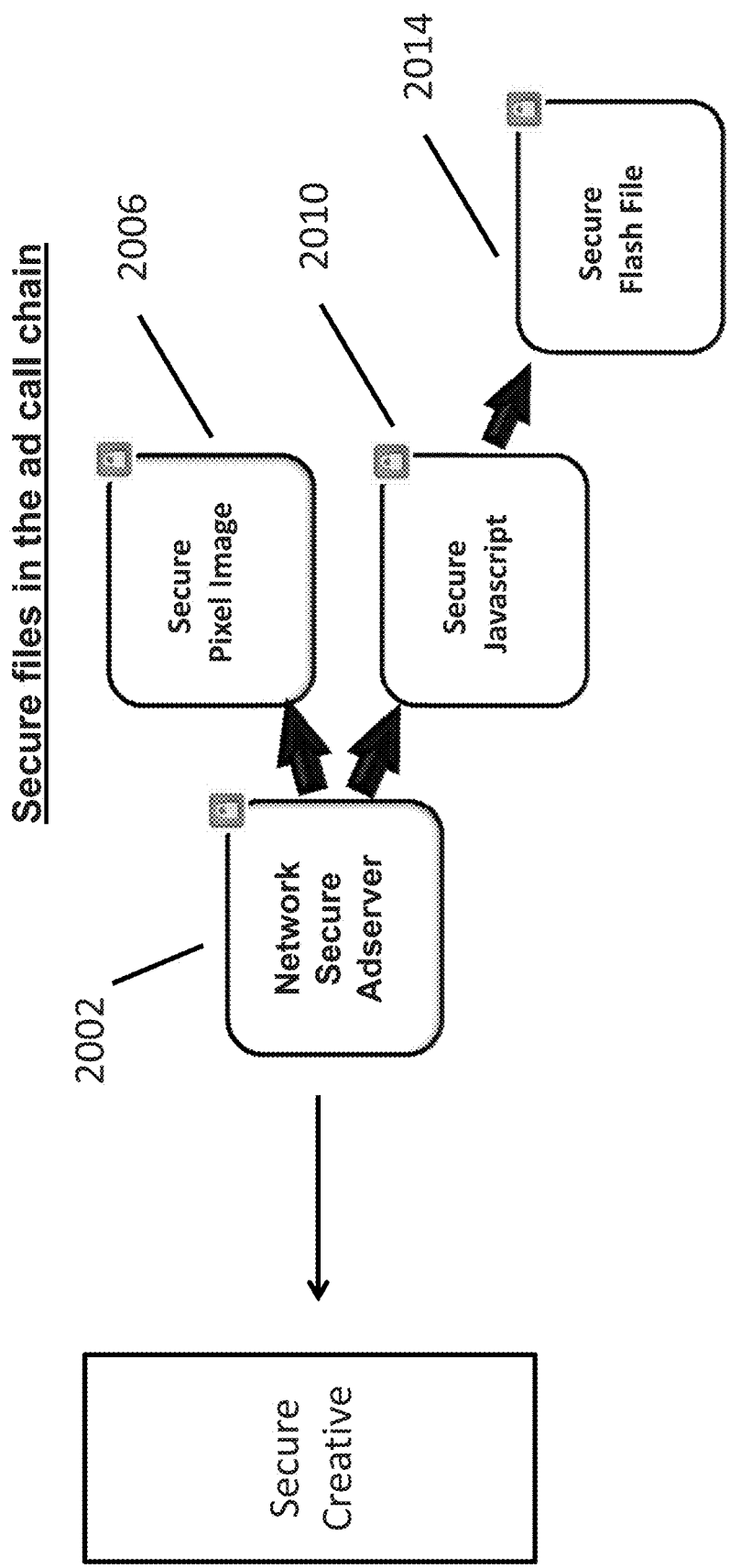
FIG. 20 is a diagram depicting an exemplary secure ad call chain.

For an advertisement to pass the security audit, the creative itself must be secure. This means that each hop in the ad call chain must be secure. For example, as illustrated in FIG. 20, the first hop specified by the ad tag may be to an advertiser's or third party's ad server 2002, and this hop must be made through a secure connection. Further, any other content that is called by that ad server 2002 all the way down the ad call chain needs to be secure. This includes creatives, cookie sync and tracking pixels 2006, ad verification or survey Javascript, and calls made by Javascript or other code 2010 in the tag, such as a call to a Flash file or other media content 2014.

For example, if the ad tag includes a secure media URL that points to a secure server at https://www.example-secure-server.com, and that server then makes a call to fetch further content from http://www.example-non-secure-server.com through a non-secure connection, the resulting creative will not be considered SSL-capable, and the security audit will fail. However, the landing page that is reached after clicking on an advertisement need not be secure. Because the landing page content is not actually being called when the ad is served, and is only called when a user clicks on an ad, a browser will not trigger a security warning upon browsing to the landing page.

The security audit may be run periodically for each secure creative, such as daily, every hour, every 10 minutes, every 2 minutes, or at any other suitable frequency, to ensure the content remains secure, that no malware is being served, and that no changes have been made to the creative tag that would result in the content losing secure status. In some embodiments, if the content passes the platform audit but not the security audit, the content may still be able to run on standard impression inventory, but will not be considered secure until the security flaw is corrected and the security audit is passed.

In addition or alternatively to running periodically, the security audit may be triggered via the Creative Service. For example, when a creative is uploaded, a field entitled "allow_ssl_audit" may be set to "true." When this value is enabled, another field, "ssl_status," is set to "pending." The pending status triggers an automated audit runs to confirm compliance of the uploaded creative with security requirements. Based on the outcome of the audit, the ssl_status is updated to either "approved" or "rejected." Once approved, the creative is permitted to run on a secure placement. If the creative uploader does not desire the creative to run on secure placements, the allow_ssl_audit field may be set to "false," and the ssl_status will be set to "disabled," resulting in no security audits being run on that creative. In some implementations the uploader is not permitted to set allow_ssl_audit to true unless the content_secure and/or media_url_secure fields have been populated.

An initial security audit may be run only once in order to approve a secure creative. In other embodiments, an audit must succeed a configurable number of times (e.g., 2 times, 5 times, 10 times) for the ssl_status to be set to approved. Once a creative is approved for secure inventory, security audits may be run periodically, at fixed intervals, random intervals, or at other suitable intervals. Notifications may be sent (e.g., to the advertiser and/or uploader of the creative) when the ssl_status changes (e.g., when the creative is approved or fails audit). The notifications may contain detailed information that would assist a user in debugging a security failure.

Other audits may exist that are specific to impression sellers; these audits may need to be passed in addition to the security audit in order for creatives to run on those sellers' secure impression inventories. In some implementations, however, creatives need not pass the security audit to run on certain sellers' secure inventories, and may only need to pass the platform audit and/or another audit specific to the seller, or no audit at all.

Table 7 below illustrates the impact on SSL approval status when modifying fields via the Creative Service. For example, if allow_ssl_audit is changed from "false" to "true," the ssl_status will correspondingly change from "disabled" to "pending." In other words, SSL auditing was previous disabled for the particular creative, and now that it has been enabled, an SSL audit of the creative is pending. Likewise, turning auditing off will result in the ssl_status changing from its current value to "disabled."

Further, any changes to content_secure, media_url_secure, and/or pixel_url_secure will result in the ssl_status changing to "pending." This is because a change in this secure content would require a re-audit to ensure the creative still meets security requirements. Conversely, any changes to content, media_url and pixel_url will not affect ssl_status because they represent non-secure versions of the creative content and are not SSL audited.

In some embodiments, any changes to content_secure, media_url_secure, and/or pixel_url_secure will not impact other audit status fields, such as the field indicating the approval status of a platform audit.

TABLE 7

SSL audit status interactions.

| Field | Old Value | New Value | Impacts |
|---|---|---|---|
| allow_ssl_audit | false | true | ssl_status will change from "disabled" to "pending" |
| allow_ssl_audit | true | false | ssl_status will change from current value to "disabled" |
| content_secure | | Any change | ssl_status will change to "pending" |
| media_url_secure | | Any change | ssl_status will change to "pending" |
| pixel_url_secure | | Any change | ssl_status will change to "pending" |
| content | | Any change | No change to ssl_status |
| media_url | | Any change | No change to ssl_status |
| pixel_url | | Any change | No change to ssl_status |

Figure 21:
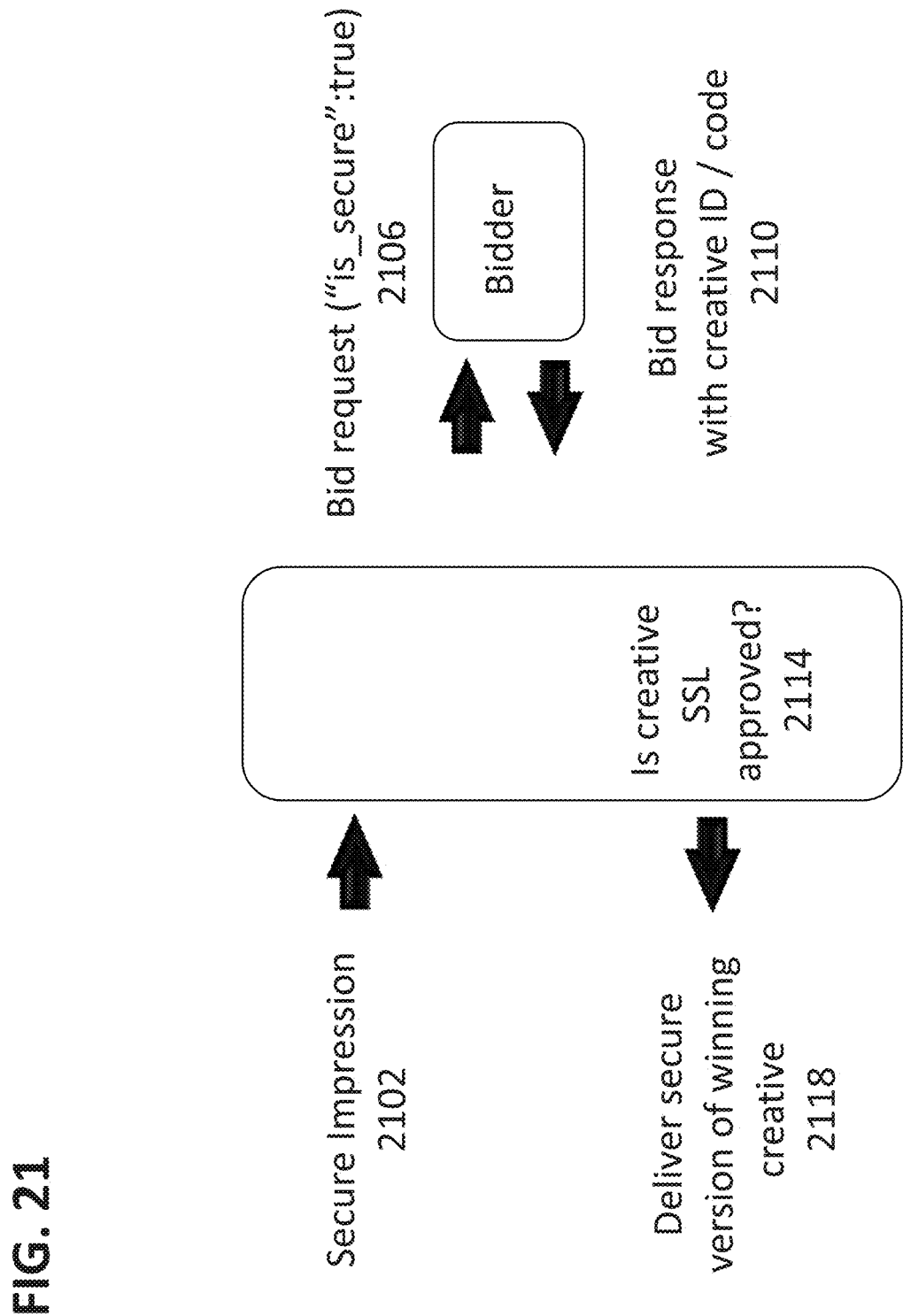
FIG. 21 is a diagram illustrating at a high-level a secure content auction according to an embodiment of the invention.

A summary of the SSL auction dynamics is illustrated in FIG. 21. At step 2102, a call for a secure ad to be served is received at the platform (e.g., at the Imp Bus). A bid request is then sent (with the "is_secure" flag set to true) to each bidder that is eligible to receive that request (step 2106). Bidders may then respond with a creative ID or code referencing content to be serving if their bids are accepted (step 2110). The platform then determines in step 2114 whether each creative associated with a bid is SSL approved (has been successfully security audited and has ssl_status=approved). The auction process will run with the eligible bids (the SSL approved bids), and the winning creative will be securely served (step 2118).

In some embodiments, creatives and pixels must be SSL approved (i.e., pass the security audit) to serve on secure impressions. Thus, in an RTB auction for a secure impression, the bid request sent to bidders include an indication that only bids offering secure content will be accepted. This may be done, for example, by including a field entitled "is_secure" with the bid request and setting that field to "true." Bid responses with creatives or pixels that are not approved for SSL may be rejected. In some cases, if the creative is secure (is_secure=true) but the pixel is not secure (e.g., the pixel URL does not being with "https), the bid will still be accepted. If that bid wins the auction, the creative will be permitted to serve the impression, but the pixel will not be served.

If instead the "is_secure" field is set to false, bids with either secure or non-secure content (including secure content that has failed approval or has not yet been approved) may be submitted and run on non-secure inventory. In other cases, only non-secure content may be submitted and served when is_secure=false.

In some implementations, if no bids are valid (e.g., all bids failed required audits, such as SSL, platform or other audits) or no bids were submitted in response to a bid request, a default secure creative may be served instead.

Once the winning creative is determined (or a default creative is selected), the format field in the Creative object may be used to determine how to render the creative content. For example, if the selected creative is an image, URL, Flash, audio, video, or other type o media format, the media_url_secure field is referred to for rendering the creative. If, on the other hand, the creative is HTML, Javascript, or other webpage rendering or scripting source code, the creative is rendered by reference to the content_secure field of the creative.

An abbreviated example of a bid request containing the is_secure field is as follows:

```
{
    "bid_request": {
        "bid_info": {
            "user_id_64": 123456789,
            "ip_address": "96.246.152.18",
            ...,
            "is_secure": true,
            ...,
            "inventory_audits": [...],
        },
        ...
    }
}
```

Figure 22:
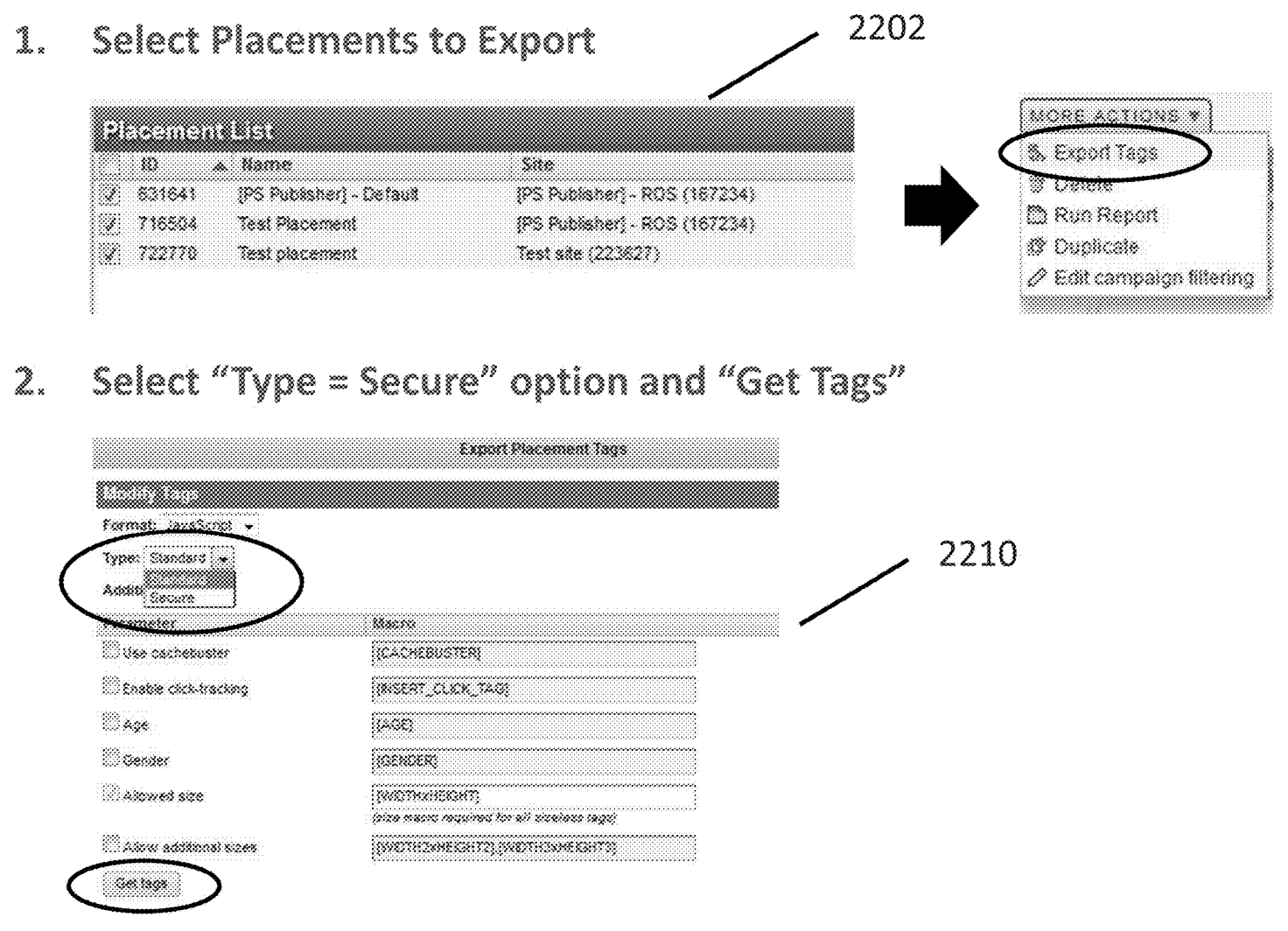

In further embodiments, the platform includes an interface for setting up secure impression sales. Referring to FIG. 22, individual placements in a list of ad placements 2202 can be exported as ad tags. Upon export, a dialog 2210 is displayed that allows a user to configure the tag(s) to be exported. The dialog 2210 includes an option that allows the user to select between a standard tagged export and a secure tag. By selecting the "Secure" option and configuring any other necessary parameters for the placement, the code for an secure ad tag is generated. The ad tag may be deployed by a publisher any of its webpages that are behind SSL or otherwise require a secure connection. Accordingly, whenever the platform receives an ad-call from one of the secure tags, the platform automatically ensures that only secure ads will be served.

Both secure and standard (non-secure) versions of a placement may be simultaneously active. For example, a seller may generate two tags (secure and standard) from a single placement ID. Thus, a website may offer secure and non-secure versions of a webpage, each with its own version of the placement.

9. Bidder RevShare/Min CPM

A minimum cost per thousand impressions, or CPM, can be used as a minimum threshold for buyers' bids. If a bid is below this threshold, either with or without a reduction in price (e.g., due to bidder, publisher, exchange, and/or data provider fees), it can be removed from consideration.

For example, Toyota® can bid $2.50 for a creative to be served on CNN.com and a bidder representing Toyota® can have a CPM fee of $0.20. If the bid process for the creative is reduced to an amount that is below the bidder's CPM fee (e.g., the bid is reduced to $0.10), there would not be enough money left to pay the bidder its fee. To prevent this problem, the Imp Bus 204 can set a minimum CPM, which can be unique to a bidder and can be changed in real time from transaction to transaction. In some examples, a bidder can have a contract with each of many advertisers, and each contract can set the minimum CPM between the bidder and advertiser.

10. Custom Macros

Typically, an impression buyer or ad server stores information related to a creative or an impression (e.g., a price paid in cents for an impression) and creates one or more macros that can store this information in a preferred format. For example, the Imp Bus 204 can upload a creative, automatically fill in a value (e.g., a value for the price paid in cents for the impression), and pass on this value to an ad server or record it in a database.

Having the Imp Bus 204 create a separate, distinctly-named macro for each impression buyer member can be cumbersome, especially when a member has many values or uses many ad servers.

An alternative is to have an impression member buyer or its associated bidder set up, name, and store one or more macros within a creative. When the bidder responds to a bid request from the Imp Bus 204, the bidder can pass the Imp Bus a string that contains at least a value and a name, and the Imp Bus can fill in the information as specified within the macro. The Imp Bus 204 serves as a conduit for the information and does not dictate the specifics of the macros or the macro names.

The Imp Bus 204 can pass information related to a platform-specific user ID or information about a given impression to the bidder. The Imp Bus 204 can obtain the information from a variety of sources, such as the cookie store 206, an ad tag, a publisher, a third-party data providers, a bidder's user data. Bidders can interpret the passed information dynamically.

For example, for a given impression, the Imp Bus 204 can include in a bid request specific values for a user's session frequency and for the user's income. The bidders will be sent a bid request with the following parameters:

```
{"bid_request":{
...
"income":"72,000",
"session_imps":16,
...
}}
```

If the bidder is interested in this data, it can set up creatives using macros for each data point, for example: ${USER_INCOME} and ${SESSION_FREQ}. The bidder can respond to an impression in such a way that replaces the values in a creative:

```
"custom_macros":[{"name":"USER_INCOME",
"value":"72,000",{"name":"SESSION_FREQ", "value":16}],
```

11. One Implementation of the Imp Bus

Figure 4:
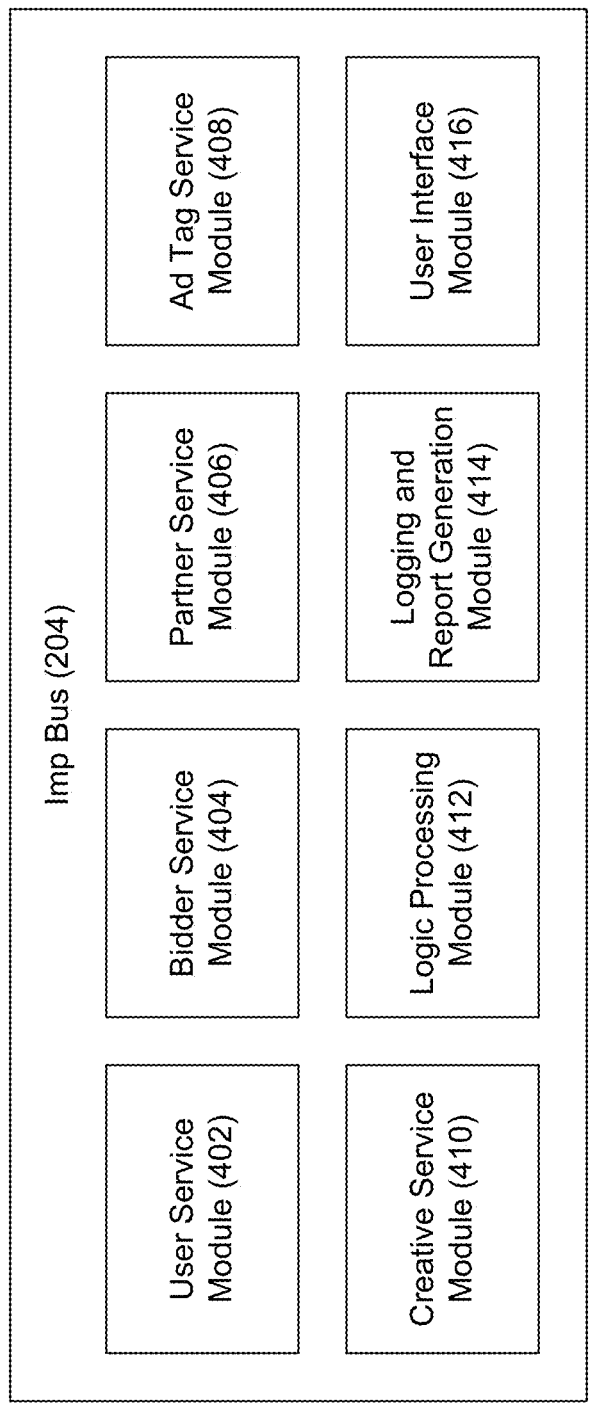
FIG. 4 shows example implementations of an Imp Bus.

FIG. 4 shows an implementation of the Imp Bus 204 that includes a host of API service modules (those depicted include a User Service module 402, a Bidder Service module 404, a Member Service module 406, an Ad Tag Service module 408, and a Creative Service module 410), a Logic Processing module 412, a Logging and Report Generation module 414, and a User Interface module 416.

The User Service module 402 enables the advertising platform provider to manage users within the platform. In this context, a "user" typically refers to a person who is authorized to act on behalf of an entity (e.g., an impression trading industry member or the advertising platform provider itself) in a predetermined capacity. A user authorized to act on behalf of the advertising platform provider may interact with the User Service module of the Imp Bus to add additional users or modify existing users.

The Bidder module 404 enables the advertising platform provider to add bidders to the platform or modify fields (e.g., IP address of bidder within a particular data center, port for bidder traffic in a particular data center, URI to which bid requests are sent, URI to which request notifications are sent) associated with existing bidders.

The Member Service module 406 enables the advertising platform provider to add impression buyer members and impression seller members to the platform. In some examples, each impression buyer/seller member is required to establish a contract with the advertising platform provider independent of its association with its bidder(s). This contract establishes financial terms, credit facilities (if applicable), and binds the member to the terms and conditions of the advertising platform provider (e.g., with respect to content quality, use of personally identifiable information, etc).

The Ad Tag Service module 408 enables the advertising platform provider to manage platform-specific ad tags, for example, viewing platform-specific ad tags associated with a particular impression seller member, adding a new platform-specific ad tag, and modifying an existing platform-specific ad tag associated with a particular creative serving opportunity.

The Creative Service module 410 enables the advertising platform provider to manage creatives at different levels: (1) on an impression buyer member level: identify all creatives associated with a particular impression buyer member; and (2) on a creative level: a human user acting on behalf of the advertising platform provider may examine attributes of a particular creative. Examples of such attributes include the URL of the creative, a brand of the impression seller member associated with the creative, the type of creative (e.g., image, flash, html, javascript), the identifier of the bidder that added this creative, the timestamp that the URL of the creative was last checked to verify its existence and authenticity, to name a few. The Creative Service module 410 may also enable a human user acting on behalf of an impression seller member to preview an ad creative and approve it to be run.

The Logic Processing module 412 includes decisioning software that enables the Imp Bus 204 to process received ad calls, generate and send bid requests, and process returned bid responses to identify an action to be taken (e.g., send additional bid requests, select a winning bid, and return a redirect to the web delivery engine that originated the ad call), to name a few.

The Logging and Report Generation module 414 implements various techniques for logging detailed information about platform-based auctions in the data store and generating summarization reports of varying levels of granularity as required and/or requested by authorized users within the platform.

The User Interface module 416 implements techniques that enable a user within the platform to interact with the Imp Bus through a user interface (e.g., a graphical user interface) of a client computing device (e.g., a web-enabled workstation or a mobile computing device).

Other modules, components, and/or applications may also be included in the Imp Bus and/or other modules shown in the figures and described herein.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

One skilled in the art will recognize the various forms in which the systems and methods described herein may be implemented. If implemented as software, the invention may execute on a system capable of running a commercial operating system such as the Microsoft Windows® operating systems, the Apple OS X® operating systems, the Apple iOS® platform, the Google Android™ platform, the Linux® operating system and other variants of UNIX® operating systems, and the like.

The software may be implemented on such hardware as a smart or dumb terminal, network computer, personal digital assistant, wireless device, smartphone, game machine, music player, mobile telephone, laptop, palmtop, wireless telephone, information appliance, workstation, minicomputer, mainframe computer, or other computing device, that is operated as a general purpose computer or a special purpose hardware device that can operate the OASP and/or Apps platform. The software may be implemented on a general purpose computing device in the form of a computer including a processing unit, a system memory, and a system bus that couples various system components including the system memory to the processing unit.

The software may be in the form of a standalone application, implemented in a multi-platform language/framework such as Java, .Net, Objective C, or in native processor executable code. Any suitable programming language may be used in accordance with the various embodiments of the invention. Illustratively, a programming language used may include assembly language, Ada, APL, Basic, C, C++, C #, Objective C, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

In various embodiments, the client computers include a web browser, client software, or both. The web browser allows the client to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client manually requests a web page from the server. Alternatively, the client automatically makes requests with the web browser. Examples of commercially available web browser software are Microsoft® Internet Explorer®, Mozilla® Firefox®, and Apple® Safari®.

In some embodiments, the client computers include client software. The client software provides functionality to the client that allows a user to interact with the OASP and Apps platform. The client software may be implemented in various forms, for example, it may be in the form of a web page, widget, and/or Java, JavaScript, .Net, Silverlight, Flash, and/or other applet or plug-in that is downloaded to the client and runs in conjunction with the web browser. The client software and the web browser may be part of a single client-server interface; for example, the client software can be implemented as a "plug-in" to the web browser or to another framework or operating system. Any other suitable client software architecture, including but not limited to widget frameworks and applet technology may also be employed with the client software. The client software may also be in the form of a standalone application, implemented in a multi-platform language/framework as described above.

A communications network may connect the clients with the servers. The communication may take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network may carry TCP/IP protocol communications, and HTTP/HTTPS requests made by a web browser, and the connection between the clients and servers can be communicated over such TCP/IP networks. The type of network is not a limitation, however, and any suitable network may be used. Non-limiting examples of networks that can serve as or be part of the communications network include a wireless or wired Ethernet-based intranet, a local or wide-area network (LAN or WAN), and/or the global communications network known as the Internet, which may accommodate many different communications media and protocols. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, to the network via wireless or wired Ethernet, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

In a client-server environment, the servers may be implemented on one or more server class computers that have sufficient memory, data storage, and processing power and that run a server class operating system (e.g., Oracle® Solaris®, GNU/Linux®, and the Microsoft® Windows® family of operating systems). Other types of system hardware and software than that described herein may also be used, depending on the capacity of the device and the number of users and the size of the user base. For example, each server may be or may be part of a logical group of one or more servers such as a server farm or server network. As another example, there may be multiple servers associated or connected with each other, or multiple servers that operate independently, but use shared data. In a further embodiment and as is typical in large-scale systems, application software may be implemented in components, with different components running on different server computers, on the same server, or some combination. Those skilled in the art will appreciate that the invention may be practiced with various computer system configurations, including hand-held wireless devices such as mobile phones or personal digital assistants (PDAs), multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules may be located in both local and remote computer storage media including memory storage devices.

In some cases, relational (or other structured) databases may provide such functionality, for example as a database management system which stores data related to the services and consumers utilizing the service. Examples of databases include the MySQL® Database Server, the Oracle® Database Server, the PostgreSQL Database Server, or the IBM® DB2® Database Server.

The described systems may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Also, the instructions and/or data used in the practice of the invention may utilize any compression or encryption technique or algorithm, as may be desired. An encryption module might be used to encrypt data. Further, files or other data may be decrypted using a suitable decryption module.

Although internal components of the computer are not shown, those of ordinary skill in the art will appreciate that such components and the interconnections are well known. Accordingly, additional details concerning the internal construction of the computers need not be disclosed in connection with the present invention.

It is to be understood that the foregoing description is intended to illustrate and not to limit the scope of the invention. For example, although the examples provided in this description refer generally to multi-tenant server-side user data stores, the advertising platform may also be implemented to work in conjunction with a multi-tenant client-side user data store. Further, although the examples provided in this description refer generally to a server-side advertising call, the advertising platform may also be implemented to receive client-side advertising calls and/or a combination of client-side and server-side advertising calls.

It is to be understood that the foregoing description is intended to illustrate and not to limit the scope of the invention, which is defined by the scope of the appended claims. Other embodiments are within the scope of the following claims.

What is claimed is:

1. A computer-implemented method comprising:
   facilitating, by a processing system comprising a processor, registration of secure content with an online content placement system, the secure content comprising a network call chain; and
   auditing, by the processing system, the registered secure content to ensure security requirements for the registered secure content are met;
   wherein the auditing comprises:
      determining, by the processing system, that each hop in the network call chain of the registered secure content is made over a secure connection, including performing, by the processing system, a secure sockets layer (SSL) security audit for each hop to ensure that network communication between a source device and a destination device associated with the hop is encrypted, wherein for each hop, the SSL security audit includes one or more of:
         a check to confirm use of a valid SSL certificate;
         a check to confirm use of a required encryption method; and
         a check to confirm compliance with a minimum encryption key length;
      identifying, by the processing system, a HTTPS URL of a first server in the network call chain, wherein the HTTPS URL is included in HTML code provided when serving the secure content in a secure online content space;
      determining, by the processing system, that a secure impression inventory requires an additional security audit of the registered secure content;
      conducting, by the processing system, the additional security audit of the registered secure content; and
      responsive to a determination, by the processing system, that the registered secure content has passed the additional security audit, approving the registered secure content to serve on the secure impression inventory.

2. The method of claim 1, wherein facilitating registration of the secure content comprises specifying one or both of a resource identifier for the secure content and source code of the secure content.

3. The method of claim 2, wherein facilitating registration of the secure content further comprises specifying a pixel resource identifier for the secure content.

4. The method of claim 3, wherein facilitating registration of the secure content further comprises specifying one or both of a resource identifier for a non-secure version of the secure content and source code of the non-secure version.

5. The method of claim 4, wherein facilitating registration of the secure content further comprises specifying a pixel resource identifier for the non-secure version.

6. The method of claim 3, wherein auditing the registered content comprises triggering a re-audit of the registered content upon detecting a modification to one or more of the resource identifier, the source code, and the pixel resource identifier.

7. A system, comprising:
   a processing system including a processor; and
   a memory that stores executable instructions that, when executed by the processing system, facilitates performance of operations, the operations comprising:
      facilitating registration of secure content with an online content placement system, the secure content comprising a network call chain; and
      auditing the registered secure content to ensure security requirements for the registered secure content are met;
      wherein the auditing comprises:
         determining that each hop in the network call chain of the registered secure content is made over a secure connection, including performing a secure sockets layer (SSL) security audit for each hop to ensure that network communication between a source device and a destination device associated with the hop is encrypted, wherein for each hop, the SSL security audit includes one or more of:
            a check to confirm use of a valid SSL certificate;
            a check to confirm use of a required encryption method; and
            a check to confirm compliance with a minimum encryption key length;
         identifying a HTTPS URL of a first server in the network call chain, wherein the HTTPS URL is included in HTML code provided when serving the secure content in a secure online content space;
         determining that a secure impression inventory requires an additional security audit of the registered secure content;
         conducting the additional security audit of the registered secure content; and
         responsive to a determination that the registered secure content has passed the additional security audit, approving the registered secure content to serve on the secure impression inventory.

8. The system of claim 7, wherein facilitating registration of the secure content comprises specifying one or both of a resource identifier for the secure content and source code of the secure content.

9. The system of claim 8, wherein facilitating registration of the secure content further comprises specifying a pixel resource identifier for the secure content.

10. The system of claim 9, wherein facilitating registration of the secure content further comprises specifying a resource identifier for a non-secure version of the secure content.

11. The system of claim 10, wherein facilitating registration of the secure content further comprises specifying source code of the non-secure version.

12. The system of claim 10, wherein facilitating registration of the secure content further comprises specifying a pixel resource identifier for the non-secure version.

13. The system of claim 9, wherein auditing the registered content comprises triggering a re-audit of the registered content upon detecting a modification to one or more of the resource identifier, the source code, and the pixel resource identifier.

14. A non-transitory machine-readable storage medium, comprising executable instructions that, when executed by a processor, facilitate performance of operations, comprising:
 facilitating registration of secure content with an online content placement system, the secure content comprising a network call chain; and
 auditing the registered secure content to ensure security requirements for the registered secure content are met;
 wherein the auditing comprises:
  determining that each hop in the network call chain of the registered secure content is made over a secure connection, including performing a secure sockets layer (SSL) security audit for each hop to ensure that network communication between a source device and a destination device associated with the hop is encrypted, wherein for each hop, the SSL security audit includes one or more of:
   a check to confirm use of a valid SSL certificate;
   a check to confirm use of a required encryption method; and
   a check to confirm compliance with a minimum encryption key length;
  identifying a HTTPS URL of a first server in the network call chain, wherein the HTTPS URL is included in HTML code provided when serving the secure content in a secure online content space;
  determining that a secure impression inventory requires an additional security audit of the registered secure content;
  conducting the additional security audit of the registered secure content; and
  responsive to a determination that the registered secure content has passed the additional security audit, approving the registered secure content to serve on the secure impression inventory.

15. The non-transitory machine-readable storage medium of claim 14, wherein facilitating registration of the secure content comprises specifying one or both of a resource identifier for the secure content and source code of the secure content.

16. The non-transitory machine-readable storage medium of claim 15, wherein facilitating registration of the secure content further comprises specifying a pixel resource identifier for the secure content.

17. The non-transitory machine-readable storage medium of claim 16, wherein facilitating registration of the secure content further comprises specifying a resource identifier for a non-secure version of the secure content.

18. The non-transitory machine-readable storage medium of claim 17, wherein facilitating registration of the secure content further comprises specifying source code of the non-secure version.

19. The non-transitory machine-readable storage medium of claim 17, wherein facilitating registration of the secure content further comprises specifying a pixel resource identifier for the non-secure version.

20. The non-transitory machine-readable storage medium of claim 16, wherein auditing the registered content comprises triggering a re-audit of the registered content upon detecting a modification to one or more of the resource identifier, the source code, and the pixel resource identifier.

* * * * *